US012171716B2

(12) United States Patent
Wise et al.

(10) Patent No.: US 12,171,716 B2
(45) Date of Patent: Dec. 24, 2024

(54) VIAL ASSEMBLY WITH LUER FITTING

(71) Applicant: Genentech, Inc., South San Francisco, CA (US)

(72) Inventors: Geoffrey Wise, South San Francisco, CA (US); Ajay Deshmukh, South San Francisco, CA (US); Lionel Vedrine, South San Francisco, CA (US)

(73) Assignee: Genentech, Inc., South San Francisco, CA (US)

( * ) Notice: Subject to any disclaimer, the term of this patent is extended or adjusted under 35 U.S.C. 154(b) by 0 days.

(21) Appl. No.: 18/510,516

(22) Filed: Nov. 15, 2023

(65) Prior Publication Data

US 2024/0091100 A1 Mar. 21, 2024

Related U.S. Application Data

(60) Division of application No. 16/276,217, filed on Feb. 14, 2019, now abandoned, which is a continuation of application No. PCT/US2017/046766, filed on Aug. 14, 2017.

(60) Provisional application No. 62/375,394, filed on Aug. 15, 2016.

(51) Int. Cl.

| | |
|---|---|
| ***A61J 1/14*** | (2023.01) |
| ***A61J 1/20*** | (2006.01) |
| *A61J 1/05* | (2006.01) |

(52) U.S. Cl.

CPC ........... *A61J 1/1418* (2015.05); *A61J 1/2096* (2013.01); *A61J 1/05* (2013.01)

(58) Field of Classification Search

CPC .. A61J 1/065; A61J 1/05; A61J 1/2096; A61J 1/201; A61J 1/2055; A61J 1/1406; A61J 1/2089; A61J 1/2065; A61J 1/1418; A61J 1/1412; A61J 1/1425; A61J 1/20

See application file for complete search history.

(56) References Cited

U.S. PATENT DOCUMENTS

| | | | |
|---|---|---|---|
| 5,035,689 | A | 7/1991 | Schroeder |
| 5,895,383 | A | 4/1999 | Niedospial, Jr. |
| 5,924,584 | A | 7/1999 | Hellstrom |
| D427,308 | S | 6/2000 | Zinger |

(Continued)

FOREIGN PATENT DOCUMENTS

| | | | |
|---|---|---|---|
| CA | 2333913 | A1 | 12/1999 |
| CN | 201263793 | Y | 7/2009 |

(Continued)

OTHER PUBLICATIONS

Extended European Search Report, dated Oct. 23, 2020, for European Patent Application No. 20186196.0, 5 pages.

(Continued)

*Primary Examiner* — Kai H Weng

(74) *Attorney, Agent, or Firm* — Morrison & Foerster LLP

(57) ABSTRACT

The needless vial assemblies described herein allow for the access to the contents of a vial, such as a medication, using a syringe without a needle. In some designs, the vial includes a vial neck, which is itself a syringe interface. The vial assemblies also include a cap with a plug, which can be used to seal the vial assembly. The present disclosure further provides methods of filling a vial assembly and methods of filling a syringe using the vial assemblies described herein.

29 Claims, 12 Drawing Sheets

(56) References Cited

U.S. PATENT DOCUMENTS

| | | | | |
|---|---|---|---|---|
| 6,267,154 | B1 | 7/2001 | Felicelli et al. | |
| 6,764,463 | B1 | 7/2004 | Farris | |
| 7,326,194 | B2 | 2/2008 | Zinger | |
| 8,651,305 | B1 | 2/2014 | Lunn | |
| 9,173,815 | B2 | 11/2015 | Davidson | |
| 2003/0032935 | A1 | 2/2003 | Damiano et al. | |
| 2013/0165851 | A1 | 6/2013 | Geiger et al. | |
| 2014/0202906 | A1 | 7/2014 | Imai | |
| 2014/0217099 | A1 | 8/2014 | Browne | |
| 2014/0299568 | A1 | 10/2014 | Browne | |
| 2015/0238387 | A1 | 8/2015 | Caetano | |
| 2015/0297449 | A1 | 10/2015 | Browne et al. | |
| 2016/0051446 | A1 | 2/2016 | Lev et al. | |
| 2016/0184182 | A1 | 6/2016 | Gross et al. | |
| 2016/0194121 | A1* | 7/2016 | Ogawa | A61J 1/05 215/249 |
| 2019/0175447 | A1 | 6/2019 | Wise | |

FOREIGN PATENT DOCUMENTS

| | | | |
|---|---|---|---|
| CN | 201350213 | Y | 11/2009 |
| CN | 101889952 | A | 11/2010 |
| CN | 102548523 | A | 7/2012 |
| CN | 102783951 | A | 11/2012 |
| CN | 104105468 | A | 10/2014 |
| DE | 1806636 | U | 2/1960 |
| EP | 0897708 | B1 | 10/2003 |
| GB | 1226737 | A | 3/1971 |
| JP | 5549048 | B2 | 7/2014 |
| WO | 199962578 | A2 | 12/1999 |
| WO | 199962578 | A3 | 6/2001 |
| WO | 2011039747 | A1 | 4/2011 |
| WO | 2013087817 | A1 | 6/2013 |
| WO | 2014145313 | A2 | 9/2014 |
| WO | 2014145313 | A3 | 1/2015 |

OTHER PUBLICATIONS

Injection Guide: For Bravelle® or Menopur®, Ferring B.V., 2 pages.

International Preliminary Report on Patentability, issued Feb. 19, 2019 for PCT Application No. PCT/ US2017/046766, filed on Aug. 14, 2017, 18 pages.

International Search Report and Written Opinion mailed on Jan. 24, 2018, for PCT Application No. PCT/ US2017/046766, filed on Aug. 14, 2017, 18 pages.

Invitation to Pay Additional Fees mailed on Nov. 20, 2017, for PCT Application No. PCT/US2017/046766, filed on Aug. 14, 2017, 13 pages.

MIXJECT: Instruction For Use, 1 page.

PINSYNC®: Vented Vial Adapter 13mm: Instruction of Use (Oct. 6, 2015). Lantheus Medical Imaging, Inc., 2 pages.

Mal Adapter: Instruction For Use, Bayer, 1 page.

Mal Adapters: Enable Rapid Drug Transfer and Reconstitution, Medimop Medical Projects Ltd. A West Company, 1 page.

Mal Adapters: Instructions For Use, 1 page.

* cited by examiner

FIG. 1A
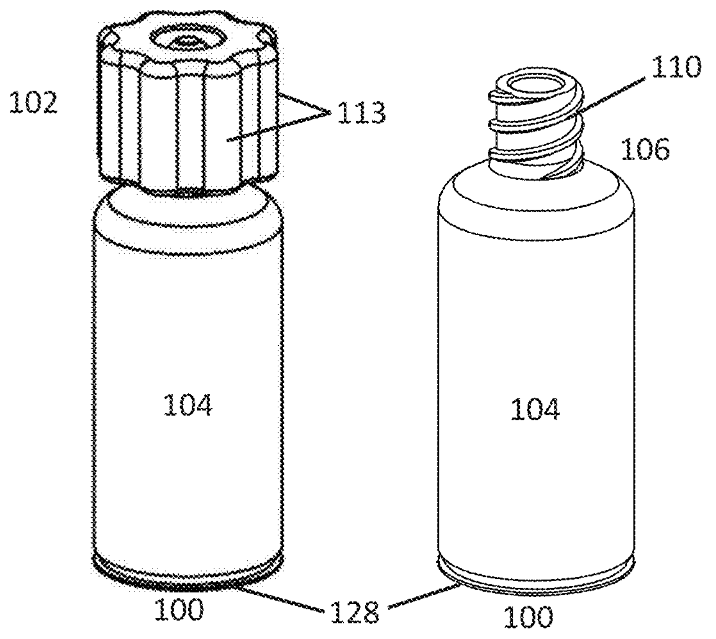
FIG. 1B
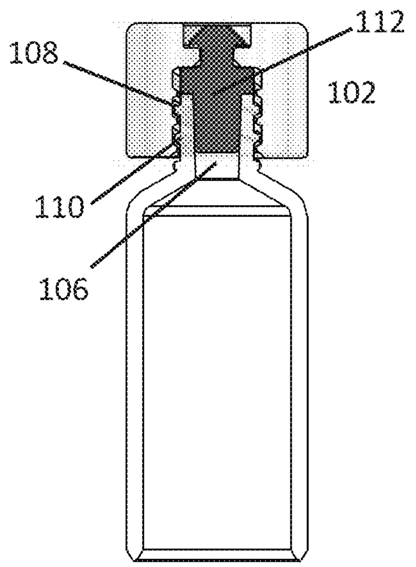
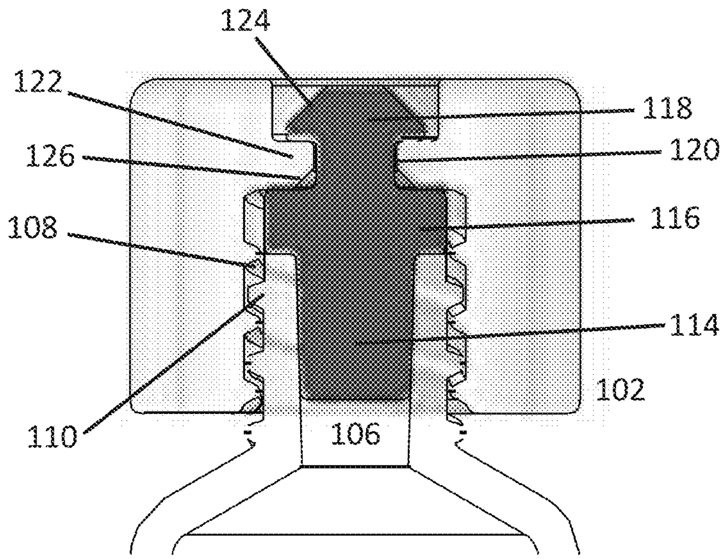
FIG. 1C

VIAL ASSEMBLY WITH LUER FITTING

CROSS-REFERENCE TO RELATED APPLICATIONS

This application is a divisional application of U.S. application Ser. No. 16/276,217, filed Feb. 14, 2019; which is a continuation of International Application No. PCT/US2017/046766, filed Aug. 14, 2017; which claims priority benefit of U.S.

Provisional Application No. 62/375,394, filed Aug. 15, 2016; the disclosure of each of which are hereby incorporated by reference in their entirety.

FIELD OF THE INVENTION

The present invention relates to vials with a luer fitting for needless interface with a syringe.

BACKGROUND OF THE INVENTION

Medications are commonly withdrawn from medication vials using a syringe with a needle attached to the end of the needle. The needle pierces a rubber septum on the vial cap and is pushed to the liquid medication. Once the open end of the needle is submerged in the liquid medication, the medication is withdrawn by pulling a syringe plunger.

Use of syringes with needles for withdrawing medications from medication vials poses considerable downside risk. Healthcare workers risk injury or infection when working with sharps, including needles. Additionally, puncture of a rubber septum to access the vial contents can often cause fragments from the septum to break off and contaminate the medication. The contaminating particles, even if sterile, risk injury to a patient, particularly in ophthalmic applications.

Additionally, many medications are stabilized in a solid form, such as by lyophilizing a liquid medication. Adding lyophilized medications to a vial is often not practical, as it is difficult to aseptically transfer solid materials into a vial because many medications are sterilized by filtering a liquid formulation. However, aseptically lyophilizing the medication once it is dispensed in a vial is also challenging, as it often requires the open vial to be exposed to the ambient environment before attaching a vial cap, thereby risking contamination.

SUMMARY OF THE INVENTION

In one aspect of the present invention, there is provided a vial assembly comprising: a vial comprising a vial body and a vial neck, the vial neck having a syringe interface; and a vial cap having a central opening including a threaded segment that engages the syringe interface and a plug, said plug having a lower stopper portion that fits within the vial neck and an upper portion that attaches to an upper portion of the vial cap. In some embodiments, the vial cap and the plug are coextruded. In some embodiments, the vial cap further including a rim, the upper portion of the plug including a top portion defining a restraint coupled to a reduced diameter region defining an annulus, wherein the rim of the vial cap extends into the annulus to hold the plug in place. In some embodiments, the plug further includes a central body with a diameter wider than the lower stopper portion. In some embodiments, the central body of the plug comprises a plurality of lateral compression ridges. In some embodiments, the restraint comprises a domed surface. In some embodiments, the restraint comprises a beveled rim. In some embodiments, the rim that extends into the annulus of the plug comprises an angled inner surface. In some embodiments, the rim that extends into the annulus of the plug is formed by an aperture on a top surface of the vial cap. In some embodiments, the rim that extends into the annulus of the plug protrudes into the central opening of the vial cap.

In another aspect, there is provided a vial assembly comprising: a vial comprising a vial body and a vial neck, the vial neck having a syringe interface; and a vial cap comprising a first component and a second component, said first component having an internal threaded segment that engages the syringe interface and an outer surface comprising a plurality of longitudinally extending ribs separated by a plurality of longitudinally extending channels, said second component including a plurality of longitudinally extending prongs that engage with a surface in the channels on the outer surface of the first component, said second component further including a central opening formed by the plurality of longitudinally extending prongs, and a plug disposed in the central opening, said plug having a lower stopper portion that fits within the vial neck and an upper portion that attaches to an upper portion of the second component. In some embodiments, the second component and the plug are coextruded. In some embodiments, the second component further includes a rim, wherein the upper portion of the plug includes a top portion defining a restraint coupled to a reduced diameter region defining an annulus, and wherein the rim of the second component extends into the annulus to hold the plug in place. In some embodiments, the plug further includes a central body with a diameter wider than the lower stopper portion. In some embodiments, the central body of the plug comprises a plurality of lateral compression ridges. In some embodiments, the restraint comprises a domed surface. In some embodiments, the restraint comprises a beveled rim. In some embodiments, the rim that extends into the annulus of the plug comprises an angled inner surface. In some embodiments, the rim that extends into the annulus of the plug is formed by an aperture on a top surface of the vial cap. In some embodiments, the rim that extends into the annulus of the plug protrudes into the central opening of the vial cap. In some embodiments, at least one of the prongs in the plurality of longitudinally extending prongs comprises an anchor that engages a counter-anchor disposed in a channel in the plurality of longitudinally extending channels.

In some embodiments, the vial neck is tapered. In some embodiments, the syringe interface is a second threaded segment on an outer surface of the vial neck. In some embodiments, the syringe interface is a female luer.

In some embodiments, the stopper portion of the plug forms a seal with the inner surface of the vial neck.

In some embodiments, the vial assembly comprises a tamper-evident band. In some embodiments, the vial comprises an annular lip disposed on the outer surface of the vial neck; the tamper-evident band is attached to the vial cap; and the annular lip disposed on the outer surface of the vial neck secures the tamper-evident band to the vial.

In some embodiments, the vial body has an open base. In some embodiments, the vial body includes a base that is sealed with a thermoformed plastic or foil.

In another aspect, there is provided a vial assembly comprising: a vial having a vial body and a vial neck; an adapter having a top portion having a syringe interface, a bottom portion having a vial neck fitting attached to the vial neck, and a channel fluidly connecting the syringe interface to the vial neck; a gasket disposed between the vial neck and the adapter; and a vial cap having a central opening including a threaded segment that engages the syringe interface and a plug, said plug having a lower stopper portion that fits within the vial neck and an upper portion that attaches to an upper portion of the vial cap. In some embodiments, the vial cap and the plug are coextruded. In some embodiments, the vial cap further includes a rim, the upper portion of the plug includes a top portion defining a restraint coupled to a reduced diameter region defining an annulus, and the rim of the vial cap extends into the annulus to hold the plug in place. In some embodiments, the plug further includes a central body with a diameter wider than the lower stopper portion. In some embodiments, the central body of the plug comprises a plurality of lateral compression ridges. In some embodiments, the restraint comprises a domed surface. In some embodiments, the restraint comprises a beveled rim. In some embodiments, the rim that extends into the annulus of the plug comprises an angled inner surface. In some embodiments, the rim that extends into the annulus of the plug is formed by an aperture on a top surface of the vial cap. In some embodiments, the rim that extends into the annulus of the plug protrudes into the central opening of the vial cap.

In some embodiments, the vial cap comprises a skirt that surrounds a portion of the vial neck fitting of the adapter. In some embodiments, the vial cap comprises an outer surface comprising a plurality of longitudinally extending ribs.

In some embodiments, the syringe interface is a tapered conduit. In some embodiments, the syringe interface is a second threaded segment on an outer surface of a conduit. In some embodiments, the syringe interface is a female luer. In some embodiments, the vial neck fitting comprises a plurality of prongs that comprise an anchor that engages an annular lip on the vial neck.

In some embodiments, the vial assembly comprises a tamper-evident band. In some embodiments, the vial cap comprises a skirt that surrounds a portion of the vial neck fitting of the adapter; the tamper-evident band is attached to the skirt; and the adapter secures the tamper-evident band to the vial.

In another aspect, there is provided a vial assembly comprising: a vial having a vial body and a vial neck, the vial neck comprising an inner surface and an outer surface, the outer surface comprising an annular lip; and a vial cap having: a stopper having a top portion and a bottom portion, the top portion comprising a longitudinal aperture, and the bottom portion that fits into the vial neck; a conduit having a syringe interface at a first end and a barb at a second end, the second end fitting through the aperture in the stopper, and said barb engaging an underside of the top portion of the stopper; and an end cap having a central opening including a threaded segment that engages the syringe interface and a plug disposed in the central opening, said plug having a lower stopper portion that fits within the syringe interface of the conduit and an upper portion that attaches to an upper portion of the end cap. In some embodiments, the end cap and the plug are coextruded. In some embodiments, the end cap further includes a rim, wherein the upper portion of the plug includes a top portion defining a restraint coupled to a reduced diameter region defining an annulus, and wherein the rim of the end cap extends into the annulus to hold the plug in place. In some embodiments, the plug further includes a central body with a diameter wider than the lower stopper portion. In some embodiments, the central body of the plug comprises a plurality of lateral compression ridges. In some embodiments, the restraint comprises a domed surface. In some embodiments, the restraint comprises a beveled rim. In some embodiments, the rim that extends into the annulus of the plug comprises an angled inner surface. In some embodiments, the rim that extends into the annulus of the plug is formed by an aperture on a top surface of the vial cap. In some embodiments, the rim that extends into the annulus of the plug protrudes into the central opening of the vial cap.

In some embodiments, the syringe interface is tapered. In some embodiments, the syringe interface is a second threaded segment on an outer surface of the syringe interface. In some embodiments, the syringe interface is a female luer.

In some embodiments, the stopper comprises a raised annular ridge around the aperture at the top of the stopper; and the end cap comprises a skirt that fits around the raised annular ridge.

In some embodiments, the stopper comprises an annular lip that sits on the annular lip disposed on an outer surface of the vial neck. In some embodiments, the vial assembly further comprises a ring that secures the stopper to the vial neck.

In some embodiments, the vial assembly further comprises a tamper-evident band. In some embodiments, the end cap comprises a tamper-evident band that covers a portion of the annular lip, and the ring secures the temper-evident band and the stopper to the vial neck.

In some embodiments, the bottom portion of the stopper comprises at least one truncated segment.

In another aspect, there is provided a method of filing a vial assembly comprising: dispensing a liquid comprising the substance into a vial assembly comprising: a vial having a vial body and a vial neck, the vial neck having a syringe interface; and a vial cap having a central opening including a threaded segment that engages the syringe interface and a plug, said plug having a lower stopper portion that fits within the vial neck and an upper portion that attaches to an upper portion of the vial cap; wherein the liquid is dispensed through an open base of the vial body; and sealing the base of the vial body after the liquid has been dispensed. In some embodiments, the vial cap further includes a rim, the upper portion of the plug includes a top portion defining a restraint coupled to a reduced diameter region defining an annulus, and the rim of the vial cap extends into the annulus to hold the plug in place. In some embodiments, the plug further includes a central body with a diameter wider than the lower stopper portion. In some embodiments, method further includes the step of attaching the plug to the vial cap. In some embodiments, the vial cap and the plug are coextruded.

In some embodiments, the method further includes the step of attaching the vial cap to the vial neck.

In some embodiments, the method further includes the step of lyophilizing the liquid prior to sealing the base of the vial body.

In some embodiments, the method further includes the steps of: detaching the vial cap from the vial neck, attaching a syringe to the vial neck, and drawing the liquid into the syringe.

In some embodiments, the method further includes the steps of: detaching the vial cap from the vial neck, attaching a syringe to the vial neck, dispensing a second liquid into the vial after attaching the syringe to the vial neck, drawing the liquid into the syringe.

In some embodiments, the base of the vial body is sealed with a thermoformed plastic or foil.

In some embodiments, the vial neck is tapered. In some embodiments, the syringe interface is a second threaded segment on an outer surface of the vial neck. In some embodiments, the syringe interface is a female luer.

In another aspect there is provided a method of filling a vial assembly comprising: dispensing a liquid into a vial comprising a vial body and a vial neck, the vial neck having a syringe interface; attaching a first component of a vial cap to the vial neck, said first component having an internal threaded segment that engages the syringe interface and an outer surface comprising a plurality of longitudinally extending ribs separated by a plurality of longitudinally extending channels; and sealing the vial by attaching a second component of the vial cap to the first component, said second component including a plurality of longitudinally extending prongs that engage with a surface in the channels on the outer surface of the first component, said second component further including a central opening formed by the plurality of longitudinally extending prongs, and a plug disposed in the central opening, said plug having a lower stopper portion that fits within the vial neck and an upper portion that attaches to an upper portion of the second component. In some embodiments, the second component further includes a rim, wherein the upper portion of the plug includes a top portion defining a restraint coupled to a reduced diameter region defining an annulus, and the rim of the vial cap extends into the annulus to hold the plug in place. In some embodiments, the plug further includes a central body with a diameter wider than the lower stopper portion. In some embodiments, further includes the step of attaching the plug to the second component of the vial cap. In some embodiments, the second component and the plug are coextruded.

In some embodiments, sealing the vial includes engaging an anchor on at least one of the prongs in the plurality of longitudinally disposed prongs with a counter-anchor disposed in a channel in the plurality of longitudinally disposed channels.

In some embodiments, the first component of the vial cap is attached to the vial neck prior to dispensing the liquid into the vial. In some embodiments, the liquid is dispensed into the vial prior to attaching the first component of the vial cap to the vial neck.

In some embodiments, the method further includes the steps of: detaching the vial cap from the vial neck, attaching a syringe to the vial neck, and drawing the liquid into the syringe.

In some embodiments, the method further includes the step of lyophilizing the liquid prior to sealing the vial.

In some embodiments, the method further includes partially engaging the second component with the first component without forming a seal prior to lyophilizing the liquid.

In some embodiments, the method further includes the steps of: detaching the vial cap from the vial neck, attaching a syringe to the vial neck, dispensing a second liquid into the vial after attaching the syringe to the vial neck, and drawing the liquid into the syringe.

In some embodiments, the method further includes the syringe interface is tapered. In some embodiments, the method further includes the syringe interface is a second threaded segment on an outer surface of the vial neck. In some embodiments, the method further includes the syringe interface is a female luer.

In another aspect, there is provided a method of filling a vial assembly comprising; dispensing a liquid into a vial comprising a vial body and a vial neck; attaching an adapter to the vial neck, said adapter comprising a top portion having a syringe interface, a bottom portion having a vial neck fitting, a gasket fitting within the vial neck fitting, and a longitudinally extending channel fluidly connecting the syringe interface to the vial neck; and sealing the vial by attaching a vial cap to the adapter, said vial cap having a central opening including a threaded segment that engages the syringe interface and a plug, said plug having a lower stopper portion that fits within the vial neck and an upper portion that attaches to an upper portion of the vial cap. In some embodiments, the method further includes fitting the gasket along an inner edge of the vial neck fitting prior to attaching the adapter to the vial neck. In some embodiments, the method further includes attaching the vial cap to the adapter prior to attaching the adapter to the vial neck.

In some embodiments, the vial cap further includes a rim, the upper portion of the plug includes a top portion defining a restraint coupled to a reduced diameter region defining an annulus, and the rim of the vial cap extends into the annulus to hold the plug in place. In some embodiments, the plug further includes a central body with a diameter wider than the lower stopper portion.

In some embodiments, the method further includes the step of attaching the plug to the vial cap.

In some embodiments, the vial cap and the plug are coextruded.

In some embodiments, the liquid is dispensed into the vial after attaching the adapter to the vial neck.

In some embodiments, the method further includes the step of lyophilizing the liquid. In some embodiments, the method includes the steps of: placing the vial cap on the adapter in an unsealed configuration prior to lyophilizing the liquid; and sealing the vial by tightening the vial cap after lyophilizing the liquid.

In some embodiments, the method further includes the steps of: detaching the vial cap from the vial neck, attaching a syringe to the vial neck, and drawing the liquid into the syringe.

In some embodiments, the method further includes the steps of: detaching the vial cap from the vial neck, attaching a syringe to the vial neck, dispensing a second liquid into the vial after attaching the syringe to the vial neck, and drawing the liquid into the syringe.

In some embodiments, the syringe interface is tapered. In some embodiments, the syringe interface is a second threaded segment on an outer surface of the vial neck. In some embodiments, the syringe interface is a female luer.

In another aspect, there is provided a method of filling a vial assembly comprising: dispensing a liquid into a vial comprising a vial body and a vial neck the vial neck; and sealing the vial by attaching a vial cap to the vial neck, the vial cap having: a stopper having a top portion and a bottom portion, the top portion comprising a longitudinal aperture, and the bottom portion that fits into the vial neck; a conduit having a syringe interface at a first end and a barb at a second end, the second end fitting through the aperture in the stopper, and said barb engaging an underside of top portion of the stopper; and an end cap having a central opening including a threaded segment that engages the syringe interface and a plug disposed in the central opening, said plug having a lower stopper portion that fits within the syringe interface of the conduit and an upper portion that attaches to an upper portion of the end cap. In some embodiments, the end cap and the plug are coextruded. In some embodiments, the end cap includes a rim, the upper portion of the plug includes a top portion defining a restraint coupled to a reduced diameter region defining an annulus, and the rim of the end cap extends into the annulus to hold the plug in place. In some embodiments, the plug further includes a central body with a diameter wider than the lower stopper portion.

In some embodiments, the method further includes the step of attaching the conduit to the end cap. In some embodiments, the method further includes the step of attaching the conduit to the stopper.

In some embodiments, the vial cap is pre-assembled.

In some embodiments, the stopper includes an annular lip that sits on an annular lip disposed on an outer surface of the vial neck. In some embodiments, the method further includes the step of securing the stopper to the vial neck by attaching a ring around the annular lip of the stopper and the annular lip of the vial neck.

In some embodiments, the method further includes the step of lyophilizing the liquid prior to sealing the vial. In some embodiments, the method further includes the step of partially inserting the bottom portion of the stopper into the vial neck prior to lyophilizing the liquid. In some embodiments, the method includes the step of fully inserting the bottom portion of the stopper into the vial neck after lyophilizing the liquid.

In some embodiments, the method includes the steps of: detaching the vial cap from the vial neck, attaching a syringe to the vial neck, and drawing the liquid into the syringe.

In some embodiments, the method includes the steps of: detaching the vial cap from the vial neck, attaching a syringe to the vial neck, dispensing a second liquid into the vial after attaching the syringe to the vial neck, and drawing the liquid into the syringe.

In some embodiments, the syringe interface is a second threaded segment on an outer surface of the vial neck. In some embodiments, the syringe interface is a female luer.

In another aspect, there is provided a method of filling a syringe, comprising: detaching a vial cap from a vial, the vial having a vial body and a vial neck, the vial neck having a syringe interface; and the vial cap having a central opening including a threaded segment that engages the syringe interface and a plug, said plug having a lower stopper portion that fits within the vial neck and an upper portion that attaches to an upper portion of the vial cap; attaching a syringe to the vial neck; and drawing a liquid contained within the vial into the syringe. In some embodiments, the vial cap and the plug are coextruded. In some embodiments, the vial cap includes a rim, the upper portion of the plug includes a top portion defining a restraint coupled to a reduced diameter region defining an annulus, and the rim of the vial cap extends into the annulus to hold the plug in place. In some embodiments, the plug further includes a central body with a diameter wider than the lower stopper portion.

In another aspect, there is provided a method of filling a syringe, comprising: detaching a vial cap from a vial, the vial having a vial body and a vial neck, the vial neck having a syringe interface; and the vial cap comprising a first component and a second component, said first component having an internal threaded segment that engages the syringe interface and an outer surface comprising a plurality of longitudinally extending ribs separated by a plurality of longitudinally extending channels, said second component including a plurality of longitudinally extending prongs that engage with a surface in the channels on the outer surface of the first component, said second component further including a central opening formed by the plurality of longitudinally extending prongs and a plug disposed in the central opening, said plug having a lower stopper portion that fits within the vial neck and an upper portion that attaches to an upper portion of the second component; attaching a syringe to the syringe interface of the vial neck; and drawing a liquid contained within the vial into the syringe. In some embodiments, the second component and the plug are coextruded. In some embodiments, the second component further includes a rim, the upper portion of the plug includes a top portion defining a restraint coupled to a reduced diameter region defining an annulus, and the rim of the second component extends into the annulus to hold the plug in place. In some embodiments, the plug further includes a central body with a diameter wider than the lower stopper portion.

In some embodiments, at least one of the prongs in the plurality of longitudinally extending prongs comprises an anchor that engages a counter-anchor disposed in a channel in the plurality of longitudinally extending channels.

In some embodiments, the vial neck is tapered. In some embodiments, the syringe interface is a second threaded segment on an outer surface of the vial neck. In some embodiments, the syringe interface is a female luer.

In some embodiments, the step of detaching the vial cap includes unscrewing the vial cap.

In some embodiments, the syringe comprises a male luer lock that interfaces with the syringe interface.

In some embodiments, the method further includes a step of forming the liquid by adding a solution to the vial, and dissolving or suspending a lyophilized powder contained within the vial.

In some embodiments, the step of detaching the vial cap includes severing a tamper-evident band from the vial cap.

In another aspect, there is provided a method of filling a syringe, comprising: detaching a vial cap from a vial assembly comprising: a vial comprising a vial body and a vial neck; an adapter comprising a top portion having a syringe interface, a bottom portion having a vial neck fitting attached to the vial neck, and a channel fluidly connecting the syringe interface to the vial neck; a gasket disposed between the vial neck and the adapter; and the vial cap; said vial cap having a central opening including a threaded segment that engages the syringe interface and a plug, said plug having a lower stopper portion that fits within the vial neck and an upper portion that attaches to an upper portion of the vial cap; attaching a syringe to the syringe interface; and drawing a liquid contained within the vial into the syringe. In some embodiments, the end cap and the plug are coextruded. In some embodiments, the vial cap further includes a rim, the upper portion of the plug includes a top portion defining a restraint coupled to a reduced diameter region defining an annulus, and the rim of the vial cap extends into the annulus to hold the plug in place. In some embodiments, the plug further includes a central body with a diameter wider than the lower stopper portion.

In some embodiments, the syringe interface is tapered. In some embodiments, the syringe interface is a second threaded segment on an outer surface of a conduit. In some embodiments, the syringe interface is a female luer.

In some embodiments, the syringe comprises a male luer lock that interfaces with the syringe interface.

In some embodiments, the method further includes a step of forming the liquid by adding a solution to the vial, and dissolving or suspending a lyophilized powder contained within the vial. In some embodiments, the step of detaching the vial cap includes unscrewing the vial cap. In some embodiments, the step of detaching the vial cap includes severing a tamper-evident band from the vial cap.

In another aspect, there is provided a method of filling a syringe, comprising: detaching an end cap from a vial assembly comprising: a vial having a vial body and a vial neck, the vial neck having an inner surface and an outer surface, the outer surface having an annular lip; and a vial cap having: a stopper having a top portion and a bottom portion, the top portion comprising a longitudinal aperture, and the bottom portion that fits into the vial neck; a conduit having a syringe interface at a first end and a barb at a second end, the second end fitting through the aperture in the stopper, and said barb engaging an underside of top portion of the stopper; and the end cap; said end cap having a central opening including a threaded segment that engages the syringe interface and a plug disposed in the central opening, said plug having a lower stopper portion that fits within the syringe interface of the conduit and an upper portion that attaches to an upper portion of the end cap; attaching a syringe to the syringe interface; and drawing a liquid contained within the vial into the syringe. In some embodiments, the end cap and the plug are coextruded. In some embodiments, the end cap includes a rim, wherein the upper portion of the plug includes a top portion defining a restraint coupled to a reduced diameter region defining an annulus, and the rim of the end cap extends into the annulus to hold the plug in place. In some embodiments, the plug further includes a central body with a diameter wider than the lower stopper portion.

In some embodiments, the syringe interface is tapered. In some embodiments, the syringe interface is a second threaded segment on an outer surface of the conduit. In some embodiments, the syringe interface is a female luer. In some embodiments, the syringe comprises a male luer lock that interfaces with the syringe interface.

In some embodiments, the method further includes a step of forming the liquid by adding a solution to the vial, and dissolving or suspending a lyophilized powder contained within the vial.

In some embodiments, the step of detaching the vial cap includes unscrewing the end cap. In some embodiments, the step of detaching the vial cap includes severing a tamper-evident band from the vial cap.

BRIEF DESCRIPTION OF THE DRAWINGS

FIG. 1A illustrates an exemplary vial assembly comprising a vial and a vial cap next to a vial without the vial cap.

FIG. 1B illustrates a cross-sectional view of the vial assembly illustrated in FIG. 1A.

FIG. 1C illustrates a close-up cross-sectional view of the vial cap with a plug illustrated in FIG. 1B. The plug includes a stopper portion, a central body, a restraint, and a reduced diameter region defining an annulus between the central body and the restraint.

DETAILED DESCRIPTION OF THE INVENTION

Figure 1D:
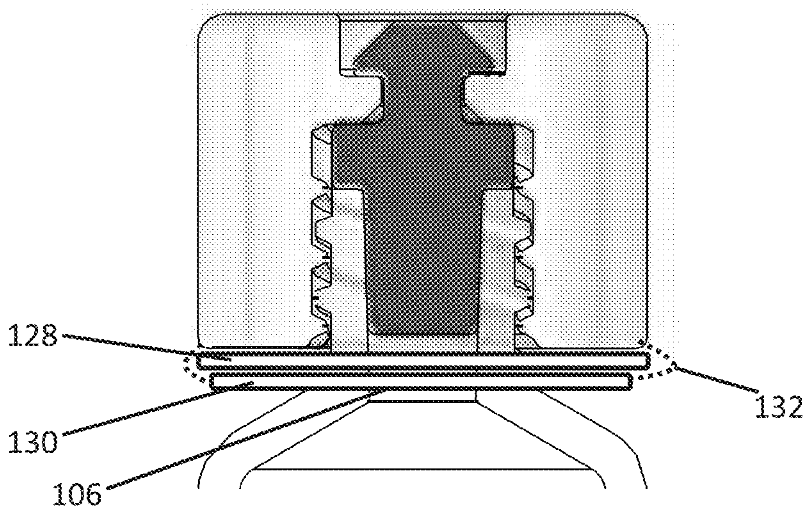
FIG. 1D illustrates a close-up cross-sectional view of the vial cap with a plug illustrated in FIG. 1B with a tamper-evident band.

Provided herein are vial assemblies for needless interface of a syringe with a vial. The described assemblies allow for the transfer of liquids from a vial to a syringe without needing to pierce a septum in a vial cap using a needle. Liquid or solid substances (such as medications) can be contained within the vials that are sealed with the described vial caps. The vial cap (or a portion of the vial cap) can be detached from the vial assemblies to reveal a syringe interface. A syringe, which may include a male luer (such as a male luer lock or male slip tip) can attach to the syringe interface. The syringe is thereby fluidly connected to the substance contained within the vial. Optionally, the syringe can have a liquid that is dispensed into the vial after attaching to the syringe interface. For example, if the substance contained within the medication vial is a solid, the syringe can dispense a liquid to dissolve or suspend the substance. The syringe can also be used to withdraw the liquid contained in the vial once the syringe is attached to the syringe interface. Thus, the vial assemblies allow for a needless interface with a syringe, as well as the needless withdrawal of a liquid contained within a vial.

Additionally, the described vial assemblies allow for liquids to be lyophilized once dispensed in the vials, and for reconstitution of lyophilized products contained within the vials. Many medications are more stable in a lyophilized form. However, it is often difficult to aseptically manufacture a sealed vial containing a lyophilized substance. For example, adding a liquid to a vial, lyophilizing the liquid, and then attaching the vial cap leaves the vial neck uncovered and the medication exposed during the lyophilization process. This exposure can result in contamination. In some embodiments, the vial assemblies described herein not only allow for needless interface with syringes, but also allow for aseptic lyophilization of liquids contained within the vial.

The vial assemblies and methods described herein allow for needless filling and withdrawal of liquids, such as liquid medications. The vial assemblies include a vial and a cap. The vial may be any medicine vial, such as a 1 mL, 2 mL, 5 mL, 10 mL, 15 mL, 20 mL, 25 mL, 30 mL or any other size vial. The vial may be made from glass, plastic, or any other suitable material. The vial includes a vial neck and a vial body. In some embodiments, the vial neck includes a syringe interface, such as a female luer or an outer surface with a threaded segment. In some embodiments, the vial neck may comprise an annular lip, which may be disposed at the top of the vial neck (i.e., proximal to the vial opening), the bottom of the vial neck (i.e., proximal to the vial body), or both.

In any of the methods described herein, the vial assembly can be filled with a liquid via the base of the vial body or via the vial neck. For example, in some embodiments, the vial cap is attached to the vial in a sealed configuration and the vial body has an open base. The vial can be inverted (that is, the open base can be facing upward) and the liquid dispensed in the vial. The vial vase can be sealed, for example by sealing the open base with a foil or a thermoformed plastic.

In any of the methods described herein, the liquid dispensed in the vial can be lyophilized. Lyophilizing can be performed, for example, by freezing the liquid (for example, by cooling the liquid do about 0° C. or less, about −20° C. or less, −40° C. or less, −60° C. or less, or −80° C. or less) and by exerting a vacuum (such as about 800 mTorr or less about 600 mTorr or less, about 500 mTorr or less, about 400 mTorr or less, about 300 mTorr or less, about 200 mTorr or less, or about 100 mTorr or less). In some embodiments, the vial cap is attached to the vial neck in an unsealed configuration during lyophilization.

The vial caps and vial cap components (such as an adapter, a stopper, a plug, or an end cap, a gasket, etc.) may be metal, rubber, or a polymer, or any combination of such materials. The plugs are attached to the vial cap (or vial cap component or end cap), and may be coextruded with the vial cap (or vial cap component or end cap) or the plug may be a separate component that is attached to the vial cap (or vial cap component or end cap), for example, by engaging a rim. In some embodiments, the plug is elastomeric. The plug may be rubber, an elastomeric polymer, or any other suitable material.

In some embodiments, the vial assembly comprises a vial comprising a vial body and a vial neck, the vial neck having a syringe interface; and a vial cap having a central opening including a threaded segment that engages the syringe interface and a plug, said plug having a lower stopper portion that fits within the vial neck and an upper portion that attaches to an upper portion of the vial cap. In some embodiments, the vial neck has a tapered inner surface. In some embodiments, the syringe interface is a female luer. In some embodiments, the syringe interface is a second threaded segment on the outer surface of the vial neck. In some embodiments, the vial assembly comprises a tamper-evident band.

In some embodiments, the vial assembly comprises a vial comprising a vial body and a vial neck, the vial neck having a syringe interface; and a vial cap having a central opening including a threaded segment that engages the syringe interface and a coextruded plug disposed within the central opening, said plug having a lower stopper portion that fits within the vial neck and an upper portion that attaches to an upper portion of the vial cap. In some embodiments, the vial neck has a tapered inner surface. In some embodiments, the syringe interface is a female luer. In some embodiments, the syringe interface is a second threaded segment on the outer surface of the vial neck. In some embodiments, the vial assembly comprises a tamper-evident band.

In some embodiments, the vial assembly comprises a vial comprising a vial body and a vial neck, the vial neck having a syringe interface; and a vial cap having a central opening including a threaded segment that engages the syringe interface and a rim, said vial cap carrying a plug in the central opening, said plug having a lower stopper portion that fits within the vial neck, and an upper portion including a top portion defining a restraint coupled to a reduced diameter region defining an annulus, wherein the rim of the vial cap extends into the annulus to hold the plug in place. In some embodiments, the vial neck has a tapered inner surface. In some embodiments, the syringe interface is a female luer. In some embodiments, the syringe interface is a second threaded segment on the outer surface of the vial neck. In some embodiments, the vial assembly comprises a tamper-evident band.

In some embodiments, the vial assembly comprises a vial comprising a vial body and a vial neck, the vial neck having a syringe interface; and a vial cap having a central opening including a threaded segment that engages the syringe interface and a rim, said vial cap carrying a plug in the central opening, said plug having a lower stopper portion that fits within the vial neck, a central body with a diameter wider than the lower stopper portion (the central body optionally including a plurality of compression ridges), and an upper portion including a top portion defining a restraint (which can optionally have a domed surface or a beveled rim) coupled to a reduced diameter region defining an annulus, wherein the rim of the vial cap extends into the annulus to hold the plug in place. In some embodiments, the vial neck has a tapered inner surface. In some embodiments, the syringe interface is a female luer. In some embodiments, the syringe interface is a second threaded segment on the outer surface of the vial neck. In some embodiments, the vial assembly comprises a tamper-evident band.

FIG. 1A illustrates an exemplary vial assembly comprising a vial 100 and a vial cap 102 next to a vial 100 without the vial cap. FIG. 1B illustrates a cross-sectional view of the same vial assembly illustrated in FIG. 1A. The vial includes a vial body 104 and a vial neck 106. The vial body 104 can contain a liquid or a powder (which can be, for example, formed by lyophilizing a liquid). The vial neck 106 includes a syringe interface configured to engage a threaded segment 108 within a central opening of the vial cap 102. For example, in some embodiments the vial neck 106 has an outer surface that has a threaded segment 110, as illustrated in FIG. 1A. In some embodiments, the vial neck 106 includes a female luer lock. The threaded vial neck or female luer lock can interface with a male luer lock or slip tip (for example, on a syringe). In some embodiments, the inner portion of the vial neck 106 is tapered (that is, a bottom inner diameter proximal to the vial body is smaller than an upper inner diameter proximal to a vial opening). The vial can be, for example, a medication bottle, and can be glass, a polymer, or any other suitable material.

The vial cap 102 includes a central opening having a threaded segment 108 within the central opening of the vial cap 102. The threaded segment 108 is located on the bottom portion of the vial cap 102. The vial cap 102 further comprises a plug 112, which attaches to the vial cap 102 at the top portion of the vial cap 102. Optionally, the outer surface of the vial cap 102 comprises a plurality of longitudinally disposed ribs 113, which can help provide traction when opening or closing the vial assembly.

Referring now to FIG. 1C, which illustrates a close-up cross-sectional view of the vial cap, the plug comprises a stopper portion 114, a central body 116, a restraint 118, and a reduced diameter region defining an annulus 120 between the central body 116 and the restraint 118. The stopper portion 114 of the plug is disposed in the direction of the threaded segment 108 of the vial cap 102 and fits into the vial neck 106 to form a seal. In some embodiments, the stopper portion 114 is tapered (that is, a bottom diameter is smaller than an upper diameter). The central body 116 is wider than the stopper portion 114, and can sit on the end of the vial neck 106 proximal to the vial opening. In some embodiments, the central body 116 comprises a plurality of lateral compression ridges disposed on its outer surface, which can aid in sealing the vial. The vial cap 102 comprises a rim 122 that extends into the annulus 120. The rim 122 can be formed, for example, by an aperture in the vial cap 102. The aperture can extend through the top of the vial cap 102, or the aperture can be internal in the vial cap. In some embodiments, the rim 122 comprises a plurality of prongs. The restraint 118 locks the plug into the vial cap 102 once attached by extending over the rim 122 and holding the rim 122 in the annulus 120.

The restraint 118 can be shaped to allow unidirectional movement, for example by having a narrower top and a wider base. For example, in some embodiments, the restraint is domed shaped. In some embodiments, the restraint 118 comprises a beveled rim 124 such that the top of the restraint is narrower than the base of the restraint. The rim 122 that extends into the annulus 120 can optionally comprise an angled edge 126. For example, the rim 122 can comprise an angled edge 126 such that the bottom edge of the rim is shorter than the top edge. In some embodiments, the rim 122 comprises an angled edge 126 such that a top portion or a bottom portion of the rim is beveled. In the cap illustrated in FIG. 1C, the bottom portion of the rim 122 is beveled, thereby forming the angled edge 126. The angled edge 126 can be used alone or in combination with the restraint 118 shaped to allow unidirectional movement to facilitate attachment of the plug 112 into the vial cap 102.

In some embodiments, the vial assembly comprises a tamper-evident band (FIG. 1D). For example, in some embodiments, the vial comprises an annular lip 128 disposed on the outer surface of the vial neck 106. The annular lip 128 is disposed on the proximal end of the vial neck 106 (i.e., closer to the vial body than the vial opening). The tamper-evident band 130 is attached to the vial cap 102 and wraps below the annular lip on the vial neck 106. For example, the tamper-evident band can be attached to the vial cap 102 by a perforated segment 132. When the vial cap 102 is separated from the vial 100, the annular lip 128 on the vial neck 106 retains the tamper-evident band 130 and the perforate segment 132 is torn, thereby separating the tamper-evident band 130 from the vial cap 102. This separation indicates that the vial cap 102 has been opened.

The vial can be filled with a liquid (for example, a liquid medication) from either vial neck opening or from the base of the vial body. That is, in some embodiments, the vial body comprises an open base, which can be sealed after a liquid is dispensed in the vial (for example using a thermoformed plastic or foil). When dispensing liquid into the vial through the open base, the vial cap is attached to the vial prior to dispensing the liquid into the vial. When a liquid is dispensed into the vial through an opening in the vial neck, the vial cap is attached to the vial after dispensing the liquid into the vial. In some embodiments, the liquid is dispensed into the vial from the vial neck, and the vial cap is then attached to the vial neck. Optionally, the liquid is lyophilized prior to attaching the vial cap to the vial neck.

In some embodiments, a method of filling a vial assembly comprises dispensing a liquid into a vial assembly comprising a vial having a vial body and a vial neck, the vial neck having a syringe interface; and a vial cap having a central opening including a threaded segment that engages the syringe interface and a plug, said plug having a lower stopper portion that fits within the vial neck and an upper portion that attaches to an upper portion of the vial cap; wherein the liquid is dispensed through an open base of the vial body; and sealing the base of the vial body after the liquid has been dispensed. In some embodiments, the vial neck has a tapered inner surface. In some embodiments, the syringe interface is a female luer. In some embodiments, the syringe interface is a second threaded segment on the outer surface of the vial neck. In some embodiments, the liquid is lyophilized prior to sealing the base of the vial body. In some embodiments, the method includes attaching the vial cap to the vial neck.

In some embodiments, a method of filling a vial assembly comprises dispensing a liquid into a vial assembly comprising a vial comprising a vial body and a vial neck, the vial neck having a syringe interface; and a vial cap having a central opening including a threaded segment that engages the syringe interface and a coextruded plug disposed with in the central opening, said plug having a lower stopper portion that fits within the vial neck and an upper portion that attaches to an upper portion of the vial cap; wherein the liquid is dispensed through an open base of the vial body; and sealing the base of the vial body after the liquid has been dispensed. In some embodiments, the vial neck has a tapered inner surface. In some embodiments, the syringe interface is a female luer. In some embodiments, the syringe interface is a second threaded segment on the outer surface of the vial neck. In some embodiments, the liquid is lyophilized prior to sealing the base of the vial body. In some embodiments, the method includes attaching the vial cap to the vial neck.

In some embodiments, a method of filling a vial assembly comprises dispensing a liquid into a vial assembly comprising a vial having a vial body and a vial neck, the vial neck having a syringe interface; and a vial cap having a central opening including a threaded segment that engages the syringe interface and a rim, said vial cap carrying a plug in the central opening, said plug having a lower stopper portion that fits within the vial neck, and an upper portion including a top portion defining a restraint coupled to a reduced diameter region defining an annulus, wherein the rim of the vial cap extends into the annulus to hold the plug in place; wherein the liquid is dispensed through an open base of the vial body; and sealing the base of the vial body after the liquid has been dispensed. In some embodiments, the vial neck has a tapered inner surface. In some embodiments, the syringe interface is a female luer. In some embodiments, the syringe interface is a second threaded segment on the outer surface of the vial neck. In some embodiments, the liquid is lyophilized prior to sealing the base of the vial body. In some embodiments, the method includes attaching the vial cap to the vial neck.

In some embodiments, a method of filling a vial assembly comprises dispensing a liquid into a vial assembly comprising a vial having a vial body and a vial neck, the vial neck having a syringe interface; and a vial cap having a central opening including a threaded segment that engages the syringe interface and a rim, said vial cap carrying a plug in the central opening, said plug having a lower stopper portion that fits within the vial neck, a central body with a diameter wider than the lower stopper portion (the central body optionally including a plurality of compression ridges), and an upper portion including a top portion defining a restraint (which can have a domed surface or a beveled rim) coupled to a reduced diameter region defining an annulus, wherein the rim of the vial cap extends into the annulus to hold the plug in place; wherein the liquid is dispensed through an open base of the vial body; and sealing the base of the vial body after the liquid has been dispensed. In some embodiments, the vial neck has a tapered inner surface. In some embodiments, the syringe interface is a female luer. In some embodiments, the syringe interface is a second threaded segment on the outer surface of the vial neck. In some embodiments, the liquid is lyophilized prior to sealing the base of the vial body. In some embodiments, the method includes attaching the vial cap to the vial neck.

Figure 2:
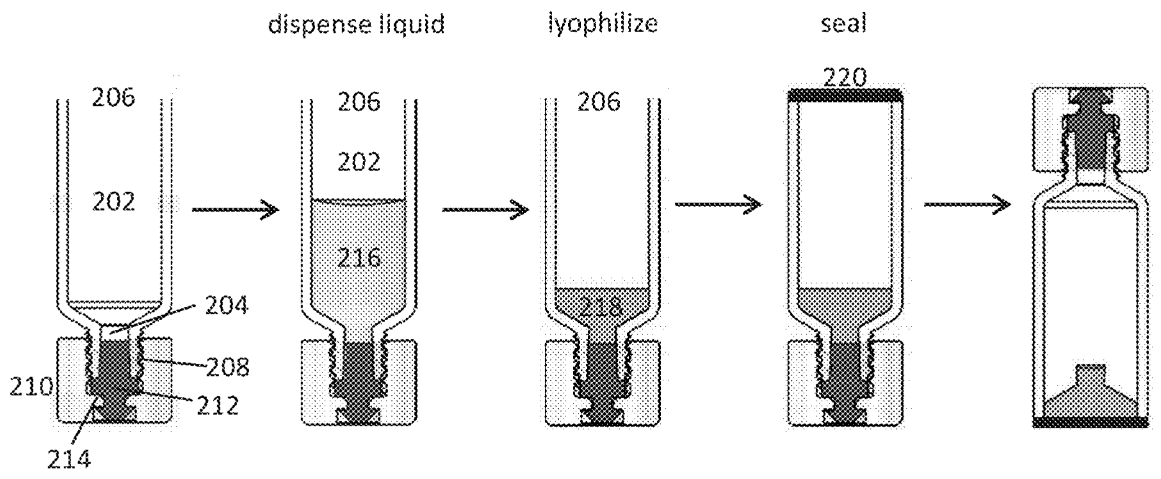
FIG. 2 illustrates one method of filling a vial assembly with a liquid. Optionally, the liquid is lyophilized. In the illustrated embodiment, the vial body includes an open base through which the liquid can be dispensed. Once the liquid is dispensed in the vial, the liquid can be optionally lyophilized, and then the vial is sealed.

FIG. 2 illustrates one method of filling the vial assembly with a liquid, such as a medication. The vial assembly and components are illustrated in a cross-sectional view. The vial comprises a vial body 202, a vial neck 204, and an open base 206. The vial neck 204 includes a syringe interface configured to engage a threaded segment 208 of the vial cap 210. For example, in some embodiments the vial neck 204 comprises an outer surface that a threaded segment 212, as illustrated in FIGS. 1A-C. In some embodiments, the vial neck 204 comprises a female luer lock. The threaded vial neck or female luer lock can interface with a male luer lock (for example, on a syringe). In some embodiments, the inner portion of the vial neck 204 is tapered (that is, a bottom inner diameter proximal to the vial body is smaller than an upper inner diameter proximal to a vial opening). The vial cap 210 comprises the threaded segment 208 on the inside of a central opening of the vial cap 210. The threaded segment 208 is located on the bottom portion (that is, the portion proximal to the vial) of the vial cap 210. The vial cap 210 further comprises a plug 212, which attaches to the vial cap 210 at the top portion of the vial cap 210. Optionally, the outer surface of the vial cap 210 comprises a plurality of longitudinally disposed ribs, which can help provide traction when opening or closing the vial assembly.

The plug 212 comprises a stopper portion, a central body, a restraint, and a reduced diameter region defining an annulus between the central body and the restraint. The stopper portion of the plug 212 is disposed in the direction of the threaded segment of the vial cap and fits into the vial neck to form a seal. In some embodiments, the stopper portion is tapered (that is, a bottom inner diameter proximal to the vial body 202 is smaller than an upper inner diameter proximal to a vial opening). The central body is wider than the stopper portion, and can sit on the end of the vial neck 204 proximal to the vial opening. In some embodiments, the central body comprises a plurality of lateral compression ridges, which can aid in sealing the vial. The vial cap 210 comprises a rim 214 that extends into the annulus. The rim 214 can be formed, for example, by an aperture in the vial cap 210. The aperture can extend through the top of the vial cap 210, or the aperture can be internal in the bottle cap 210. In some embodiments, the rim 214 comprises a plurality of prongs. The restraint locks the plug 212 into bottle cap 210 by extending over the rim 214 and holding the rim 214 in the annulus.

The restraint can be shaped to allow unidirectional movement, for example by having a narrower top and a wider base. For example, in some embodiments, the restraint is domed shaped. In some embodiments, the restraint comprises a beveled rim such that the top of the restraint is narrower than the base of the restraint. The rim that extends into the annulus can optionally comprise an angled edge. For example, the rim can comprise an angled edge such that the bottom edge of the rim is shorter than the top edge. In some embodiments, the rim comprises an angled edge such that a top portion or a bottom portion of the rim is beveled. The angled edge can be used alone or in combination with the restraint shaped to allow unidirectional movement to facilitate attachment of the plug into the vial cap.

In some embodiments, the vial cap is attached the vial by attaching the plug to vial cap and screwing the vial cap on to the vial neck. In some embodiments, the plug 21 is attached to the vial cap prior to fitting the stopper portion of the plug into the vial neck. In some embodiments, the stopper portion of the plug is fit into the vial neck prior to screwing the vial cap onto the vial neck, thereby positioning the rim of the vial cap into the annulus of the stopper.

A liquid 216 (such as a liquid medication) is dispensed into the vial body 202 through the open base 206. The vial is filled vial cap 102 side down (i.e., the assembly is inverted) so that the liquid is retained in the vial body 202. Optionally, the liquid 216 is lyophilized, thereby forming a powder 218. Lyophilization can occur, for example, by freezing the liquid and exerting a vacuum pressure. Fluid can sublime or evaporate, and flow out of the open base 206. The open base 206 is then sealed, (for example with a laminate 220, such as a thermoformed plastic or a foil, which can be heated to form the seal). In some embodiments, the vial is sealed under vacuum pressure. In some embodiments, the vial is sealed under ambient pressure.

In some embodiments, the liquid is dispensed into the vial via the vial neck. In such an embodiment, the vial body does not comprise the open base, but the liquid is dispensed into the vial prior to attaching the vial cap. In some embodiments, the liquid is lyophilized prior to attaching the vial cap.

A user can fill a syringe by detaching the vial cap from the vial (for example, by unscrewing the vial cap), attaching the syringe to the syringe interface of the vial neck, and drawing liquid contained within the vial into the syringe. In some embodiments, unscrewing the vial cap comprises severing a tamper-evident band. The syringe can comprise a male luer, which can interface with the syringe interface (which may comprise, for example, threading on the outer surface of the vial neck or a female luer). In some embodiments, the syringe is pre-filled with a liquid, and that liquid is dispensed into the vial after attaching the syringe to the vial neck. If a powder is contained within the vial, for example, the liquid from the pre-filled syringe can be used to suspend or dissolve the powder before the liquid is drawn into the syringe. In some embodiments, the vial contains a first liquid, and the syringe can be pre-filled with a second liquid. The second liquid can be dispensed into the vial and mix with the first liquid before the mixture is drawn from the vial by the syringe.

In some embodiments, a method of filling a syringe comprises detaching a vial cap (for example, unscrewing the vial cap) from a vial, the vial having a vial body and a vial neck, the vial neck having a syringe interface; and the vial cap having a central opening including a threaded segment that engages the syringe interface and a plug, said plug having a lower stopper portion that fits within the vial neck and an upper portion that attaches to an upper portion of the vial cap; attaching a syringe to the vial neck; and drawing a liquid contained within the vial into the syringe. In some embodiments, the vial neck has a tapered inner surface. In some embodiments, the syringe interface is a female luer. In some embodiments, the syringe interface is a second threaded segment on the outer surface of the vial neck. In some embodiments, the syringe comprises a male luer lock that interfaces with the syringe interface. In some embodiments, detaching the vial cap includes severing a tamper-evident band from the vial cap. In some embodiments, the method further comprises dispensing a liquid (which may be contained within the syringe) into the vial.

In some embodiments, a method of filling a syringe comprises detaching a vial cap (for example, unscrewing the vial cap) from a vial, the vial having a vial body and a vial neck, the vial neck having a syringe interface; and the vial cap having a central opening including a threaded segment that engages the syringe interface and a coextruded plug disposed with in the central opening, said plug having a lower stopper portion that fits within the vial neck and an upper portion that attaches to an upper portion of the vial cap; attaching a syringe to the vial neck; and drawing a liquid contained within the vial into the syringe. In some embodiments, the vial neck has a tapered inner surface. In some embodiments, the syringe interface is a female luer. In some embodiments, the syringe interface is a second threaded segment on the outer surface of the vial neck. In some embodiments, the syringe comprises a male luer lock that interfaces with the syringe interface. In some embodiments, detaching the vial cap includes severing a tamper-evident band from the vial cap. In some embodiments, the method further comprises dispensing a liquid (which may be contained within the syringe) into the vial.

In some embodiments, a method of filling a syringe comprises detaching a vial cap (for example, unscrewing the vial cap) from a vial, the vial having a vial body and a vial neck, the vial neck having a syringe interface; and the vial cap having a central opening including a threaded segment that engages the syringe interface and a rim, said vial cap carrying a plug in the central opening, said plug having a lower stopper portion that fits within the vial neck, and an upper portion including a top portion defining a restraint coupled to a reduced diameter region defining an annulus, wherein the rim of the vial cap extends into the annulus to hold the plug in place; attaching a syringe to the vial neck; and drawing a liquid contained within the vial into the syringe. In some embodiments, the vial neck has a tapered inner surface. In some embodiments, the syringe interface is a female luer. In some embodiments, the syringe interface is a second threaded segment on the outer surface of the vial neck. In some embodiments, the syringe comprises a male luer lock that interfaces with the syringe interface. In some embodiments, detaching the vial cap includes severing a tamper-evident band from the vial cap. In some embodiments, the method further comprises dispensing a liquid (which may be contained within the syringe) into the vial.

In some embodiments, a method of filling a syringe comprises detaching a vial cap (for example, unscrewing the vial cap) from a vial, the vial having a vial body and a vial neck, the vial neck having a syringe interface; and the vial cap having a central opening including a threaded segment that engages the syringe interface and a rim, said vial cap carrying a plug in the central opening, said plug having a lower stopper portion that fits within the vial neck, and an upper portion including a top portion defining a restraint coupled to a reduced diameter region defining an annulus, wherein the rim of the vial cap extends into the annulus to hold the plug in place; attaching a syringe to the vial neck; and drawing a liquid contained within the vial into the syringe. In some embodiments, the vial neck has a tapered inner surface. In some embodiments, the syringe interface is a female luer. In some embodiments, the syringe interface is a second threaded segment on the outer surface of the vial neck. In some embodiments, the syringe comprises a male luer lock that interfaces with the syringe interface. In some embodiments, detaching the vial cap includes severing a tamper-evident band from the vial cap. In some embodiments, the method further comprises dispensing a liquid (which may be contained within the syringe) into the vial.

In some embodiments, a method of filling a syringe comprises detaching a vial cap (for example, unscrewing the vial cap) from a vial, the vial having a vial body and a vial neck, the vial neck having a syringe interface; and the vial cap having a central opening including a threaded segment that engages the syringe interface and a rim, said vial cap carrying a plug in the central opening, said plug having a lower stopper portion that fits within the vial neck, a central body with a diameter wider than the lower stopper portion (the central body optionally including a plurality of compression ridges), and an upper portion including a top portion defining a restraint (which can have a domed surface or a beveled rim) coupled to a reduced diameter region defining an annulus, wherein the rim of the vial cap extends into the annulus to hold the plug in place; attaching a syringe to the vial neck; and drawing a liquid contained within the vial into the syringe. In some embodiments, the vial neck has a tapered inner surface. In some embodiments, the syringe interface is a female luer. In some embodiments, the syringe interface is a second threaded segment on the outer surface of the vial neck. In some embodiments, the syringe comprises a male luer lock that interfaces with the syringe interface. In some embodiments, detaching the vial cap includes severing a tamper-evident band from the vial cap. In some embodiments, the method further comprises dispensing a liquid (which may be contained within the syringe) into the vial.

In another aspect, the vial assembly includes a vial and a two-component vial cap. The first component can screw on to a syringe interface, and the second component can attach to the first component using a downward motion (i.e., without the need to screw the second component onto the vial to seal the vial). This design allows for vials to be sealed on machinery that is not equipped for twisting on a vial cap.

In some embodiments, vial assembly comprises a vial having a vial body and a vial neck, the vial neck having a syringe interface; and a vial cap comprising a first component and a second component, said first component having an internal threaded segment that engages the syringe interface and an outer surface comprising a plurality of longitudinally extending ribs separated by a plurality of longitudinally extending channels, said second component including a plurality of longitudinally extending prongs that engage with a surface in the channels on the outer surface of the first component, said second component further including a central opening formed by the plurality of longitudinally extending prongs, and a plug disposed in the central opening, said plug having a lower stopper portion that fits within the vial neck and an upper portion that attaches to an upper portion of the second component. In some embodiments, the vial neck is tapered. In some embodiments, the syringe interface is a second threaded segment on an outer surface of the vial neck. In some embodiments, the syringe interface is a female luer. In some embodiments, the vial assembly comprises a tamper-evident band.

In some embodiments, vial assembly comprises a vial having a vial body and a vial neck, the vial neck having a syringe interface; and a vial cap comprising a first component and a second component, said first component having an internal threaded segment that engages the syringe interface and an outer surface comprising a plurality of longitudinally extending ribs separated by a plurality of longitudinally extending channels, said second component including a plurality of longitudinally extending prongs that engage with a surface in the channels on the outer surface of the first component, said second component further including a central opening formed by the plurality of longitudinally extending prongs, and a coextruded plug disposed in the central opening, said plug having a lower stopper portion that fits within the vial neck and an upper portion that attaches to an upper portion of the second component. In some embodiments, the vial neck is tapered. In some embodiments, the syringe interface is a second threaded segment on an outer surface of the vial neck. In some embodiments, the syringe interface is a female luer. In some embodiments, the vial assembly comprises a tamper-evident band.

In some embodiments, vial assembly comprises a vial having a vial body and a vial neck, the vial neck having a syringe interface; and a vial cap comprising a first component and a second component, said first component having an internal threaded segment that engages the syringe interface and an outer surface comprising a plurality of longitudinally extending ribs separated by a plurality of longitudinally extending channels, said second component including a plurality of longitudinally extending prongs that engage with a surface in the channels on the outer surface of the first component, said second component further including a central opening formed by the plurality of longitudinally extending prongs and a rim, said vial cap carrying a plug in the central opening, said plug having a lower stopper portion that fits within the vial neck and an upper portion that includes a top portion defining a restraint coupled to a reduced diameter region defining an annulus, and wherein the rim of the second component extends into the annulus to hold the plug in place. In some embodiments, the vial neck is tapered. In some embodiments, the syringe interface is a second threaded segment on an outer surface of the vial neck. In some embodiments, the syringe interface is a female luer. In some embodiments, the vial assembly comprises a tamper-evident band.

In some embodiments, vial assembly comprises a vial having a vial body and a vial neck, the vial neck having a syringe interface; and a vial cap comprising a first component and a second component, said first component having an internal threaded segment that engages the syringe interface and an outer surface comprising a plurality of longitudinally extending ribs separated by a plurality of longitudinally extending channels, said second component including a plurality of longitudinally extending prongs that engage with a surface in the channels on the outer surface of the first component, said second component further including a central opening formed by the plurality of longitudinally extending prongs and a rim, said vial cap carrying a plug in the central opening, said plug having a lower stopper portion that fits within the vial neck, a central body with a diameter wider than the lower stopper portion (the central body optionally including a plurality of compression ridges), and an upper portion that includes a top portion defining a restraint (which can optionally have a domed surface or a beveled rim) coupled to a reduced diameter region defining an annulus, and wherein the rim of the second component extends into the annulus to hold the plug in place. In some embodiments, the vial neck is tapered. In some embodiments, the syringe interface is a second threaded segment on an outer surface of the vial neck. In some embodiments, the syringe interface is a female luer. In some embodiments, the vial assembly comprises a tamper-evident band.

In some embodiments, vial assembly comprises a vial having a vial body and a vial neck, the vial neck having a syringe interface; and a vial cap comprising a first component and a second component, said first component having an internal threaded segment that engages the syringe interface and an outer surface comprising a plurality of longitudinally extending ribs separated by a plurality of longitudinally extending channels, said second component including a plurality of longitudinally extending prongs, the prongs comprising an anchor that engages with a counter-anchor in the channels on the outer surface of the first component, said second component further including a central opening formed by the plurality of longitudinally extending prongs and a rim, said vial cap carrying a plug in the central opening, said plug having a lower stopper portion that fits within the vial neck, a central body with a diameter wider than the lower stopper portion (the central body optionally including a plurality of compression ridges), and an upper portion that includes a top portion defining a restraint (which can optionally have a domed surface or a beveled rim) coupled to a reduced diameter region defining an annulus, and wherein the rim of the second component extends into the annulus to hold the plug in place. In some embodiments, the vial neck is tapered. In some embodiments, the syringe interface is a second threaded segment on an outer surface of the vial neck. In some embodiments, the syringe interface is a female luer. In some embodiments, the vial assembly comprises a tamper-evident band.

Figure 3A:
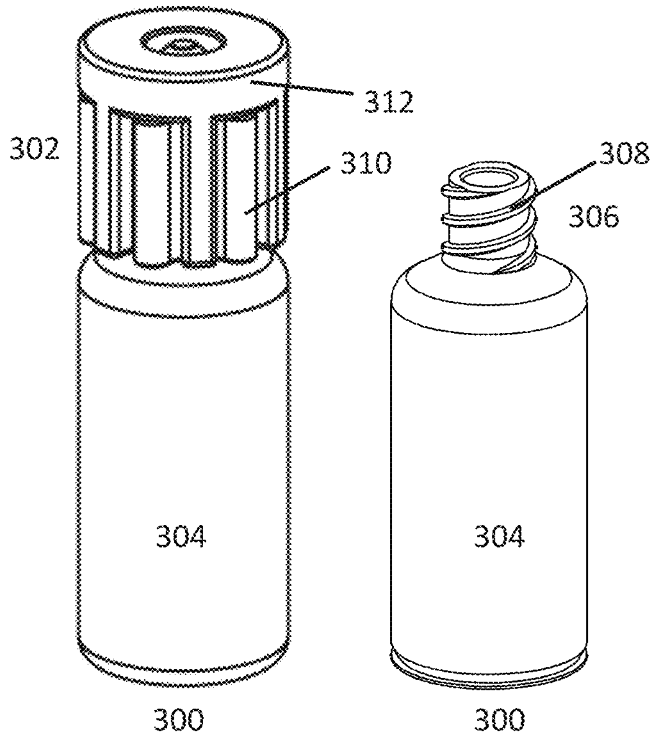
FIG. 3A illustrates another exemplary vial assembly comprising a vial and a vial cap next to a vial without the vial cap. The vial cap includes a first component and a second component.
Figure 3B:
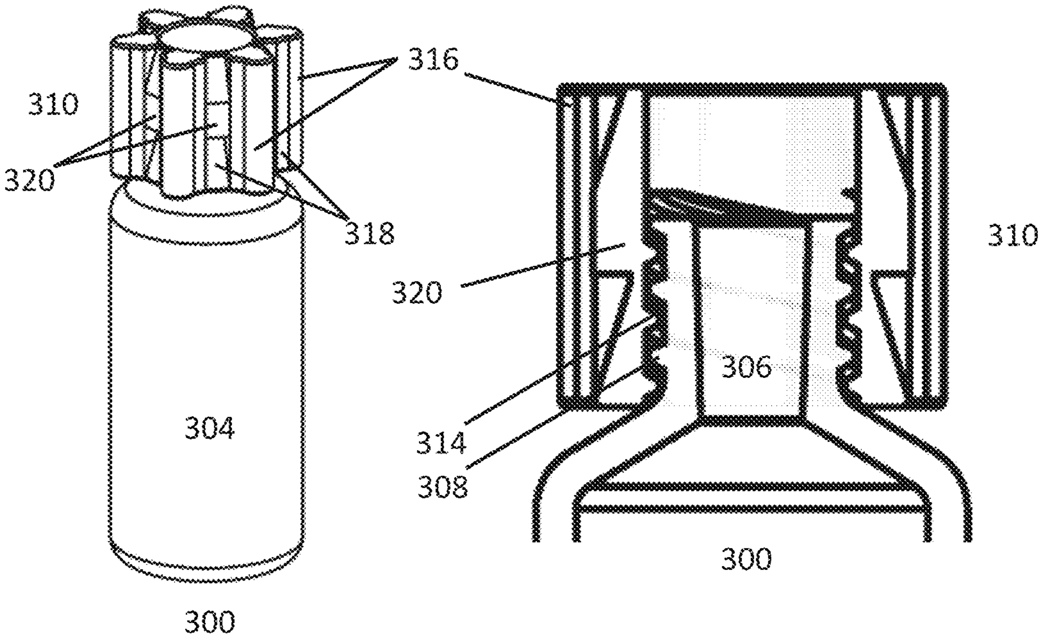
FIG. 3B illustrates the first component of an exemplary vial cap attached to a vial, along with a close-up cross-sectional view of the first component attached to the vial.

FIG. 3A illustrates an exemplary vial assembly comprising a vial 300 and a vial cap 302 next to a vial 300 without the vial cap. The vial comprises a vial body 304 and a vial neck 306. The vial body can contain a liquid or a powder (which can be, for example, formed by lyophilizing a liquid). The vial neck 306 includes a syringe interface configured to engage a threaded segment of the vial cap. For example, in some embodiments the vial neck 306 comprises an outer surface that includes a threaded segment 308, as illustrated in FIG. 3A. In some embodiments, the vial neck 306 comprises a female luer lock. The threaded vial neck or female luer lock can interface with a male luer (for example, a male luer lock or male slip tip on a syringe). In some embodiments, the inner portion of the vial neck 306 is tapered (that is, a bottom inner diameter proximal to the vial body is smaller than an upper inner diameter proximal to a vial opening). The vial cap 302 comprises a first component 310 and a second component 312. The first component 310 attached to the vial 300 is illustrated in FIG. 3B, along with a close-up cross sectional view of the first component 310 attached to the vial 300. The first component 310 comprises a threaded segment 314 on the surface of a central opening. The threaded segment 314 is located on the bottom portion of the first component 310. The first component 310 further comprises a plurality of longitudinally disposed ribs 316 along the outer surface of the first component 310. A plurality of longitudinally disposed channels 318 is disposed between the ribs 316 on the outer surface of the first component 310. In some embodiments, a counter-anchor 320 is disposed in one or more channels in the plurality of channels 318.

Figure 3C:
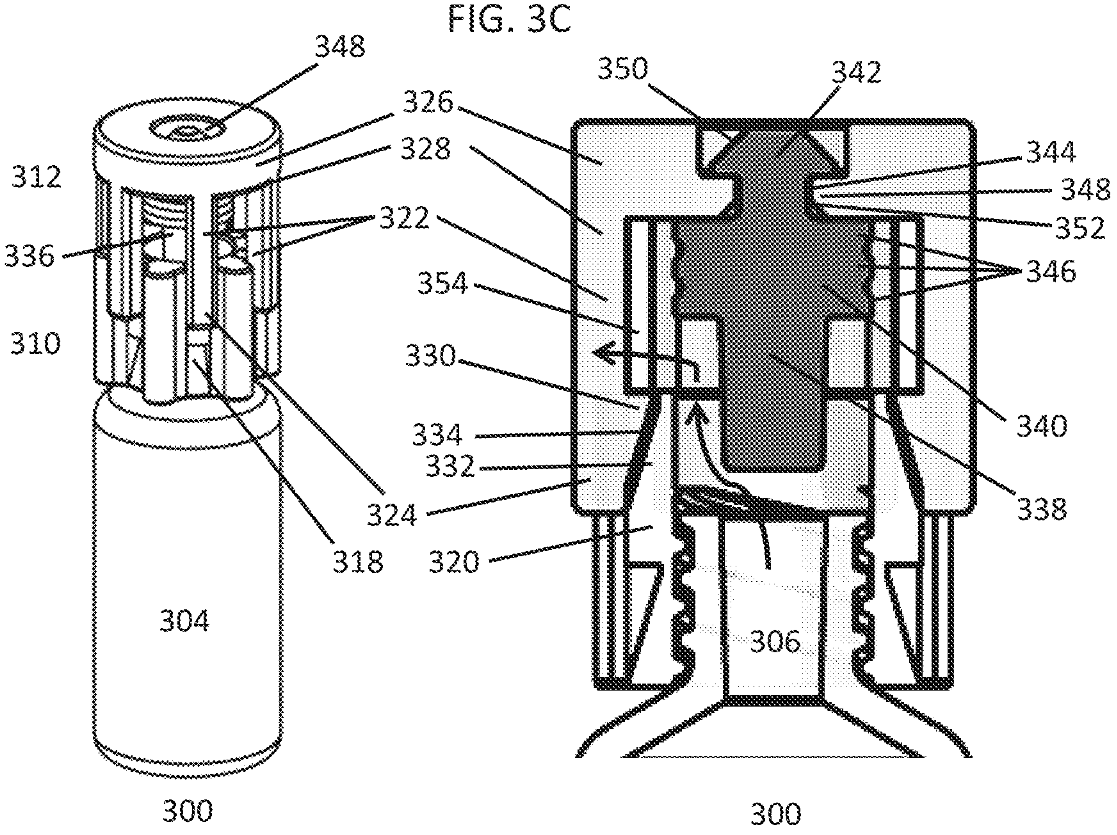
FIG. 3C illustrates the second component of an exemplary vial cap attached to the first component of the vial cap in an unsealed configuration. The second component sits on top of the first component. Also illustrated in FIG. 3C is a close-up cross-sectional view of the vial cap in the unsealed configuration.

FIG. 3C illustrates the second component 312 of the vial cap 302 disposed in an unsealed configuration, wherein the second component 312 is sitting on top of the first component 310. FIG. 3C also illustrates a close-up cross-sectional view of the vial cap 302 disposed in the unsealed configuration. The second component 312 comprises a plurality of longitudinally disposed prongs 322 configured to engage the plurality of channels 318 in the first component 310. The prongs 322 form a central opening of the second component 312. The prongs 322 have a free lower end 324 and attach to a top 326 at the upper end 328 of the prongs. In some embodiments, the prongs 322 comprise an anchor 330. In some embodiments, when the vial cap 302 is in the unsealed configuration, the anchor 330 sits above the counter anchor 320 in the channel 318. In some embodiments, the counter anchor 320 has a sloped upper portion 332 that interfaces with a sloped lower portion 334 on the anchor 330. The second component 312 further comprises a plug 336 disposed in the central opening. The plug 336 comprises a stopper portion 338, a central body 340, a restraint 342, and a reduced diameter region defining an annulus 344 between the central body 340 and the restraint 342. The stopper portion 338 of the plug is disposed in the direction of the plurality of prongs 322. In some embodiments, the stopper portion 338 is tapered (that is, a bottom diameter is smaller than an upper diameter). The central body 340 is wider than the stopper portion 338. In some embodiments, the central body 340 comprises a plurality of lateral compression ridges 346, which can aid in sealing the vial. The second component 312 comprises a rim 348 that extends into the annulus 344 of the stopper 336. The rim 348 can be formed, for example, by an aperture in the second component 312. The aperture can extend through the top 326 of the second component 312, or the aperture can be internal in the second component. In some embodiments, the rim 348 comprises a plurality of prongs. The restraint 342 locks the plug into second component 312 once attached by extending over the rim 348 and holding the rim 348 in the annulus 344.

The restraint 342 can be shaped to allow unidirectional movement, for example by having a narrower top and a wider base. For example, in some embodiments, the restraint 342 is domed shaped. In some embodiments, the restraint 342 comprises a beveled rim 350 such that the top of the restraint 342 is narrower than the base of the restraint 342. The rim 348 that extends into the annulus 344 can optionally comprise an angled edge 352. For example, the rim 348 can comprise an angled edge 352 such that the bottom edge of the rim 348 is shorter than the top edge. In some embodiments, the rim 348 comprises an angled edge 352 such that a top portion or a bottom portion of the rim 348 is beveled. In the cap illustrated in FIG. 3C, the bottom portion of the rim 348 is beveled, thereby forming the angled edge 352. The angled edge 352 can be used alone or in combination with the restraint 342 shaped to allow unidirectional movement to facilitate attachment of the plug 336 into the second component 312 of the vial cap 302.

When the second component 312 of the vial cap 302 is disposed in the unsealed configuration, the vial body is fluidly connected to the ambient environment. As depicted by the arrows in FIG. 3C, evaporating or subliming fluids (for example, during lyophilization) can flow through the vial neck 306, through the upper portion of the first component 310 and around the stopper portion 338 of the plug 336, and out to the ambient environment in vents 354 that form between the prongs 322 in the second component 312.

Figure 3D:
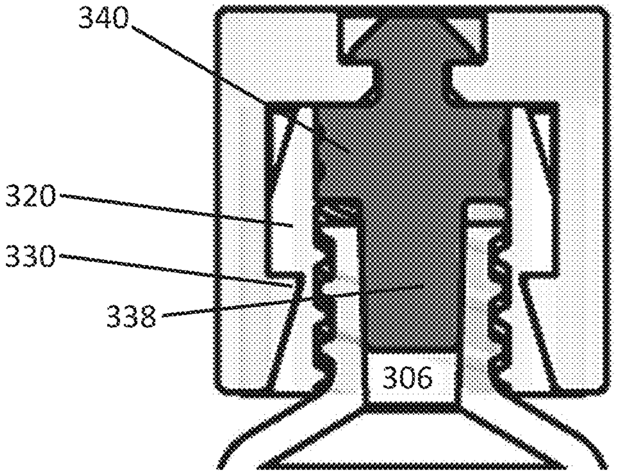
FIG. 3D illustrates a cross-sectional view of an exemplary vial cap having a first component and a second component in a sealed configuration.

The second component 312 of the vial cap 302 can be pressed down towards the vial 300 to position the vial cap 302 in a sealed configuration, as illustrated in FIG. 3A. A cross-sectional view of the vial cap 302 in the sealed configuration is illustrated in FIG. 3D. In the sealed configuration, the stopper portion 338 of the plug 336 fits into the vial neck 306, forming a seal. The central body 340 sits against the end of the vial neck 306 proximal to the vial opening. The anchors 330 on the prongs 322 can engage the bottom of the counter-anchors 320 in the channels 318. Once the anchors 330 engage the counter-anchors 320, the second component 312 is irreversibly attached to the first component 310.

Figure 3E:
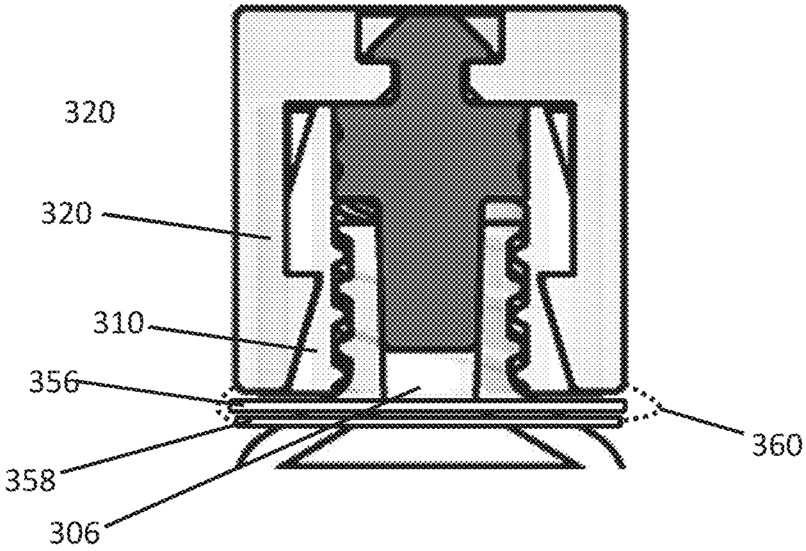
FIG. 3E illustrates a cross-sectional view of an exemplary vial cap having a first component and a second component in a sealed configuration with a tamper-evident band.

In some embodiments, the vial assembly comprises a tamper-evident band (FIG. 3E). For example, in some embodiments, the vial comprises an annular lip 356 disposed on the outer surface of the vial neck 306. The annular lip 356 is disposed on the proximal end of the vial neck 306 (i.e., closer to the vial body than the vial opening). The tamper-evident band 358 is attached to the vial cap 302 (for example, on the bottom of the first component 310 or the second component 320) and wraps below the annular lip 356 on the vial neck 306. The tamper-evident band 358 can be attached to the vial cap 302 by a perforated segment 360. When the vial cap 302 is separated from the vial 300, the annular lip on the vial neck 306 retains the tamper-evident band and the perforated segment is torn, thereby separating the tamper-evident band from the vial cap 302. This separation indicates that the vial cap 302 has been opened.

The vial 300 can be filled with a liquid (for example, a liquid medication) from either vial neck 306 opening or from the base of the vial body 302. That is, in some embodiments, the vial body 304 comprises an open base 328, which can be sealed after a liquid is dispensed in the vial (for example using a thermoformed plastic or foil). When dispensing liquid into the vial 300 through the open base, the assembled vial cap 302 (that is, the first component 310 and the second component 312 in the sealed configuration) is attached to the vial 300 prior to dispensing the liquid into the vial 300.

In some embodiments, a method of filling a vial assembly comprises dispensing a liquid into a vial comprising a vial body and a vial neck, the vial neck having a syringe interface; attaching a first component of a vial cap to the vial neck, said first component having an internal threaded segment that engages the syringe interface and an outer surface comprising a plurality of longitudinally extending ribs separated by a plurality of longitudinally extending channels; and sealing the vial by attaching a second component of the vial cap to the first component, said second component including a plurality of longitudinally extending prongs that engage with a surface in the channels on the outer surface of the first component, said second component further including a central opening formed by the plurality of longitudinally extending prongs and a plug disposed in the central opening, said plug having a lower stopper portion that fits within the vial neck and an upper portion that attaches to an upper portion of the second component. In some embodiments, the vial neck is tapered. In some embodiments, the syringe interface is a second threaded segment on an outer surface of the vial neck. In some embodiments, the syringe interface is a female luer. In some embodiments, the liquid is dispensed into the vial prior to attaching the first component to the vial neck, and in some embodiments, the first component is attached to the vial neck prior to dispensing the liquid into the vial. In some embodiments, the liquid is lyophilized prior to sealing the vial.

In some embodiments, a method of filling a vial assembly comprises dispensing a liquid into a vial comprising a vial body and a vial neck, the vial neck having a syringe interface; attaching a first component of a vial cap to the vial neck, said first component having an internal threaded segment that engages the syringe interface and an outer surface comprising a plurality of longitudinally extending ribs separated by a plurality of longitudinally extending channels; and sealing the vial by attaching a second component of the vial cap to the first component, said second component including a plurality of longitudinally extending prongs that engage with a surface in the channels on the outer surface of the first component, said second component further including a central opening formed by the plurality of longitudinally extending prongs and a coextruded plug disposed in the central opening, said plug having a lower stopper portion that fits within the vial neck and an upper portion that attaches to an upper portion of the second component. In some embodiments, the vial neck is tapered. In some embodiments, the syringe interface is a second threaded segment on an outer surface of the vial neck. In some embodiments, the syringe interface is a female luer. In some embodiments, the liquid is dispensed into the vial prior to attaching the first component to the vial neck, and in some embodiments, the first component is attached to the vial neck prior to dispensing the liquid into the vial. In some embodiments, the liquid is lyophilized prior to sealing the vial.

In some embodiments, a method of filling a vial assembly comprises dispensing a liquid into a vial comprising a vial body and a vial neck, the vial neck having a syringe interface; attaching a first component of a vial cap to the vial neck, said first component having an internal threaded segment that engages the syringe interface and an outer surface comprising a plurality of longitudinally extending ribs separated by a plurality of longitudinally extending channels; and sealing the vial by attaching a second component of the vial cap to the first component, said second component including a plurality of longitudinally extending prongs that engage with a surface in the channels on the outer surface of the first component, said second component further including a central opening formed by the plurality of longitudinally extending prongs and a rim, said vial cap carrying a plug in the central opening, said plug having a lower stopper portion that fits within the vial neck and an upper portion that includes a top portion defining a restraint coupled to a reduced diameter region defining an annulus, and wherein the rim of the second component extends into the annulus to hold the plug in place. In some embodiments, the vial neck is tapered. In some embodiments, the syringe interface is a second threaded segment on an outer surface of the vial neck. In some embodiments, the syringe interface is a female luer. In some embodiments, the liquid is dispensed into the vial prior to attaching the first component to the vial neck, and in some embodiments, the first component is attached to the vial neck prior to dispensing the liquid into the vial. In some embodiments, the liquid is lyophilized prior to sealing the vial.

In some embodiments, a method of filling a vial assembly comprises dispensing a liquid into a vial comprising a vial body and a vial neck, the vial neck having a syringe interface; attaching a first component of a vial cap to the vial neck, said first component having an internal threaded segment that engages the syringe interface and an outer surface comprising a plurality of longitudinally extending ribs separated by a plurality of longitudinally extending channels; and sealing the vial by attaching a second component of the vial cap to the first component, said second component including a plurality of longitudinally extending prongs that engage with a surface in the channels on the outer surface of the first component, said second component further including a central opening formed by the plurality of longitudinally extending prongs and a rim, said vial cap carrying a plug in the central opening, said plug having a lower stopper portion that fits within the vial neck, a central body with a diameter wider than the lower stopper portion (the central body optionally including a plurality of compression ridges), and an upper portion that includes a top portion defining a restraint (which can optionally have a domed surface or a beveled rim) coupled to a reduced diameter region defining an annulus, and wherein the rim of the second component extends into the annulus to hold the plug in place. In some embodiments, the vial neck is tapered. In some embodiments, the syringe interface is a second threaded segment on an outer surface of the vial neck. In some embodiments, the syringe interface is a female luer. In some embodiments, the liquid is dispensed into the vial prior to attaching the first component to the vial neck, and in some embodiments, the first component is attached to the vial neck prior to dispensing the liquid into the vial. In some embodiments, the liquid is lyophilized prior to sealing the vial.

In some embodiments, a method of filling a vial assembly comprises dispensing a liquid into a vial comprising a vial body and a vial neck, the vial neck having a syringe interface; attaching a first component of a vial cap to the vial neck, said first component having an internal threaded segment that engages the syringe interface and an outer surface comprising a plurality of longitudinally extending ribs separated by a plurality of longitudinally extending channels; and sealing the vial by attaching a second component of the vial cap to the first component, said second component including a plurality of longitudinally extending prongs that engage with a surface in the channels on the outer surface of the first component, said second component further including a central opening formed by the plurality of longitudinally extending prongs and a rim, said vial cap carrying a plug in the central opening, said plug having a lower stopper portion that fits within the vial neck, a central body with a diameter wider than the lower stopper portion (the central body optionally including a plurality of compression ridges), and an upper portion that includes a top portion defining a restraint (which can optionally have a domed surface or a beveled rim) coupled to a reduced diameter region defining an annulus, and wherein the rim of the second component extends into the annulus to hold the plug in place, wherein sealing the vial includes engaging an anchor on at least one of the prongs in the plurality of longitudinally disposed prongs with a counter-anchor disposed in a channel in the plurality of longitudinally disposed channels. In some embodiments, the vial neck is tapered. In some embodiments, the syringe interface is a second threaded segment on an outer surface of the vial neck. In some embodiments, the syringe interface is a female luer. In some embodiments, the liquid is dispensed into the vial prior to attaching the first component to the vial neck, and in some embodiments, the first component is attached to the vial neck prior to dispensing the liquid into the vial. In some embodiments, the liquid is lyophilized prior to sealing the vial.

Figure 4:
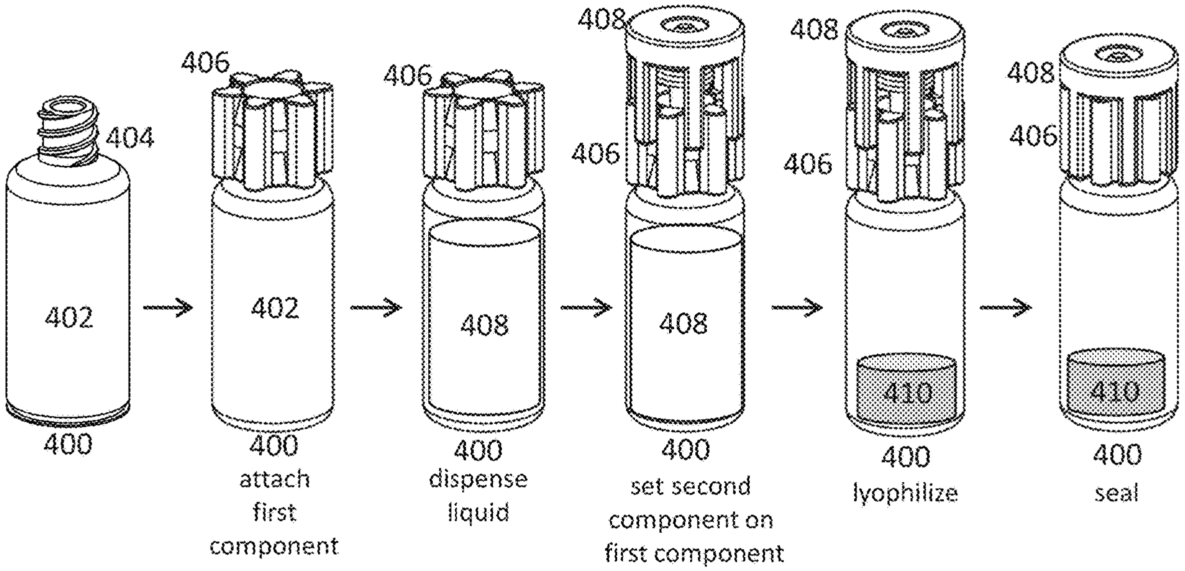
FIG. 4 illustrates one embodiment of a method for filling a vial assembly comprising a vial cap with a first component and a second component.

In some embodiments, the vial is filled with a liquid via the vial neck. FIG. 4 illustrates one embodiment of a method for filling a vial assembly comprising a vial cap with a first component and a second component. The vial 400 comprises a vial body 402 and a vial neck 404. The vial neck 404 includes a syringe interface configured to engage a threaded segment on an inner central opening of the first component 406 of the vial cap. For example, in some embodiments the vial neck 404 comprises an outer surface that a threaded segment, as illustrated in FIGS. 3A-D. In some embodiments, the vial neck 404 comprises a female luer lock. The threaded vial neck or female luer lock can interface with a male luer lock (for example, on a syringe). In some embodiments, the inner portion of the vial neck 404 is tapered (that is, a bottom inner diameter proximal to the vial body is smaller than an upper inner diameter proximal to a vial opening). The first component 406 of the vial cap comprises a threaded segment on bottom portion of its inner surface, which can engage with the syringe interface on the vial neck 404. The first component 406 is attached to the vial neck 404 (for example, by screwing the first component 406 onto the vial neck 404) and a liquid 408 is dispensed into the vial 400. In some embodiments, the first component 406 is attached to the vial neck 404 (for example, by screwing the first component 406 onto the vial neck 404) prior to dispensing the liquid 408 into the vial 400. In some embodiments, the liquid 408 is dispensed into the vial 400 prior to attaching the first component 406 onto the vial neck 404 (for example, by screwing the first component 406 onto the vial neck 404).

The vial can be sealed by attaching the second component 408 to the first component 406. The second component 408 comprises a plurality of longitudinally disposed prongs configured to engage a plurality of channels on the outer surface of the first component 406. The channels are disposed between a ridges present on the outer surface of the first component 406. The prongs have a free lower end and attach to a top at the upper end of the prongs. In some embodiments, the prongs comprise an anchor that can engage a counter-anchor disposed in a channel in the plurality of channels. Once the anchors engage the lip disposed in the channels, the second component is irreversibly attached to the first component. The second component 408 can be positioned proximal to the first component 406 such that the plurality of prongs is partially engaged with the plurality of channels. A downward pressure can then be exerted on the second component 408, thereby fully engaging the plurality of prongs with the plurality of channels, and (if present), engaging the anchors on the prongs with the counter-anchors disposed in the channels.

The second component 408 further comprises a plug that seals the neck vial 404 when the second component 408 is attached to the first component 406, and the first component is attached to the vial neck. The plug comprises a lower stopper portion, a central body, a restraint, and a reduced diameter region defining an annulus between the central body and the restraint. The stopper portion of the plug is disposed in the direction of the plurality of prongs. In some embodiments, the stopper portion is tapered (that is, a bottom diameter is smaller than an upper diameter). The central body is wider than the stopper portion. In some embodiments, the central body comprises a plurality of lateral compression ridges, which can aid in sealing the vial. The second component comprises a rim that extends into the annulus of the stopper. The rim can be formed, for example, by an aperture in the second component. The aperture can extend through the top of the second component, or the aperture can be internal in the second component. In some embodiments, the rim comprises a plurality of prongs. The restraint locks the plug into second component 408 once attached by extending over the rim and holding the rim in the annulus. In some embodiments, the plug is attached to the second component 408, for example by pushing the restraint of the plug through the aperture forming the rim.

In some embodiments, the second component 408 is partially engaged with the first component 406 prior to sealing the vial. That is, in some embodiments, the vial cap is configured in an unsealed configuration, for example by setting the second component on the first component wherein the plurality of legs is partially engaged with the plurality of channels. In some embodiments, when the vial cap is in the unsealed configuration, the anchors on the prongs of the second component 408 sit above the counter anchors in the channels of the first components. In some embodiments, the counter anchor has a sloped upper portion that interfaces with a sloped lower portion on the anchor. When the vial cap is in the unsealed configuration, the liquid in the vial is fluidly connected to the atmospheric environment. Optionally, the liquid 408 in the vial is lyophilized when the cap is in the unsealed configuration, thereby forming a powder 410. Lyophilization can occur, for example, by freezing the liquid and exerting a vacuum pressure. The vial can then be sealed after lyophilization. Lyophilization can occur at any time during the process after dispensing the liquid into the vial and before sealing the vial. For example, the liquid can by lyophilized after dispensing the liquid and prior to attaching the first component to the vial neck, after attaching the first component to the vial neck and prior to partially engaging the second component with the first component, or after partially engaging the second component with the first component and prior to sealing the vial.

A user can fill a syringe by detaching (for example, by unscrewing) the vial cap comprising the first component and the second component from the vial, attaching the syringe to the syringe interface of the vial neck, and drawing liquid contained within the vial into the syringe. In some embodiments, unscrewing the vial cap comprises severing a tamper-evident band. The syringe can comprise a male luer, which can interface with the syringe interface (which may comprise, for example, threading on the outer surface of the vial neck or a female luer). In some embodiments, the syringe is pre-filled with a liquid, and that liquid is dispensed into the vial after attaching the syringe to the vial neck. If a powder is contained within the vial, for example, the liquid from the pre-filled syringe can be used to suspend or dissolve the powder before the liquid is drawn into the syringe. In some embodiments, the vial contains a first liquid, and the syringe can be pre-filled with a second liquid. The second liquid can be dispensed into the vial and mix with the first liquid before the mixture is drawn from the vial by the syringe.

In some embodiments, a method of filling a syringe comprises detaching (for example, by unscrewing) the vial cap from a vial, the vial having a vial body and a vial neck, the vial neck having a syringe interface; and the vial cap comprising a first component and a second component, said first component having an internal threaded segment that engages the syringe interface and an outer surface comprising a plurality of longitudinally extending ribs separated by a plurality of longitudinally extending channels, said second component including a plurality of longitudinally extending prongs that engage with a surface in the channels on the outer surface of the first component, said second component further including a central opening formed by the plurality of longitudinally extending prongs and a plug disposed therein, said plug having a lower stopper portion that fits within the vial neck and an upper portion that attaches to an upper portion of the second component; attaching a syringe (which can include a male luer, such as a male luer lock or a male luer slip) to the syringe interface of the vial neck; and drawing a liquid contained within the vial into the syringe. In some embodiments, the vial neck is tapered. In some embodiments, the syringe interface is a second threaded segment on an outer surface of the vial neck. In some embodiments, the syringe interface is a female luer. In some embodiments, the method further comprises dispensing a liquid into the vial to dissolve or suspending a lyophilized powder. In some embodiments, the liquid is contained within the syringe.

In some embodiments, a method of filling a syringe comprises detaching (for example, by unscrewing) the vial cap from a vial, the vial having a vial body and a vial neck, the vial neck having a syringe interface; and the vial cap comprising a first component and a second component, said first component having an internal threaded segment that engages the syringe interface and an outer surface comprising a plurality of longitudinally extending ribs separated by a plurality of longitudinally extending channels, said second component including a plurality of longitudinally extending prongs that engage with a surface in the channels on the outer surface of the first component, said second component further including a central opening formed by the plurality of longitudinally extending prongs and a coextruded plug disposed in the central opening, said plug having a lower stopper portion that fits within the vial neck and an upper portion that attaches to an upper portion of the second component; attaching a syringe (which can include a male luer, such as a male luer lock or a male luer slip) to the syringe interface of the vial neck; and drawing a liquid contained within the vial into the syringe. In some embodiments, the vial neck is tapered. In some embodiments, the syringe interface is a second threaded segment on an outer surface of the vial neck. In some embodiments, the syringe interface is a female luer. In some embodiments, the method further comprises dispensing a liquid into the vial to dissolve or suspending a lyophilized powder. In some embodiments, the liquid is contained within the syringe.

In some embodiments, a method of filling a syringe comprises detaching (for example, by unscrewing) the vial cap from a vial, the vial having a vial body and a vial neck, the vial neck having a syringe interface; and the vial cap comprising a first component and a second component, said first component having an internal threaded segment that engages the syringe interface and an outer surface comprising a plurality of longitudinally extending ribs separated by a plurality of longitudinally extending channels, said second component including a plurality of longitudinally extending prongs that engage with a surface in the channels on the outer surface of the first component, said second component further including a central opening formed by the plurality of longitudinally extending prongs and a rim, said vial cap carrying a plug in the central opening, said plug having a lower stopper portion that fits within the vial neck and an upper portion that includes a top portion defining a restraint coupled to a reduced diameter region defining an annulus, and wherein the rim of the second component extends into the annulus to hold the plug in place; attaching a syringe (which can include a male luer, such as a male luer lock or a male luer slip) to the syringe interface of the vial neck; and drawing a liquid contained within the vial into the syringe. In some embodiments, the vial neck is tapered. In some embodiments, the syringe interface is a second threaded segment on an outer surface of the vial neck. In some embodiments, the syringe interface is a female luer. In some embodiments, the method further comprises dispensing a liquid into the vial to dissolve or suspending a lyophilized powder. In some embodiments, the liquid is contained within the syringe.

In some embodiments, a method of filling a syringe comprises detaching (for example, by unscrewing) the vial cap from a vial, the vial having a vial body and a vial neck, the vial neck having a syringe interface; and the vial cap comprising a first component and a second component, said first component having an internal threaded segment that engages the syringe interface and an outer surface comprising a plurality of longitudinally extending ribs separated by a plurality of longitudinally extending channels, said second component including a plurality of longitudinally extending prongs that engage with a surface in the channels on the outer surface of the first component, said second component further including a central opening formed by the plurality of longitudinally extending prongs and a rim, said vial cap carrying a plug in the central opening, said plug having a lower stopper portion that fits within the vial neck, a central body with a diameter wider than the lower stopper portion (the central body optionally including a plurality of compression ridges), and an upper portion that includes a top portion defining a restraint (which can optionally have a domed surface or a beveled rim) coupled to a reduced diameter region defining an annulus, and wherein the rim of the second component extends into the annulus to hold the plug in place; attaching a syringe (which can include a male luer, such as a male luer lock or a male luer slip) to the syringe interface of the vial neck; and drawing a liquid contained within the vial into the syringe. In some embodiments, the vial neck is tapered. In some embodiments, the syringe interface is a second threaded segment on an outer surface of the vial neck. In some embodiments, the syringe interface is a female luer. In some embodiments, the method further comprises dispensing a liquid into the vial to dissolve or suspending a lyophilized powder. In some embodiments, the liquid is contained within the syringe.

In some embodiments, a method of filling a syringe comprises detaching (for example, by unscrewing) the vial cap from a vial, the vial having a vial body and a vial neck, the vial neck having a syringe interface; and the vial cap comprising a first component and a second component, said first component having an internal threaded segment that engages the syringe interface and an outer surface comprising a plurality of longitudinally extending ribs separated by a plurality of longitudinally extending channels, said second component including a plurality of longitudinally extending prongs, the prongs comprising an anchor that engages with a counter-anchor in the channels on the outer surface of the first component, said second component further including a central opening formed by the plurality of longitudinally extending prongs and a rim, said vial cap carrying a plug in the central opening, said plug having a lower stopper portion that fits within the vial neck, a central body with a diameter wider than the lower stopper portion (the central body optionally including a plurality of compression ridges), and an upper portion that includes a top portion defining a restraint (which can optionally have a domed surface or a beveled rim) coupled to a reduced diameter region defining an annulus, and wherein the rim of the second component extends into the annulus to hold the plug in place; attaching a syringe (which can include a male luer, such as a male luer lock or a male luer slip) to the syringe interface of the vial neck; and drawing a liquid contained within the vial into the syringe. In some embodiments, the vial neck is tapered. In some embodiments, the syringe interface is a second threaded segment on an outer surface of the vial neck. In some embodiments, the syringe interface is a female luer. In some embodiments, the method further comprises dispensing a liquid into the vial to dissolve or suspending a lyophilized powder. In some embodiments, the liquid is contained within the syringe.

In another aspect, there is provided a vial assembly comprising a vial having a vial body and a vial neck; an adapter comprising a top portion having a syringe interface, a bottom portion having a vial neck fitting attached to the vial neck, and a channel fluidly connecting the syringe interface to the vial neck; a gasket disposed between the vial neck and the adapter; and a vial cap having a central opening including a threaded segment that engages the syringe interface and a plug, said plug having a lower stopper portion that fits within the vial neck and an upper portion that attaches to an upper portion of the vial cap. In some embodiments, the vial cap comprises an end cap that surrounds a portion of the vial neck fitting. In some embodiments, the syringe interface is a tapered conduit. In some embodiments, the syringe interface is a second threated segment on an outer surface of a conduit. In some embodiments, the syringe interface is a female luer. In some embodiments, the vial assembly comprises a tamper-evident band.

In some embodiments, the vial assembly comprises a vial having a vial body and a vial neck; an adapter comprising a top portion having a syringe interface, a bottom portion having a vial neck fitting attached to the vial neck, and a channel fluidly connecting the syringe interface to the vial neck; a gasket disposed between the vial neck and the adapter; and a vial cap having a central opening including a threaded segment that engages the syringe interface and a coextruded plug, said plug having a lower stopper portion that fits within the vial neck and an upper portion that attaches to an upper portion of the vial cap. In some embodiments, the vial cap comprises an end cap that surrounds a portion of the vial neck fitting. In some embodiments, the syringe interface is a tapered conduit. In some embodiments, the syringe interface is a second threated segment on an outer surface of a conduit. In some embodiments, the syringe interface is a female luer. In some embodiments, the vial assembly comprises a tamper-evident band.

In some embodiments, the vial assembly comprises a vial having a vial body and a vial neck; an adapter comprising a top portion having a syringe interface, a bottom portion having a vial neck fitting attached to the vial neck, and a channel fluidly connecting the syringe interface to the vial neck; a gasket disposed between the vial neck and the adapter; and a vial cap having a central opening including a threaded segment that engages the syringe interface and a rim, said vial cap carrying a plug in the central opening, said plug having a lower stopper portion that fits within the vial neck, and an upper portion including a top portion defining a restraint coupled to a reduced diameter region defining an annulus, wherein the rim of the vial cap extends into the annulus to hold the plug in place. In some embodiments, the vial cap comprises an end cap that surrounds a portion of the vial neck fitting. In some embodiments, the syringe interface is a tapered conduit. In some embodiments, the syringe interface is a second threated segment on an outer surface of a conduit. In some embodiments, the syringe interface is a female luer. In some embodiments, the vial assembly comprises a tamper-evident band.

In some embodiments, the vial assembly comprises a vial having a vial body and a vial neck; an adapter comprising a top portion having a syringe interface, a bottom portion having a vial neck fitting attached to the vial neck, and a channel fluidly connecting the syringe interface to the vial neck; a gasket disposed between the vial neck and the adapter; and a vial cap having a central opening including a threaded segment that engages the syringe interface and a rim, said vial cap carrying a plug in the central opening, said plug having a lower stopper portion that fits within the vial neck, a central body with a diameter wider than the lower stopper portion (the central body optionally including a plurality of compression ridges), and an upper portion including a top portion defining a restraint (which can have a domed surface or a beveled rim) coupled to a reduced diameter region defining an annulus, wherein the rim of the vial cap extends into the annulus to hold the plug in place. In some embodiments, the vial cap comprises an end cap that surrounds a portion of the vial neck fitting. In some embodiments, the syringe interface is a tapered conduit. In some embodiments, the syringe interface is a second threated segment on an outer surface of a conduit. In some embodiments, the syringe interface is a female luer. In some embodiments, the vial assembly comprises a tamper-evident band.

In some embodiments, the vial assembly comprises a vial having a vial body and a vial neck; an adapter comprising a top portion having a syringe interface, a bottom portion having a vial neck fitting comprising a plurality of prongs comprising an anchor that engages an annular lip disposed on the vial neck, and a channel fluidly connecting the syringe interface to the vial neck; a gasket disposed between the vial neck and the adapter; and a vial cap having a central opening including a threaded segment that engages the syringe interface and a rim, said vial cap carrying a plug in the central opening, said plug having a lower stopper portion that fits within the vial neck, a central body with a diameter wider than the lower stopper portion (the central body optionally including a plurality of compression ridges), and an upper portion including a top portion defining a restraint (which can have a domed surface or a beveled rim) coupled to a reduced diameter region defining an annulus, wherein the rim of the vial cap extends into the annulus to hold the plug in place. In some embodiments, the vial cap comprises an end cap that surrounds a portion of the vial neck fitting. In some embodiments, the syringe interface is a tapered conduit. In some embodiments, the syringe interface is a second threated segment on an outer surface of a conduit. In some embodiments, the syringe interface is a female luer. In some embodiments, the vial assembly comprises a tamper-evident band.

In some embodiments, the vial assembly comprises a vial having a vial body and a vial neck; an adapter comprising a top portion having a syringe interface, a bottom portion having a vial neck fitting comprising a plurality of prongs comprising an anchor that engage an annular lip disposed on the vial neck, and a channel fluidly connecting the syringe interface to the vial neck; a gasket disposed along an inner edge of the vial neck fitting, proximal to a lateral disk joining the plurality of prongs, and proximal to an opening on the vial neck; and a vial cap having a central opening including a threaded segment that engages the syringe interface and a rim, said vial cap carrying a plug in the central opening, said plug having a lower stopper portion that fits within the vial neck, a central body with a diameter wider than the lower stopper portion (the central body optionally including a plurality of compression ridges), and an upper portion including a top portion defining a restraint (which can have a domed surface or a beveled rim) coupled to a reduced diameter region defining an annulus, wherein the rim of the vial cap extends into the annulus to hold the plug in place. In some embodiments, the vial cap comprises an end cap that surrounds a portion of the vial neck fitting. In some embodiments, the syringe interface is a tapered conduit. In some embodiments, the syringe interface is a second threated segment on an outer surface of a conduit. In some embodiments, the syringe interface is a female luer. In some embodiments, the vial assembly comprises a tamper-evident band.

Figure 5A:
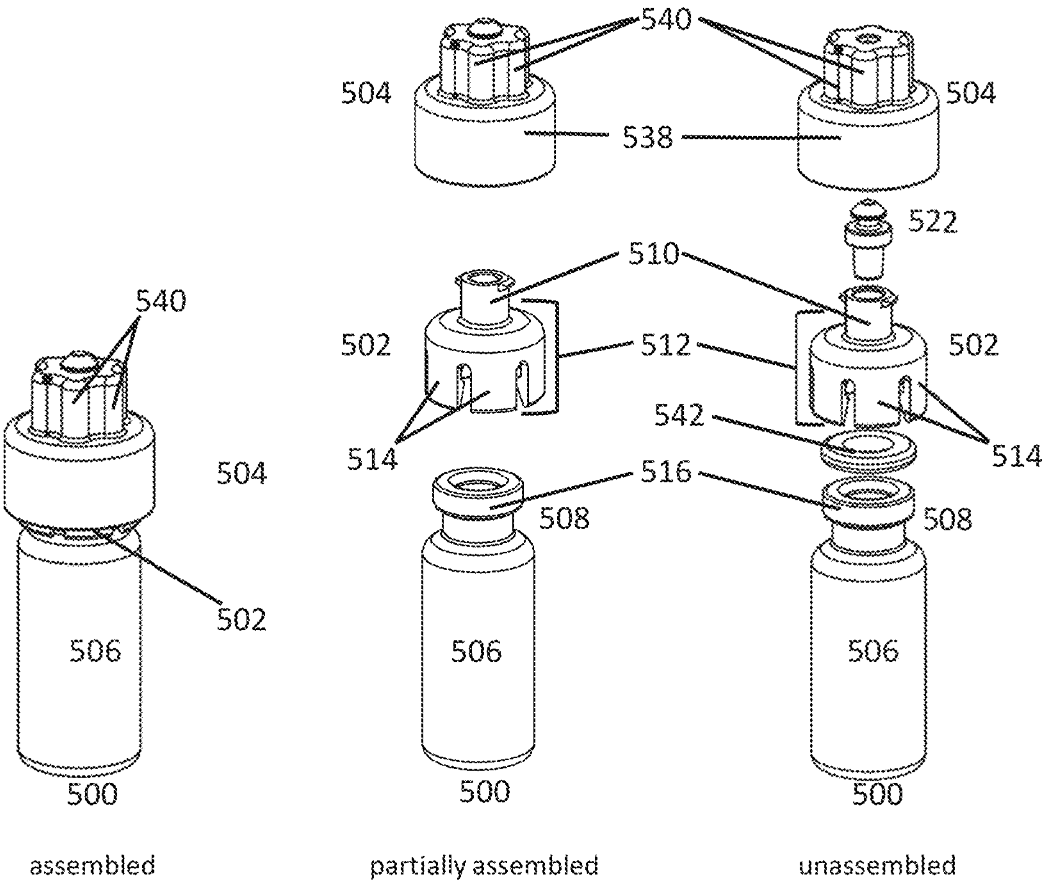
FIG. 5A illustrates an exemplary embodiment of a vial assembly in a fully assembled, partially assembled, and an unassembled configuration, the vial assembly comprising a vial, an adapter, and a vial cap. A gasket can be fits into the adapter. A plug fits into the vial cap.
Figure 5B:
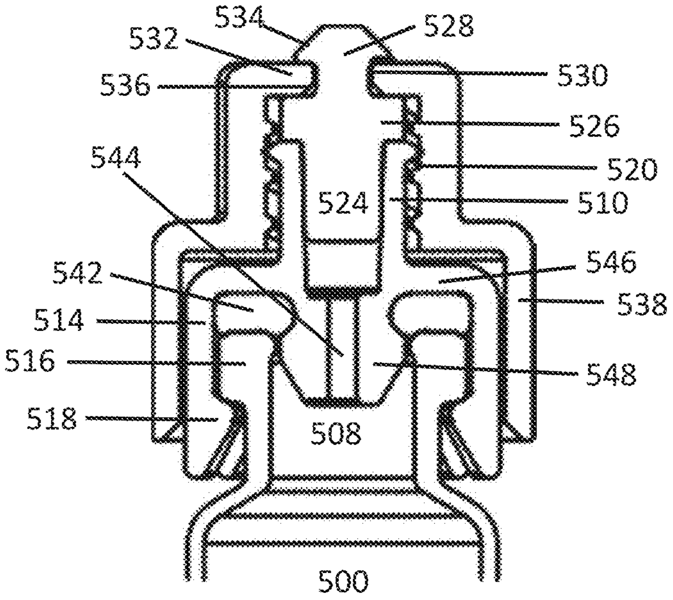
FIG. 5B illustrates a close-up cross-sectional view of an adapter and a vial cap assembled on a vial in an exemplary vial assembly.

FIG. 5A illustrates an exemplary embodiment of a vial assembly in a fully assembled, partially assembled, and an unassembled configuration, the vial assembly comprising a vial 500, an adapter 502, and a vial cap 504. The vial 500 comprises a vial body 506 and a vial neck 508. The adapter 502 comprises a syringe interface 510 and a vial neck fitting 512. The syringe interface 510 is configured to engage a threated segment on the inner surface of the vial cap 504. The syringe interface 510 can be, for example, a conduit with a threaded outer surface or a female luer lock (as illustrated in FIG. 5A). The syringe interface 510 can engage a male luer lock or slip tip (for example, on a syringe). In some embodiments, the inner portion of the syringe interface 510 is tapered (that is, the syringe interface has an inner diameter proximal to vial neck fitting 512 that is narrower than the distal inner diameter). The vial neck fitting comprises a plurality of prongs 514 that are directed away from the syringe interface 510. The vial neck 508 comprises an annular lip 516, and the prongs 514 comprise an anchor 518 that can engage with the annular lip 516. FIG. 5B illustrates a close-up cross-sectional view of the adapter 502 and vial cap 504 assembled on the vial 500. Once the anchors 518 engage the annular lip 516 from the underside of the lip 516, the adapter 502 is irreversibly positioned on the vial neck 508. A channel 544 in the adapter 502 fluidly connects the vial neck 508 to the syringe interface.

The vial cap 504 has a threaded inner segment 520 that engages the syringe interface 510. Thus, the vial cap 504 can attach to the adapter 502 by screwing the vial cap 504 on to the syringe interface 510. The vial cap 504 is attached to a plug 522. The plug 522 comprises a stopper portion 524, which can fit into the syringe interface 510 to form a seal. In some embodiments, the stopper portion 524 is tapered (that is, a bottom diameter is smaller than an upper diameter). The plug 522 further comprises a central body 526, a restraint 528, and a reduced diameter region defining an annulus 530 between the central body 526 and the restraint 528. The central body 526 of the plug 522 is wider than the stopper portion 524, and can sit on the opening of the syringe interface 510. The vial cap 504 comprises a rim 532 that extends into the annulus 530. The rim 532 can be formed, for example, by an aperture in the vial cap 504. The aperture can extend through the top of the vial cap 504, or the aperture can be internal in the vial cap. In some embodiments, the rim 532 comprises a plurality of prongs. The restraint 528 locks the plug into the vial cap 504 once attached by extending over the rim 532 and holding the rim 532 in the annulus 530.

The restraint 528 can be shaped to allow unidirectional movement, for example by having a narrower top and a wider base. For example, in some embodiments, the restraint 528 is domed shaped. In some embodiments, the restraint 528 comprises a beveled rim 534 such that the top of the restraint is narrower than the base of the restraint. The rim 532 that extends into the annulus 530 can optionally comprise an angled edge 536. For example, the rim 532 can comprise an angled edge 536 such that the bottom edge of the rim is shorter than the top edge. The angled edge 536 can be used alone or in combination with the restraint 528 shaped to allow unidirectional movement to facilitate attachment of the plug 522 into the vial cap 504.

In some embodiments, the vial cap 504 comprises a skirt 538 that surrounds a portion of the vial neck fitting 512 of the adapter 502. Optionally, the outer surface of the vial cap 504 comprises a plurality of longitudinally disposed ribs 540, which can help provide traction when opening or closing the vial assembly. The ribs can be disposed on the upper portion of the vial cap 504, but they can also or alternatively be disposed on the skirt 538, if present.

In some embodiments, the vial assembly further includes a gasket 542, which can be made from rubber, a polymer, or any other suitable material. The gasket 542 is disposed between the adapter 502 and the opening of the vial neck 508 (for example, disposed on top of the annular ring 516, if present). The gasket 542 forms a seal between the vial neck 508 and the adapter 502 to limit leakage of the liquid in vial 500. Thus, once the adapter 502 is attached to the vial neck 508 with the gasket 542 in place, liquid is limited to exiting the vial through the syringe interface 510 via the channel 544 in the adapter 502. The gasket 542 can be fit into the vial neck fitting 512 of the adapter 502 prior to attaching the adapter 502 to the vial neck 516. For example, the outer edge of the gasket 542 can be disposed along the inner edge of the vial neck fitting above the top of the prongs 514. The top of the gasket 542 can fit proximal to a lateral disk 546 that connects the prongs 514. In some embodiments, the adapter 502 comprises a protrusion 548, and the outer surface of the protrusion can contact the inner surface of the gasket 542 while the channel 544 continues through the protrusion 548. In some embodiments, the protrusion 548 has a narrower top to hold the gasket 542 in place. In some embodiments, the protrusion comprises a conical or frustoconical bottom.

Figure 5C:
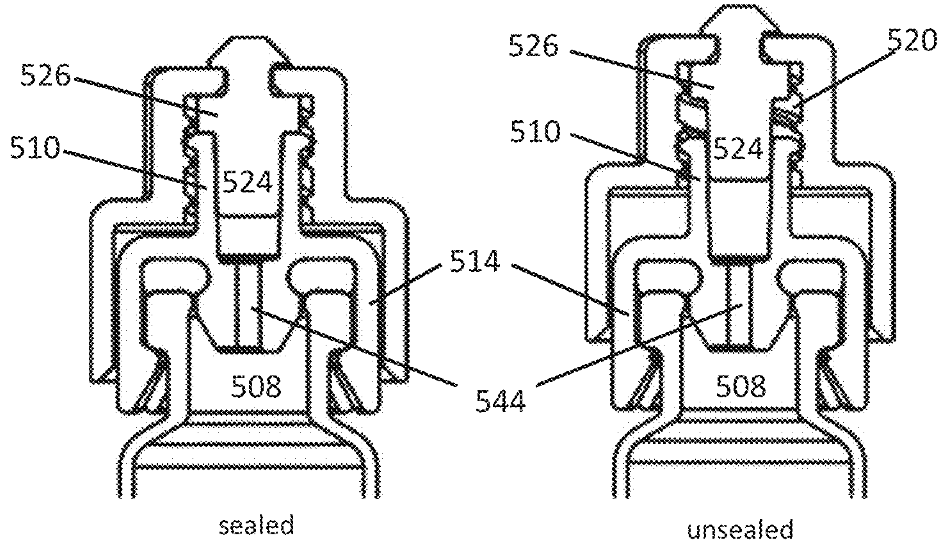
FIG. 5C illustrates a side-by-side view of the sealed and unsealed configurations of a vial cap in an exemplary vial assembly having a vial, an adapter, and a vial cap having a plug.

The vial cap 504 can be attached to the adapter 504 in a sealed or an unsealed configuration. FIG. 5C provides a side-by-side view of the sealed and unsealed configurations. When the vial cap is placed on the adapter or the inner threaded segment 520 of the vial cap is only partially engaged with the syringe interface 510, the vial assembly is in the unsealed configuration. In the unsealed configuration, the stopper portion 524 of the plug is unengaged or only partially engaged (as illustrated in FIG. 5C) such that the central body 526 does not sit on the end of the syringe interface 510. The vial cap can be tightened, for example by twisting the vial cap, to fully engage the inner threaded segment 520 of the vial cap with the syringe interface 510. By tightening the vial cap, the plug is lowered towards the adapter. Thus, in the sealed configuration, the stopper portion 524 of the plug is fully engaged in the syringe interface 510, and the central body 526 sits on the end of the syringe interface 510.

When the vial assembly is in the unsealed configuration, the liquid in the vial is fluidly connected to the atmospheric environment. Optionally, the liquid contained within the vial is lyophilized when the vial assembly is in the unsealed configuration. Lyophilization can occur, for example, by freezing the liquid and exerting a vacuum pressure. Fluid (such as evaporated or sublimed gas formed during lyophilization of the liquid contained within the vial) can flow through the vial neck 508, channel 544, and syringe interface 510; around the stopper portion 524 of the plug and inner threaded segment 520 of the vial cap; and through spaces between the prongs 514 in the adapter into the atmosphere.

Figure 5D:
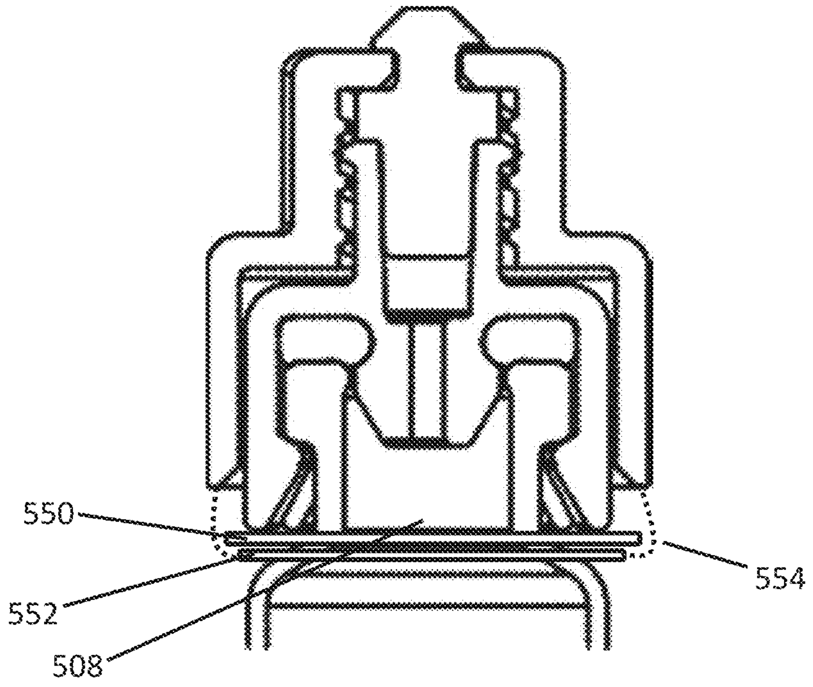
FIG. 5D illustrates a cross-sectional view of the sealed configuration of a vial cap in an exemplary vial assembly having a vial, an adapter, a vial cap having a plug, and a tamper-evident band.

In some embodiments, the vial assembly includes a tamper-evident band (FIG. 5D). For example, in some embodiments, the vial includes an annular lip 550 disposed on the outer surface of the vial neck 508. The annular lip 550 is disposed on the proximal end of the vial neck 508 (i.e., closer to the vial body than the vial opening). The tamper-evident band 552 is attached to the vial cap (for example, at the skirt of the vial cap) and wraps below the annular lip 550 on the vial neck 508. Alternatively, the tamper-evident band wraps below the prongs on the adapter. In some embodiments, the tamper-evident band can be attached to the vial cap by a perforated segment 554. When the vial cap is separated from the vial, the annular lip on the vial neck (or the prongs on the adapter) retains the tamper-evident band and the perforated segment is torn, thereby separating the tamper-evident band from the vial cap. This separation indicates that the vial cap has been opened.

The vial assembly can be filled by dispensing a liquid into a vial having a vial body and a vial neck; attaching an adapter to the vial neck, the adapter having a syringe interface, a vial neck fitting, and a longitudinally disposed channel; and sealing the vial by attaching a vial cap to the adapter, the vial cap having a threaded interior portion that engages the syringe interface and a plug having a stopper portion fitted into the syringe interface.

The adapter can be attached to the vial neck by placing the adapter on the end of the vial neck and exerting a downward force. The adapter includes a vial neck fitting that interfaces with and irreversibly attaches the adapter to the vial neck. For example, the vial neck fitting can have a plurality of prongs, the prongs having an anchor that engages an annular lip disposed on the outer surface of the vial neck. The adapter also includes a syringe interface and a channel fluidly connecting the syringe interface to the vial neck. The syringe interface can be, for example, a female luer lock or a conduit with a threaded outer surface.

In some embodiments, a gasket is placed between the adapter and the end of the vial neck. In some embodiments, the gasket is placed on the end of the vial neck, and it in some embodiments, the gasket is positioned in the vial neck fitting of the adapter prior to attaching the adapter to the vial neck. Once the adapter is attached to the vial neck, the gasket forms a seal between the vial neck and the adapter.

A liquid (such as a liquid medication) can be dispensed into the vial either before or after the adapter is attached the vial neck. For example, in some embodiments, the liquid is dispensed into the vial via the vial neck, and then the adapter is attached the vial neck. In some embodiments, the adapter is attached to the vial neck, and the liquid is dispensed into the vial via a syringe interface disposed on the top of the adapter. The liquid can flow through the syringe interface, the channel, the vial neck, and into the body of the vial.

After liquid has been dispensed in the vial, the vial cap can then be attached to the adapter in either a sealed configuration or an unsealed configuration. The vial cap can include a threaded segment on the inner surface of the vial cap that can engage the syringe interface on the adapter. The vial cap can be attached to the adapter by partially engaging the threaded segment with the syringe interface in an unsealed configuration. For example, when the vial cap is placed on the adapter or the inner threaded segment of the vial cap is only partially engaged with the syringe interface, the vial assembly is in the unsealed configuration. In the unsealed configuration, a stopper portion of a plug is unengaged or only partially engaged (as illustrated in FIG. 5C) such that the central body does not sit on the end of the syringe interface. The vial cap can be tightened, for example by twisting the vial cap, to fully engage the inner threaded segment of the vial cap with the syringe interface and the vial is sealed. By tightening the vial cap, the plug is lowered towards the adapter, and the vial assembly is disposed in the sealed configuration. Thus, in the sealed configuration, the stopper portion of the plug is fully engaged in the syringe interface, and the central body sits on the end of the syringe interface.

In some embodiments, the liquid dispensed in the vial is lyophilized. Lyophilization can occur, for example, by freezing the liquid and exerting a vacuum pressure. The vial can then be sealed after lyophilization. The liquid can be lyophilized at any point after the liquid is dispensed in the vial and before sealing the vial. For example, in some embodiments, the liquid is lyophilized after dispensing the liquid in the vial and prior to attaching the adapter to the vial neck, after attaching the adapter to the vial neck and prior to attaching the vial cap to or placing the vial cap on the adapter, or after attaching the vial cap to or placing the vial cap on the adapter and before sealing the vial.

In some embodiments, a method of filling a vial assembly comprises dispensing a liquid into a vial comprising a vial body and a vial neck; attaching an adapter to the vial neck, said adapter comprising a top portion having a syringe interface, a bottom portion having a vial neck fitting, a gasket fitting within the vial neck fitting, and a longitudinally extending channel fluidly connecting the syringe interface to the vial neck; and sealing the vial by attaching a vial cap to the adapter, said vial cap having a central opening including a threaded segment that engages the syringe interface and a plug, said plug having a lower stopper portion that fits within the vial neck and an upper portion that attaches to an upper portion of the vial cap. In some embodiments, the method further comprises fitting the gasket into the vial neck fitting. In some embodiments, the vial cap is attached to the adapter prior to attaching the adapter to the vial neck, and in some embodiments, the adapter is attached to the vial neck prior to attaching the vial cap to the adapter. In some embodiments, the liquid is dispensed into the vial prior to attaching the adapter to the vial neck, and in some embodiments, the adapter is attached to the vial neck prior to dispensing liquid into the vial. In some embodiments, the method further comprises lyophilizing the liquid (for example, by placing the vial cap on the adapter in an unsealed configuration, lyophilizing the liquid, and sealing the vial by tightening the vial cap after lyophilizing the liquid. In some embodiments, the syringe interface is a tapered conduit. In some embodiments, the syringe interface is a second threated segment on an outer surface of a conduit. In some embodiments, the syringe interface is a female luer.

In some embodiments, a method of filling a vial assembly comprises dispensing a liquid into a vial comprising a vial body and a vial neck; attaching an adapter to the vial neck, said adapter comprising a top portion having a syringe interface, a bottom portion having a vial neck fitting, a gasket fitting within the vial neck fitting, and a longitudinally extending channel fluidly connecting the syringe interface to the vial neck; and sealing the vial by attaching a vial cap to the adapter, said vial cap having a central opening including a threaded segment that engages the syringe interface and a coextruded plug, said plug having a lower stopper portion that fits within the vial neck and an upper portion that attaches to an upper portion of the vial cap. In some embodiments, the method further comprises fitting the gasket into the vial neck fitting. In some embodiments, the vial cap is attached to the adapter prior to attaching the adapter to the vial neck, and in some embodiments, the adapter is attached to the vial neck prior to attaching the vial cap to the adapter. In some embodiments, the liquid is dispensed into the vial prior to attaching the adapter to the vial neck, and in some embodiments, the adapter is attached to the vial neck prior to dispensing liquid into the vial. In some embodiments, the method further comprises lyophilizing the liquid (for example, by placing the vial cap on the adapter in an unsealed configuration, lyophilizing the liquid, and sealing the vial by tightening the vial cap after lyophilizing the liquid. In some embodiments, the syringe interface is a tapered conduit. In some embodiments, the syringe interface is a second threated segment on an outer surface of a conduit. In some embodiments, the syringe interface is a female luer.

In some embodiments, a method of filling a vial assembly comprises dispensing a liquid into a vial comprising a vial body and a vial neck; attaching an adapter to the vial neck, said adapter comprising a top portion having a syringe interface, a bottom portion having a vial neck fitting, a gasket fitting within the vial neck fitting, and a longitudinally extending channel fluidly connecting the syringe interface to the vial neck; and sealing the vial by attaching a vial cap to the adapter, said vial cap having a central opening including a threaded segment that engages the syringe interface and a rim, said vial cap carrying a plug in the central opening, said plug having a lower stopper portion that fits within the vial neck, and an upper portion including a top portion defining a restraint coupled to a reduced diameter region defining an annulus, wherein the rim of the vial cap extends into the annulus to hold the plug in place. In some embodiments, the method further comprises fitting the gasket into the vial neck fitting. In some embodiments, the vial cap is attached to the adapter prior to attaching the adapter to the vial neck, and in some embodiments, the adapter is attached to the vial neck prior to attaching the vial cap to the adapter. In some embodiments, the liquid is dispensed into the vial prior to attaching the adapter to the vial neck, and in some embodiments, the adapter is attached to the vial neck prior to dispensing liquid into the vial. In some embodiments, the method further comprises lyophilizing the liquid (for example, by placing the vial cap on the adapter in an unsealed configuration, lyophilizing the liquid, and sealing the vial by tightening the vial cap after lyophilizing the liquid. In some embodiments, the syringe interface is a tapered conduit. In some embodiments, the syringe interface is a second threated segment on an outer surface of a conduit. In some embodiments, the syringe interface is a female luer.

In some embodiments, a method of filling a vial assembly comprises dispensing a liquid into a vial comprising a vial body and a vial neck; attaching an adapter to the vial neck, said adapter comprising a top portion having a syringe interface, a bottom portion having a vial neck fitting, a gasket fitting within the vial neck fitting, and a longitudinally extending channel fluidly connecting the syringe interface to the vial neck; and sealing the vial by attaching a vial cap to the adapter, said vial cap having a central opening including a threaded segment that engages the syringe interface and a rim, said vial cap carrying a plug in the central opening, said plug having a lower stopper portion that fits within the vial neck, a central body with a diameter wider than the lower stopper portion (the central body optionally including a plurality of compression ridges), and an upper portion including a top portion defining a restraint (which can have a domed surface or a beveled rim) coupled to a reduced diameter region defining an annulus, wherein the rim of the vial cap extends into the annulus to hold the plug in place. In some embodiments, the method further comprises fitting the gasket into the vial neck fitting. In some embodiments, the vial cap is attached to the adapter prior to attaching the adapter to the vial neck, and in some embodiments, the adapter is attached to the vial neck prior to attaching the vial cap to the adapter. In some embodiments, the liquid is dispensed into the vial prior to attaching the adapter to the vial neck, and in some embodiments, the adapter is attached to the vial neck prior to dispensing liquid into the vial. In some embodiments, the method further comprises lyophilizing the liquid (for example, by placing the vial cap on the adapter in an unsealed configuration, lyophilizing the liquid, and sealing the vial by tightening the vial cap after lyophilizing the liquid. In some embodiments, the syringe interface is a tapered conduit. In some embodiments, the syringe interface is a second threated segment on an outer surface of a conduit. In some embodiments, the syringe interface is a female luer.

In some embodiments, a method of filling a vial assembly comprises dispensing a liquid into a vial comprising a vial body and a vial neck; attaching an adapter to the vial neck, said adapter comprising a top portion having a syringe interface, a bottom portion having a vial neck fitting comprising a plurality of prongs comprising an anchor that engages an annular lip disposed on the vial neck, a gasket fitting within the vial neck fitting, and a longitudinally extending channel fluidly connecting the syringe interface to the vial neck; and sealing the vial by attaching a vial cap to the adapter, said vial cap having a central opening including a threaded segment that engages the syringe interface and a rim, said vial cap carrying a plug in the central opening, said plug having a lower stopper portion that fits within the vial neck, a central body with a diameter wider than the lower stopper portion (the central body optionally including a plurality of compression ridges), and an upper portion including a top portion defining a restraint (which can have a domed surface or a beveled rim) coupled to a reduced diameter region defining an annulus, wherein the rim of the vial cap extends into the annulus to hold the plug in place. In some embodiments, the method further comprises fitting the gasket into the vial neck fitting. In some embodiments, the vial cap is attached to the adapter prior to attaching the adapter to the vial neck, and in some embodiments, the adapter is attached to the vial neck prior to attaching the vial cap to the adapter. In some embodiments, the liquid is dispensed into the vial prior to attaching the adapter to the vial neck, and in some embodiments, the adapter is attached to the vial neck prior to dispensing liquid into the vial. In some embodiments, the method further comprises lyophilizing the liquid (for example, by placing the vial cap on the adapter in an unsealed configuration, lyophilizing the liquid, and sealing the vial by tightening the vial cap after lyophilizing the liquid. In some embodiments, the syringe interface is a tapered conduit. In some embodiments, the syringe interface is a second threated segment on an outer surface of a conduit. In some embodiments, the syringe interface is a female luer.

In some embodiments, a method of filling a vial assembly comprises dispensing a liquid into a vial comprising a vial body and a vial neck; fitting a gasket into an adapter, said adapter comprising a top portion having a syringe interface, a bottom portion having a vial neck fitting comprising a plurality of prongs comprising an anchor configured to engage an annular lip disposed on the vial neck, and a longitudinally extending channel fluidly connecting the syringe interface to the vial neck, wherein the gasket fits along an inner edge of the vial neck fitting and proximal to a lateral disk joining the plurality of prongs; attaching the adapter to the vial neck by engaging the anchor on the plurality of prongs with the annular lip; and sealing the vial by attaching a vial cap to the adapter, said vial cap having a central opening including a threaded segment that engages the syringe interface and a rim, said vial cap carrying a plug in the central opening, said plug having a lower stopper portion that fits within the vial neck, a central body with a diameter wider than the lower stopper portion (the central body optionally including a plurality of compression ridges), and an upper portion including a top portion defining a restraint (which can have a domed surface or a beveled rim) coupled to a reduced diameter region defining an annulus, wherein the rim of the vial cap extends into the annulus to hold the plug in place. In some embodiments, the method further comprises fitting the gasket into the vial neck fitting. In some embodiments, the vial cap is attached to the adapter prior to attaching the adapter to the vial neck, and in some embodiments, the adapter is attached to the vial neck prior to attaching the vial cap to the adapter. In some embodiments, the liquid is dispensed into the vial prior to attaching the adapter to the vial neck, and in some embodiments, the adapter is attached to the vial neck prior to dispensing liquid into the vial. In some embodiments, the method further comprises lyophilizing the liquid (for example, by placing the vial cap on the adapter in an unsealed configuration, lyophilizing the liquid, and sealing the vial by tightening the vial cap after lyophilizing the liquid. In some embodiments, the syringe interface is a tapered conduit. In some embodiments, the syringe interface is a second threated segment on an outer surface of a conduit. In some embodiments, the syringe interface is a female luer.

A user can fill a syringe by detaching (for example, by unscrewing) the vial cap from the adapter, attaching the syringe to the syringe interface of the vial neck, and drawing liquid contained within the vial into the syringe. In some embodiments, detaching the vial cap comprises severing a tamper-evident band. The syringe can comprise a male luer, which can interface with the syringe interface (which may comprise, for example, threading on the outer surface of the vial neck or a female luer). In some embodiments, the syringe is pre-filled with a liquid, and that liquid is dispensed into the vial after attaching the syringe to the vial neck. If a powder is contained within the vial, for example, the liquid from the pre-filled syringe can be used to suspend or dissolve the powder before the liquid is drawn into the syringe. In some embodiments, the vial contains a first liquid, and the syringe can be pre-filled with a second liquid. The second liquid can be dispensed into the vial and mix with the first liquid before the mixture is drawn from the vial by the syringe.

In some embodiments, a method of filling a syringe comprises detaching a vial cap (such as by unscrewing the vial cap) from a vial assembly comprising: a vial comprising a vial body and a vial neck; an adapter comprising a top portion having a syringe interface, a bottom portion having a vial neck fitting attached to the vial neck, and a channel fluidly connecting the syringe interface to the vial neck; a gasket disposed between the vial neck and the adapter; and the vial cap, said vial cap having a central opening including a threaded segment that engages the syringe interface and a plug, said plug having a lower stopper portion that fits within the vial neck and an upper portion that attaches to an upper portion of the vial cap; attaching a syringe (which can include a male luer, such as a male luer lock or a male slip tip) to the syringe interface; and drawing a liquid contained within the vial into the syringe. In some embodiments, the method further comprises forming the liquid by adding a solution (which may be contained within the syringe) to the vial, and dissolving or suspending a lyophilized powder contained within the vial. In some embodiments, detaching the vial cap includes severing a tamper-evident band. In some embodiments, the syringe interface is a tapered conduit. In some embodiments, the syringe interface is a second threated segment on an outer surface of a conduit. In some embodiments, the syringe interface is a female luer.

In some embodiments, the method of filling a syringe comprises detaching a vial cap (such as by unscrewing the vial cap) from a vial assembly comprising: a vial comprising a vial body and a vial neck; an adapter comprising a top portion having a syringe interface, a bottom portion having a vial neck fitting attached to the vial neck, and a channel fluidly connecting the syringe interface to the vial neck; a gasket disposed between the vial neck and the adapter; and the vial cap, said vial cap having a central opening including a threaded segment that engages the syringe interface and a coextruded plug, said plug having a lower stopper portion that fits within the vial neck and an upper portion that attaches to an upper portion of the vial cap; attaching a syringe (which can include a male luer, such as a male luer lock or a male slip tip) to the syringe interface; and drawing a liquid contained within the vial into the syringe. In some embodiments, the method further comprises forming the liquid by adding a solution (which may be contained within the syringe) to the vial, and dissolving or suspending a lyophilized powder contained within the vial. In some embodiments, detaching the vial cap includes severing a tamper-evident band. In some embodiments, the syringe interface is a tapered conduit. In some embodiments, the syringe interface is a second threated segment on an outer surface of a conduit. In some embodiments, the syringe interface is a female luer.

In some embodiments, a method of filling a syringe comprises detaching a vial cap (such as by unscrewing the vial cap) from a vial assembly comprising: a vial comprising a vial body and a vial neck; an adapter comprising a top portion having a syringe interface, a bottom portion having a vial neck fitting attached to the vial neck, and a channel fluidly connecting the syringe interface to the vial neck; a gasket disposed between the vial neck and the adapter; and the vial cap, said vial cap having a central opening including a threaded segment that engages the syringe interface and a rim, said vial cap carrying a plug in the central opening, said plug having a lower stopper portion that fits within the vial neck, and an upper portion including a top portion defining a restraint coupled to a reduced diameter region defining an annulus, wherein the rim of the vial cap extends into the annulus to hold the plug in place; attaching a syringe (which can include a male luer, such as a male luer lock or a male slip tip) to the syringe interface; and drawing a liquid contained within the vial into the syringe. In some embodiments, the method further comprises forming the liquid by adding a solution (which may be contained within the syringe) to the vial, and dissolving or suspending a lyophilized powder contained within the vial. In some embodiments, detaching the vial cap includes severing a tamper-evident band. In some embodiments, the syringe interface is a tapered conduit. In some embodiments, the syringe interface is a second threated segment on an outer surface of a conduit. In some embodiments, the syringe interface is a female luer.

In some embodiments, a method of filling a syringe comprises detaching a vial cap (such as by unscrewing the vial cap) from a vial assembly comprising: a vial comprising a vial body and a vial neck; an adapter comprising a top portion having a syringe interface, a bottom portion having a vial neck fitting attached to the vial neck, and a channel fluidly connecting the syringe interface to the vial neck; a gasket disposed between the vial neck and the adapter; and the vial cap, said vial cap having a central opening including a threaded segment that engages the syringe interface and a rim, said vial cap carrying a plug in the central opening, said plug having a lower stopper portion that fits within the vial neck, a central body with a diameter wider than the lower stopper portion (the central body optionally including a plurality of compression ridges), and an upper portion including a top portion defining a restraint (which can have a domed surface or a beveled rim) coupled to a reduced diameter region defining an annulus, wherein the rim of the vial cap extends into the annulus to hold the plug in place; attaching a syringe (which can include a male luer, such as a male luer lock or a male slip tip) to the syringe interface; and drawing a liquid contained within the vial into the syringe. In some embodiments, the method further comprises forming the liquid by adding a solution (which may be contained within the syringe) to the vial, and dissolving or suspending a lyophilized powder contained within the vial. In some embodiments, detaching the vial cap includes severing a tamper-evident band. In some embodiments, the syringe interface is a tapered conduit. In some embodiments, the syringe interface is a second threated segment on an outer surface of a conduit. In some embodiments, the syringe interface is a female luer.

In some embodiments, a method of filling a syringe comprises detaching a vial cap (such as by unscrewing the vial cap) from a vial assembly comprising: a vial comprising a vial body and a vial neck; an adapter comprising a top portion having a syringe interface, a bottom portion having a vial neck fitting comprising a plurality of prongs comprising an anchor that engages an annular lip disposed on the vial neck, and a channel fluidly connecting the syringe interface to the vial neck; a gasket disposed between the vial neck and the adapter; and the vial cap, said vial cap having a central opening including a threaded segment that engages the syringe interface and a rim, said vial cap carrying a plug in the central opening, said plug having a lower stopper portion that fits within the vial neck, a central body with a diameter wider than the lower stopper portion (the central body optionally including a plurality of compression ridges), and an upper portion including a top portion defining a restraint (which can have a domed surface or a beveled rim) coupled to a reduced diameter region defining an annulus, wherein the rim of the vial cap extends into the annulus to hold the plug in place; attaching a syringe (which can include a male luer, such as a male luer lock or a male slip tip) to the syringe interface; and drawing a liquid contained within the vial into the syringe. In some embodiments, the method further comprises forming the liquid by adding a solution (which may be contained within the syringe) to the vial, and dissolving or suspending a lyophilized powder contained within the vial. In some embodiments, detaching the vial cap includes severing a tamper-evident band. In some embodiments, the syringe interface is a tapered conduit. In some embodiments, the syringe interface is a second threated segment on an outer surface of a conduit. In some embodiments, the syringe interface is a female luer.

In some embodiments, a method of filling a syringe comprises detaching a vial cap (such as by unscrewing the vial cap) from a vial assembly comprising: a vial comprising a vial body and a vial neck; an adapter comprising a top portion having a syringe interface, a bottom portion having a vial neck fitting comprising a plurality of prongs comprising an anchor that engages an annular lip disposed on the vial neck, and a channel fluidly connecting the syringe interface to the vial neck; a gasket disposed along an inner edge of the vial neck fitting, proximal to a lateral disk joining the plurality of prongs, and proximal to an opening of the vial neck; and the vial cap, said vial cap having a central opening including a threaded segment that engages the syringe interface and a rim, said vial cap carrying a plug in the central opening, said plug having a lower stopper portion that fits within the vial neck, a central body with a diameter wider than the lower stopper portion (the central body optionally including a plurality of compression ridges), and an upper portion including a top portion defining a restraint (which can have a domed surface or a beveled rim) coupled to a reduced diameter region defining an annulus, wherein the rim of the vial cap extends into the annulus to hold the plug in place; attaching a syringe (which can include a male luer, such as a male luer lock or a male slip tip) to the syringe interface; and drawing a liquid contained within the vial into the syringe. In some embodiments, the method further comprises forming the liquid by adding a solution (which may be contained within the syringe) to the vial, and dissolving or suspending a lyophilized powder contained within the vial. In some embodiments, detaching the vial cap includes severing a tamper-evident band. In some embodiments, the syringe interface is a tapered conduit. In some embodiments, the syringe interface is a second threated segment on an outer surface of a conduit. In some embodiments, the syringe interface is a female luer.

In another aspect, there is provided a vial assembly comprising a vial having a vial body and a vial neck, the vial neck comprising an inner surface and an outer surface, the outer surface comprising an annular lip; and a vial cap having: a stopper having a top portion and a bottom portion, the top portion comprising a longitudinal aperture, and the bottom portion that fits into the vial neck; a conduit having a syringe interface at a first end and a barb at a second end, the second end fitting through the aperture in the stopper, and said barb engaging an underside of the top portion of the stopper; and an end cap having a central opening including a threaded segment that engages the syringe interface and a plug disposed therein, said plug having a lower stopper portion that fits within the syringe interface of the conduit and an upper portion that attaches to an upper portion of the end cap. In some embodiments, the stopper comprises a raised annular ridge around the aperture at the top of the stopper; and the end cap comprises a skirt that fits around the raised annular ridge. In some embodiments, the stopper comprises an annular lip that can sit on the annular lip disposed on the outside surface of the vial neck. In some embodiments, the bottom portion of the stopper comprises at least one truncated segment. In some embodiments, the syringe interface is a tapered conduit. In some embodiments, the syringe interface is a second threaded segment on an outer surface of a conduit. In some embodiments, the syringe interface is a female luer. In some embodiments, the vial assembly further comprises a ring that secures the stopper to the vial neck. In some embodiments, the vail assembly further comprises a tamper-evident band.

In some embodiments, the vial assembly comprises a vial having a vial body and a vial neck, the vial neck comprising an inner surface and an outer surface, the outer surface comprising an annular lip; and a vial cap having: a stopper having a top portion and a bottom portion, the top portion comprising a longitudinal aperture, and the bottom portion that fits into the vial neck; a conduit having a syringe interface at a first end and a barb at a second end, the second end fitting through the aperture in the stopper, and said barb engaging an underside of the top portion of the stopper; and an end cap having a central opening including a threaded segment that engages the syringe interface and a coextruded plug disposed therein, said plug having a lower stopper portion that fits within the syringe interface of the conduit and an upper portion that attaches to an upper portion of the end cap. In some embodiments, the stopper comprises a raised annular ridge around the aperture at the top of the stopper; and the end cap comprises a skirt that fits around the raised annular ridge. In some embodiments, the bottom portion of the stopper comprises at least one truncated segment. In some embodiments, the stopper comprises an annular lip that can sit on the annular lip disposed on the outside surface of the vial neck. In some embodiments, the syringe interface is a tapered conduit. In some embodiments, the syringe interface is a second threaded segment on an outer surface of a conduit. In some embodiments, the syringe interface is a female luer. In some embodiments, the vial assembly further comprises a ring that secures the stopper to the vial neck. In some embodiments, the vail assembly further comprises a tamper-evident band.

In some embodiments, the vial assembly comprises a vial having a vial body and a vial neck, the vial neck comprising an inner surface and an outer surface, the outer surface comprising an annular lip; and a vial cap having: a stopper having a top portion and a bottom portion, the top portion comprising a longitudinal aperture, and the bottom portion that fits into the vial neck; a conduit having a syringe interface at a first end and a barb at a second end, the second end fitting through the aperture in the stopper, and said barb engaging an underside of the top portion of the stopper; and an end cap having a central opening including a threaded segment that engages the syringe interface and a rim, said end cap carrying a plug in the central opening, said plug having a lower stopper portion that fits within the syringe interface of the conduit and an upper portion including a top portion defining a restraint coupled to a reduced diameter region defining an annulus, wherein the rim of the end cap extends into the annulus to hold the plug in place. In some embodiments, the stopper comprises a raised annular ridge around the aperture at the top of the stopper; and the end cap comprises a skirt that fits around the raised annular ridge. In some embodiments, the stopper comprises an annular lip that can sit on the annular lip disposed on the outside surface of the vial neck. In some embodiments, the bottom portion of the stopper comprises at least one truncated segment. In some embodiments, the syringe interface is a tapered conduit. In some embodiments, the syringe interface is a second threaded segment on an outer surface of a conduit. In some embodiments, the syringe interface is a female luer. In some embodiments, the vial assembly further comprises a ring that secures the stopper to the vial neck. In some embodiments, the vail assembly further comprises a tamper-evident band.

In some embodiments, the vial assembly comprises a vial having a vial body and a vial neck, the vial neck comprising an inner surface and an outer surface, the outer surface comprising an annular lip; and a vial cap having: a stopper having a top portion and a bottom portion, the top portion comprising a longitudinal aperture, and the bottom portion that fits into the vial neck; a conduit having a syringe interface at a first end and a barb at a second end, the second end fitting through the aperture in the stopper, and said barb engaging an underside of the top portion of the stopper; and an end cap having a central opening including a threaded segment that engages the syringe interface and a rim, said end cap carrying a plug in the central opening, said plug having a lower stopper portion that fits within the syringe interface of the conduit, a central body with a diameter wider than the lower stopper portion (the central body optionally including a plurality of compression ridges), and an upper portion including a top portion defining a restraint (which can optionally have a domed surface or a beveled rim) coupled to a reduced diameter region defining an annulus, wherein the rim of the end cap extends into the annulus to hold the plug in place. In some embodiments, the stopper comprises a raised annular ridge around the aperture at the top of the stopper; and the end cap comprises a skirt that fits around the raised annular ridge. In some embodiments, the stopper comprises an annular lip that can sit on the annular lip disposed on the outside surface of the vial neck. In some embodiments, the bottom portion of the stopper comprises at least one truncated segment. In some embodiments, the syringe interface is a tapered conduit. In some embodiments, the syringe interface is a second threaded segment on an outer surface of a conduit. In some embodiments, the syringe interface is a female luer. In some embodiments, the vial assembly further comprises a ring that secures the stopper to the vial neck. In some embodiments, the vail assembly further comprises a tamper-evident band.

Figure 6A:
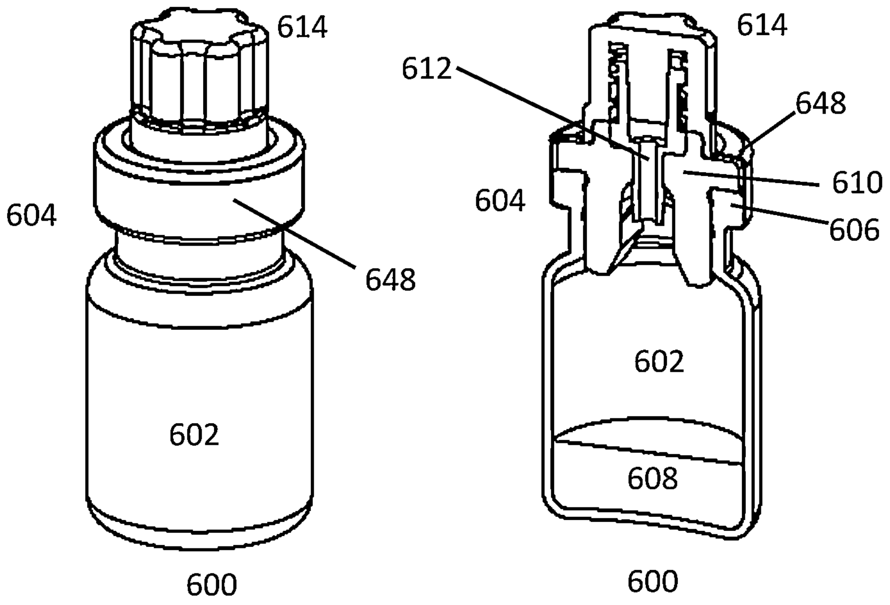
FIG. 6A illustrates an exemplary embodiment of a vial assembly comprising a vial and a vial cap comprising a stopper, a conduit, and an end cap, along with a cross-sectional view of the vial assembly.
Figure 6B:
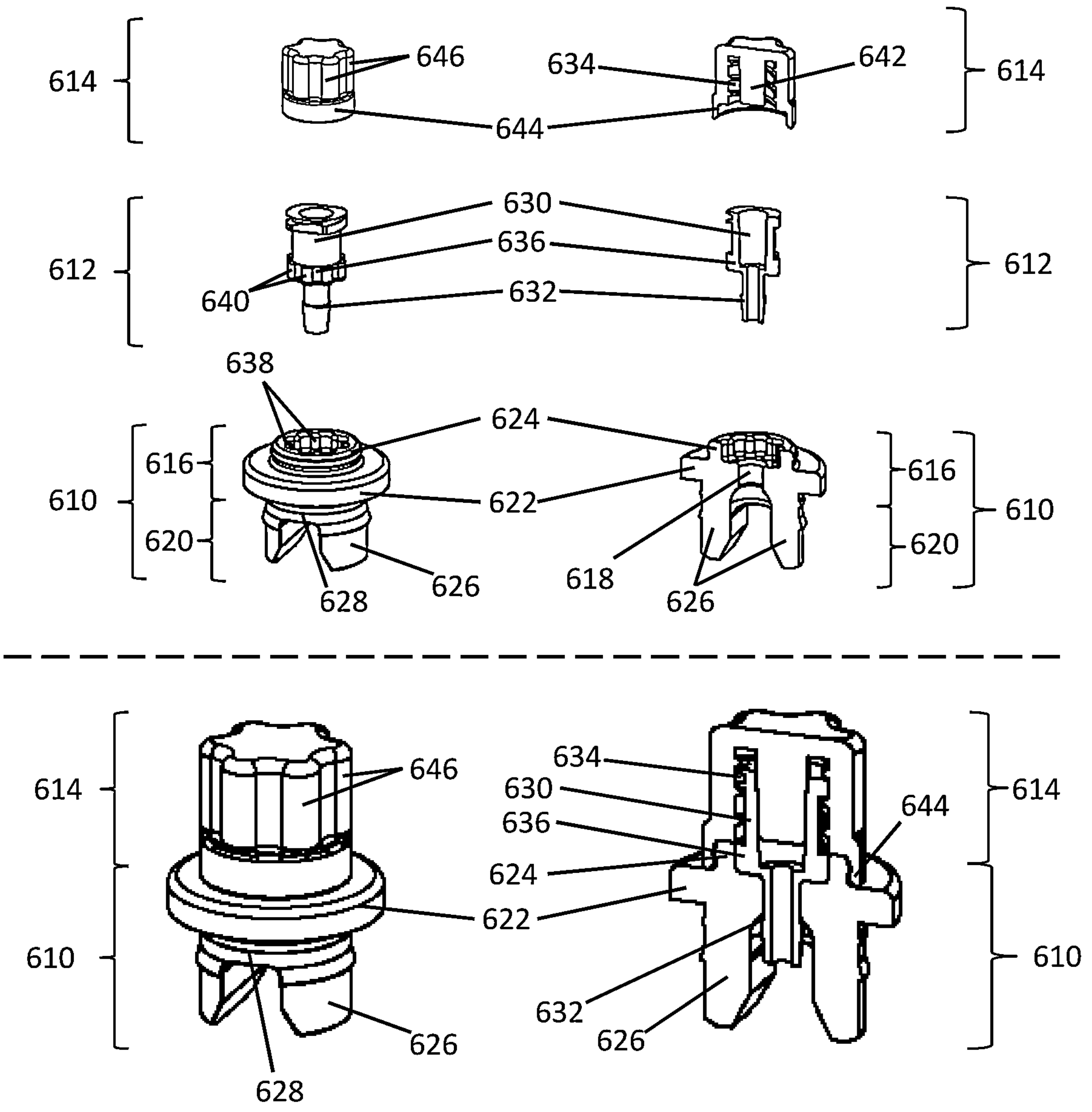
FIG. 6B illustrates a close-up view of vial cap components (including a stopper, a conduit, and an end cap), the vial cap with the components pre-assembled, and a cross-sectional view of each for an exemplary vial assembly.

FIG. 6A illustrates an exemplary embodiment of a vial assembly comprising a vial and a vial cap comprising a stopper, a conduit, and an end cap, along with a cross-sectional view of the vial assembly. FIG. 6B illustrates a close-up view of the vial cap components (stopper, conduit, and end cap), the vial cap with the components pre-assembled, and a cross-sectional view of each. The vial 600 comprises a vial body 602 and a vial neck 604. An annular lip 606 is disposed on the outer surface of the vial neck 604. The vial can contain a liquid or powder 608 (for example, a liquid that has been lyophilized), such as a mediation. The vial cap includes a stopper 610, a conduit 612, and an end cap 614.

Figure 6C:
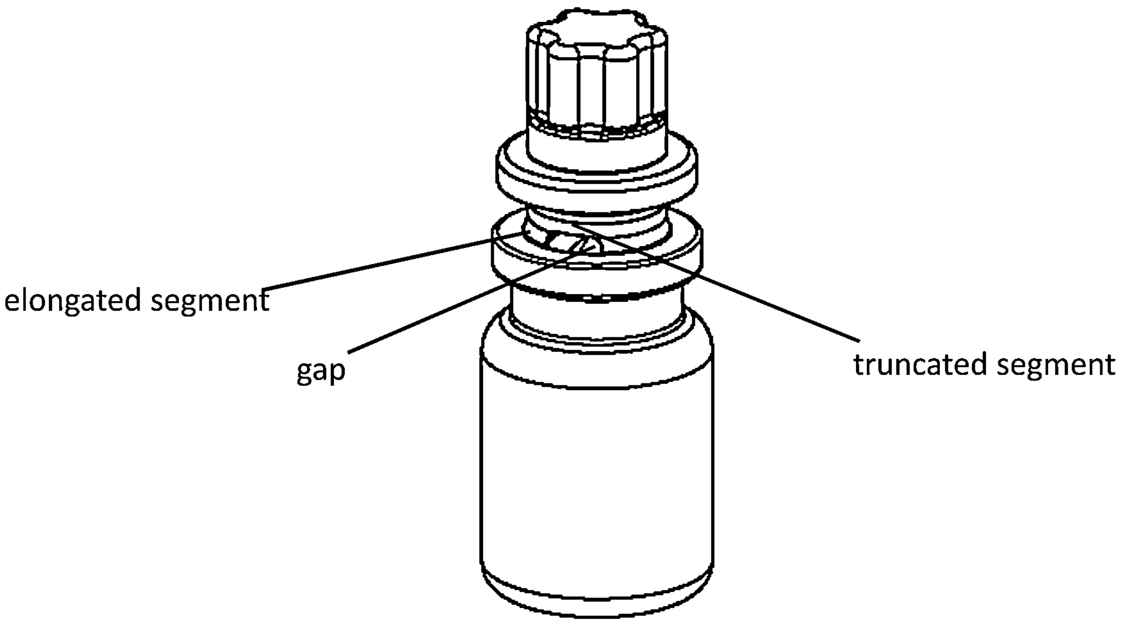
FIG. 6C illustrates an exemplary vial assembly with a vial cap comprising a stopper in an unsealed configuration. In the unsealed configuration for this exemplary embodiment, the bottom portion of the stopper is partially inserted into a vial neck, and a gap exists between a truncated segment of the bottom portion of the stopper and the end of the vial neck.
Figure 6D:
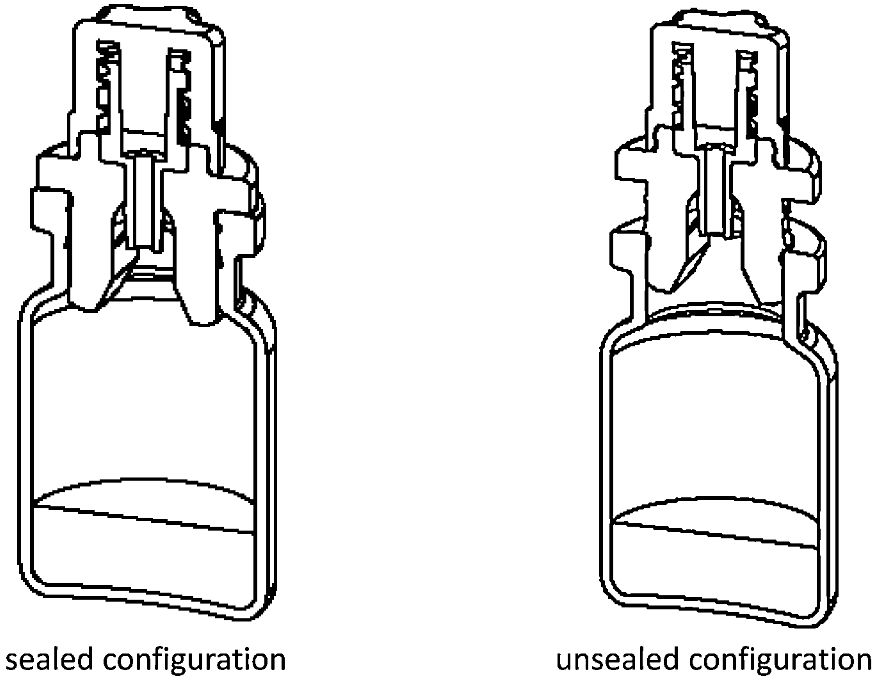
FIG. 6D illustrates a cross-sectional view of an exemplary vial assembly in a sealed configuration and an unsealed configuration.

The stopper 610 has a top portion 616, which includes a longitudinal aperture 618 (for example, in the center of the top portion 616), and a bottom portion 620, which can fit into the vial neck 604. The stopper has an annular lip 622 around the top portion 616 of the stopper 610. Once the bottom portion 620 of the stopper 610 is fitted into the vial neck 604, the annular lip 622 can sit on the annular lip 606 on the outer surface of the vial neck 604. Optionally, the stopper 610 has a raised annular ridge 624 around the longitudinal aperture 618. In some embodiments, the bottom portion 620 of the stopper 620 comprises one or more elongated sections 626 and one or more truncated sections 628. Having one or more elongated sections and one or more truncated section on the bottom portion of the stopper can be useful when lyophilizing a liquid that is contained within the vial. For example, liquid can be dispensed in the vial and the vial cap partially inserted into the vial neck such that the elongated portions are within the vial neck and the truncated sections are outside of the vial neck. This unsealed configuration produces a gap in the seal formed by the elongated sections of the stopper with the vial neck such that the liquid contained within the vial is fluidly connected to the atmosphere. Lyophilization allows for the sublimed or evaporated fluid to flow out of the vial through the gap in the seal. FIG. 6C illustrates a vial assembly with a vial cap comprising a stopper partially inserted into a vial neck (i.e., in an unsealed configuration). The stopper has a truncated section and an elongated section, and a gap is formed between the end of the vial neck and the truncated section. Once the liquid has been lyophilized, the bottom portion of the stopper can be fully inserted into the vial neck, thereby sealing the vial (i.e., the vial cap is in a sealed configuration). FIG. 6D illustrates cross-sectional views of the vial assembly in the sealed configuration and the unsealed configuration.

Referring back to FIG. 6B, the conduit comprises a syringe interface 630 at one end and a barb 632 at the other end. The barb 632 can be, for example, a hose barb or a lateral prong. The syringe interface 630 is configured to engage a threated interior portion 634 of the end cap 614. The syringe interface 630 can be, for example, a conduit with a threaded outer surface or a female luer lock (as illustrated in FIG. 6B). The syringe interface 630 can also interface with a male luer lock or slip tip (for example, on a syringe). In some embodiments, the inner portion of the syringe interface 630 is tapered (that is, the syringe interface has an inner diameter proximal to the barb 632 that is narrower than the distal inner diameter). The end of the conduit 612 having the barb 632 is inserted into the aperture 618 of the stopper 610. Once the conduit 612 is inserted into the aperture 618 of the stopper 610, the barb 632 limits withdrawal of the conduit 612. The base 636 of the conduit 612 is wider than the aperture 618 to prevent the conduit 612 from falling through the aperture 618. In some embodiments, for example if the stopper 610 has a raised annular ridge 624 around the aperture 618, the base 636 of the conduit 612 is smaller than the inner diameter of the raised annular ridge 624. Optionally, the inner surface of the raised annular ridge 624 includes a plurality of ribs 638 and the base 636 of the conduit 612 includes a plurality of ribs 640. The combination of the plurality of ribs 638 on the inner surface of the raised annular ridge 624 and the plurality of ribs 640 on the base 636 of the conduit 612 limits rotation of the conduit 612 once inserted into the stopper 610.

The end cap 614 includes a central opening including a threaded interior portion 634 that engages the syringe interface 630. In some embodiments, the end cap 614 comprises a coextruded plug 642 directed toward the threaded interior portion 634 of the end cap 614, which can be attached to the upper region of the interior of the end cap 614. The plug 642 can fit into the syringe interface 630 of the conduit 612. In some embodiments, the plug 642 is tapered, which can provide a better seal if the inner surface of the syringe interface is tapered. Optionally, a skirt 644 is disposed around the bottom of the end cap 614. The skirt 644 can fit around the outer surface of the raised annular ridge 624 of the stopper 610. Also optionally, the outer surface of the end cap 614 includes a plurality of longitudinally disposed ribs 646, which can help provide traction when opening or closing the vial assembly.

The vial cap is assembled by inserting the conduit 612 into the aperture 618 of the stopper 610. The end cap 614 is then attached, for example by screwing the end cap 614 to the syringe interface 630 by engaging the threaded segment 634 of the end cap 614 with the syringe interface. The vial 600 can be sealed by attaching the vial cap to the vial neck 604. For example, the bottom portion 620 of the stopper 610 can be inserted into the vial neck 604. Once the vial cap is attached the vial neck, a ring 648 (which can be, for example, metal, a polymer, or rubber) can be attached to the vial assembly by wrapping the annular lip 622 of the stopper 610 and the annular lip 606 on the outer surface of the vial neck 604. The ring 648 secures the stopper 610 to the vial neck 604, as illustrated in FIG. 6A.

Figure 6E:
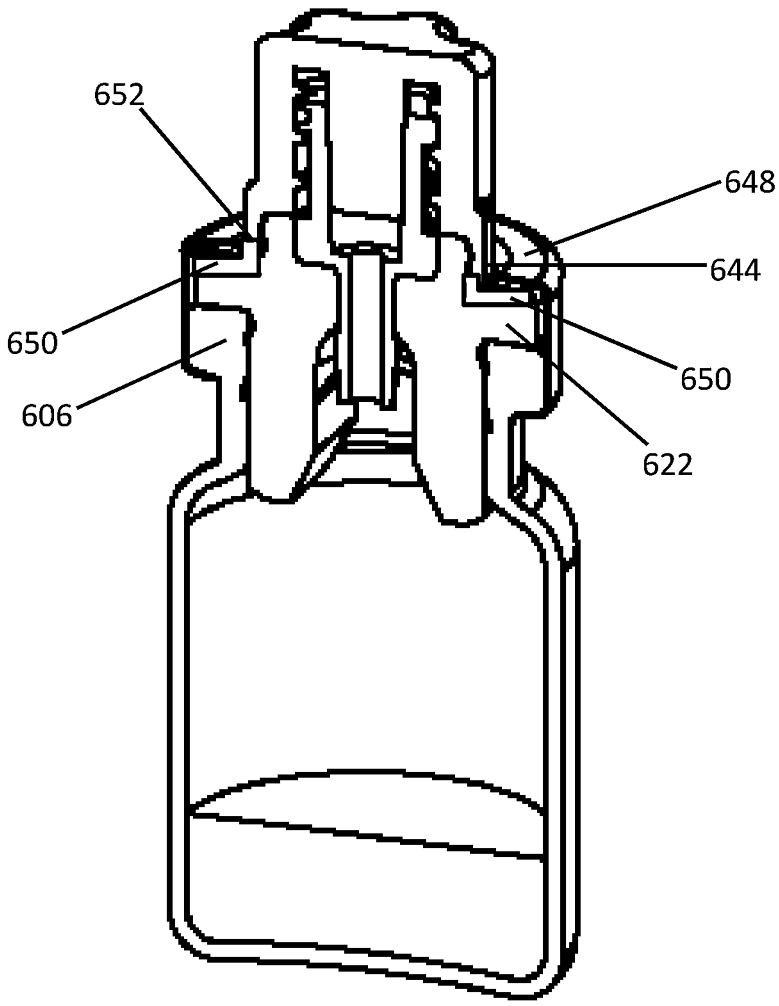
FIG. 6E illustrates a cross-sectional view of an exemplary vial assembly in a sealed configuration with a tamper-evident band.

In some embodiments, the vial assembly includes a tamper-evident band (FIG. 6E). For example, the end cap 614 can comprise a tamper-evident band 650 (which may extend from the skirt 644) that covers a portion of the annular lip 622 of the stopper 610. The ring 648 can wrap around the outer portion of the tamper-evident band, the annular lip 622 of the stopper, and the annular lip 606 on the outer surface of the vial neck. The tamper-evident band 650 can be attached to the rest of the end cap (such as to the skirt 644) by a perforated segment 652. When the end cap 614 is separated from the rest of the vial assembly, the ring 648 retains the tamper-evident band 650 and the perforate segment 652 is torn, thereby separating the tamper-evident band 650 from the end cap 614. This separation indicates that the end cap 614 has been opened.

The vial assembly can be filled by dispensing a liquid into a vial comprising a vial body and a vial neck the vial neck; and sealing the vial by attaching a vial cap to the vial neck, the vial cap having a stopper comprising a top portion and a bottom portion, the top portion having a longitudinal aperture, and the bottom portion fitting into the vial neck; a conduit having a syringe interface at a first end and a barb at a second end, the second end fitting through the aperture in the stopper; and an end cap comprising a threaded interior portion that engages the syringe interface.

The vial cap can be assembled by attaching the conduit to the end cap on the end of the conduit having the syringe interface, and attaching the conduit to the stopper on the end of the conduit having the barb. In some embodiments, the conduit is attached to the end cap prior to attaching the conduit to the stopper. In other embodiments, the conduit is attached to the stopper prior to attaching the conduit to the end cap. In some embodiments, the vial cap is pre-assembled.

After liquid has been dispensed in the vial, the vial cap can then be attached to the adapter in either a sealed configuration or an unsealed configuration. For example, the bottom portion of the stopper can have one or more elongated segments and one or more truncated segments. The bottom portion of the stopper can be inserted into the vial neck such that the elongated segments are within the vial neck and the truncated segments are not within the vial neck, thereby forming a gap (i.e., the vial cap is attached to the vial neck in an unsealed configuration). The bottom portion of the stopper then be fully inserted into the vial neck such that both one or more elongated segments and the one or more truncated segments are within the vial neck, and the vial is sealed (i.e., the vial cap is attached to the vial neck in a sealed configuration).

Optionally, the liquid dispensed in the vial is lyophilized. Lyophilization can occur, for example, by freezing the liquid and exerting a vacuum pressure. The vial can then be sealed after lyophilization. The liquid can be lyophilized at any point after the liquid is dispensed in the vial and before sealing the vial. For example, in some embodiments, the liquid is lyophilized after dispensing the liquid in the vial and prior to attaching the vial cap to the vial neck, or after attaching the vial cap to the vial neck in an unsealed configuration and prior to sealing the vial. By lyophilizing the liquid in the vial when the vial cap is in the unsealed configuration (as opposed to prior to attaching the vial cap), the risk of contamination of the liquid dispensed into the vial is minimized.

In some embodiments, a method of filing a vial assembly comprises dispensing a liquid into a vial comprising a vial body and a vial neck the vial neck; and sealing the vial by attaching a vial cap to the vial neck, the vial cap having: a stopper having a top portion and a bottom portion, the top portion comprising a longitudinal aperture, and the bottom portion that fits into the vial neck; a conduit having a syringe interface at a first end and a barb at a second end, the second end fitting through the aperture in the stopper, and said barb engaging an underside of top portion of the stopper; and an end cap having a central opening including a threaded segment that engages the syringe interface and a plug disposed in the central opening, said plug having a lower stopper portion that fits within the syringe interface of the conduit and an upper portion that attaches to an upper portion of the end cap. In some embodiments, the method further comprises attaching the end cap to the conduit. In some embodiments, the method further comprises attaching the conduit to the stopper. In some embodiments, the vial cap is pre-assembled. In some embodiments, the stopper includes an annular lip that sits on an annular lip disposed on the outer surface of the vial neck and the method further includes attaching a ring around the annular lip of the stopper and the annular lip of the vial neck, thereby securing the stopper to the vial neck. In some embodiments, the stopper comprises at least one truncated segment. In some embodiments, the method further comprises lyophilizing the liquid (for example, by partially inserting the stopper in the vial neck such that a gap is formed between the vial neck and the truncated segment of the bottom portion of the stopper, lyophilizing the liquid, and sealing the vial by fully inserting the bottom portion of the stopper into the vial neck).

In some embodiments, a method of filing a vial assembly comprises dispensing a liquid into a vial comprising a vial body and a vial neck the vial neck; and sealing the vial by attaching a vial cap to the vial neck, the vial cap having: a stopper having a top portion and a bottom portion, the top portion comprising a longitudinal aperture, and the bottom portion that fits into the vial neck; a conduit having a syringe interface at a first end and a barb at a second end, the second end fitting through the aperture in the stopper, and said barb engaging an underside of top portion of the stopper; and an end cap having a central opening including a threaded segment that engages the syringe interface and a coextruded plug disposed in the central opening, said plug having a lower stopper portion that fits within the syringe interface of the conduit and an upper portion that attaches to an upper portion of the end cap. In some embodiments, the method further comprises attaching the end cap to the conduit. In some embodiments, the method further comprises attaching the conduit to the stopper. In some embodiments, the vial cap is pre-assembled. In some embodiments, the stopper includes an annular lip that sits on an annular lip disposed on the outer surface of the vial neck and the method further includes attaching a ring around the annular lip of the stopper and the annular lip of the vial neck, thereby securing the stopper to the vial neck. In some embodiments, the stopper comprises at least one truncated segment. In some embodiments, the method further comprises lyophilizing the liquid (for example, by partially inserting the stopper in the vial neck such that a gap is formed between the vial neck and the truncated segment of the bottom portion of the stopper, lyophilizing the liquid, and sealing the vial by fully inserting the bottom portion of the stopper into the vial neck).

In some embodiments, a method of filing a vial assembly comprises dispensing a liquid into a vial comprising a vial body and a vial neck the vial neck; and sealing the vial by attaching a vial cap to the vial neck, the vial cap having: a stopper having a top portion and a bottom portion, the top portion comprising a longitudinal aperture, and the bottom portion that fits into the vial neck; a conduit having a syringe interface at a first end and a barb at a second end, the second end fitting through the aperture in the stopper, and said barb engaging an underside of top portion of the stopper; and an end cap having a central opening including a threaded segment that engages the syringe interface and a rim, said end cap carrying a plug in the central opening, said plug having a lower stopper portion that fits within the syringe interface of the conduit and an upper portion including a top portion defining a restraint coupled to a reduced diameter region defining an annulus, wherein the rim of the end cap extends into the annulus to hold the plug in place. In some embodiments, the method further comprises attaching the end cap to the conduit. In some embodiments, the method further comprises attaching the conduit to the stopper. In some embodiments, the vial cap is pre-assembled. In some embodiments, the stopper includes an annular lip that sits on an annular lip disposed on the outer surface of the vial neck and the method further includes attaching a ring around the annular lip of the stopper and the annular lip of the vial neck, thereby securing the stopper to the vial neck. In some embodiments, the stopper comprises at least one truncated segment. In some embodiments, the method further comprises lyophilizing the liquid (for example, by partially inserting the stopper in the vial neck such that a gap is formed between the vial neck and the truncated segment of the bottom portion of the stopper, lyophilizing the liquid, and sealing the vial by fully inserting the bottom portion of the stopper into the vial neck).

In some embodiments, a method of filing a vial assembly comprises dispensing a liquid into a vial comprising a vial body and a vial neck the vial neck; and sealing the vial by attaching a vial cap to the vial neck, the vial cap having: a stopper having a top portion and a bottom portion, the top portion comprising a longitudinal aperture, and the bottom portion that fits into the vial neck; a conduit having a syringe interface at a first end and a barb at a second end, the second end fitting through the aperture in the stopper, and said barb engaging an underside of top portion of the stopper; and an end cap having a central opening including a threaded segment that engages the syringe interface and a rim, said end cap carrying a plug in the central opening, said plug having a lower stopper portion that fits within the syringe interface of the conduit, a central body with a diameter wider than the lower stopper portion (the central body optionally including a plurality of compression ridges), and an upper portion including a top portion defining a restraint (which can optionally have a domed surface or a beveled rim) coupled to a reduced diameter region defining an annulus, wherein the rim of the end cap extends into the annulus to hold the plug in place. In some embodiments, the method further comprises attaching the end cap to the conduit. In some embodiments, the method further comprises attaching the conduit to the stopper. In some embodiments, the vial cap is pre-assembled. In some embodiments, the stopper includes an annular lip that sits on an annular lip disposed on the outer surface of the vial neck and the method further includes attaching a ring around the annular lip of the stopper and the annular lip of the vial neck, thereby securing the stopper to the vial neck. In some embodiments, the stopper comprises at least one truncated segment. In some embodiments, the method further comprises lyophilizing the liquid (for example, by partially inserting the stopper in the vial neck such that a gap is formed between the vial neck and the truncated segment of the bottom portion of the stopper, lyophilizing the liquid, and sealing the vial by fully inserting the bottom portion of the stopper into the vial neck).

A user can fill a syringe by detaching (for example, by unscrewing) the end cap from the conduit, attaching the syringe to the syringe interface of the conduit, and drawing liquid contained within the vial into the syringe. In some embodiments, detaching the end cap comprises severing a tamper-evident band. The syringe can comprise a male luer, which can interface with the syringe interface (which may comprise, for example, threading on the outer surface of the vial neck or a female luer). In some embodiments, the syringe is pre-filled with a liquid, and that liquid is dispensed into the vial after attaching the syringe to the syringe interface of the conduit. If a powder is contained within the vial, for example, the liquid from the pre-filled syringe can be used to suspend or dissolve the powder before the liquid is drawn into the syringe. In some embodiments, the vial contains a first liquid, and the syringe can be pre-filled with a second liquid. The second liquid can be dispensed into the vial and mix with the first liquid before the mixture is drawn from the vial by the syringe.

In some embodiments, a method of filling a syringe comprises detaching an end cap from a vial assembly (for example, by unscrewing the end cap), said vial assembly comprising: a vial having a vial body and a vial neck, the vial neck having an inner surface and an outer surface, the outer surface having an annular lip; and a vial cap having a stopper having a top portion and a bottom portion, the top portion comprising a longitudinal aperture, and the bottom portion that fits into the vial neck; a conduit having a syringe interface at a first end and a barb at a second end, the second end fitting through the aperture in the stopper, and said barb engaging an underside of top portion of the stopper; and the end cap; said end cap having a central opening including a threaded segment that engages the syringe interface and a plug disposed in the central opening, said plug having a lower stopper portion that fits within the syringe interface of the conduit and an upper portion that attaches to an upper portion of the end cap; attaching a syringe to the syringe interface (which can comprise a male luer, such as a male luer lock or a male luer slip); and drawing a liquid contained within the vial into the syringe. In some embodiments, the method further includes forming the liquid by adding a solution to the vial (which may be contained within the syringe), and dissolving or suspending a lyophilized powder contained within the vial.

In some embodiments, a method of filling a syringe comprises detaching an end cap from a vial assembly (for example, by unscrewing the end cap), said vial assembly comprising: a vial having a vial body and a vial neck, the vial neck having an inner surface and an outer surface, the outer surface having an annular lip; and a vial cap having a stopper having a top portion and a bottom portion, the top portion comprising a longitudinal aperture, and the bottom portion that fits into the vial neck; a conduit having a syringe interface at a first end and a barb at a second end, the second end fitting through the aperture in the stopper, and said barb engaging an underside of top portion of the stopper; and the end cap; said end cap having a central opening including a threaded segment that engages the syringe interface and a coextruded plug disposed in the central opening, said plug having a lower stopper portion that fits within the syringe interface of the conduit and an upper portion that attaches to an upper portion of the end cap; attaching a syringe to the syringe interface (which can comprise a male luer, such as a male luer lock or a male luer slip); and drawing a liquid contained within the vial into the syringe. In some embodiments, the method further includes forming the liquid by adding a solution to the vial (which may be contained within the syringe), and dissolving or suspending a lyophilized powder contained within the vial.

In some embodiments, a method of filling a syringe comprises detaching an end cap from a vial assembly (for example, by unscrewing the end cap), said vial assembly comprising: a vial having a vial body and a vial neck, the vial neck having an inner surface and an outer surface, the outer surface having an annular lip; and a vial cap having a stopper having a top portion and a bottom portion, the top portion comprising a longitudinal aperture, and the bottom portion that fits into the vial neck; a conduit having a syringe interface at a first end and a barb at a second end, the second end fitting through the aperture in the stopper, and said barb engaging an underside of top portion of the stopper; and the end cap; said end cap having a central opening including a threaded segment that engages the syringe interface and a rim, and said end cap carrying a plug in the central opening, said plug having a lower stopper portion that fits within the syringe interface of the conduit and an upper portion including a top portion defining a restraint coupled to a reduced diameter region defining an annulus, wherein the rim of the end cap extends into the annulus to hold the plug in place; attaching a syringe to the syringe interface (which can comprise a male luer, such as a male luer lock or a male luer slip); and drawing a liquid contained within the vial into the syringe. In some embodiments, the method further includes forming the liquid by adding a solution to the vial (which may be contained within the syringe), and dissolving or suspending a lyophilized powder contained within the vial.

In some embodiments, a method of filling a syringe comprises detaching an end cap from a vial assembly (for example, by unscrewing the end cap), said vial assembly comprising: a vial having a vial body and a vial neck, the vial neck having an inner surface and an outer surface, the outer surface having an annular lip; and a vial cap having a stopper having a top portion and a bottom portion, the top portion comprising a longitudinal aperture, and the bottom portion that fits into the vial neck; a conduit having a syringe interface at a first end and a barb at a second end, the second end fitting through the aperture in the stopper, and said barb engaging an underside of top portion of the stopper; and the end cap; said end cap having a central opening including a threaded segment that engages the syringe interface and a rim, and said end cap carrying a plug in the central opening, said plug having a lower stopper portion that fits within the syringe interface of the conduit, a central body with a diameter wider than the lower stopper portion (the central body optionally including a plurality of compression ridges), and an upper portion including a top portion defining a restraint (which can optionally have a domed surface or a beveled rim) coupled to a reduced diameter region defining an annulus, wherein the rim of the end cap extends into the annulus to hold the plug in place; attaching a syringe to the syringe interface (which can comprise a male luer, such as a male luer lock or a male luer slip); and drawing a liquid contained within the vial into the syringe. In some embodiments, the method further includes forming the liquid by adding a solution to the vial (which may be contained within the syringe), and dissolving or suspending a lyophilized powder contained within the vial.

Features and preferences described above in relation to "embodiments" are distinct preferences and are not limited only to that particular embodiment; they may be freely combined with features from other embodiments, where technically feasible, and may form preferred combinations of features.

The description is presented to enable one of ordinary skill in the art to make and use the invention and is provided in the context of a patent application and its requirements. Various modifications to the described embodiments will be readily apparent to those persons skilled in the art and the generic principles herein may be applied to other embodiments. Thus, the present invention is not intended to be limited to the embodiment shown but is to be accorded the widest scope consistent with the principles and features described herein.

EXEMPLARY EMBODIMENTS

The following embodiments are exemplary and are not intended to limit the scope of the invention.

Embodiment 1. A vial assembly comprising:

a vial comprising a vial body and a vial neck, the vial neck having a syringe interface; and a vial cap having a central opening including a threaded segment that engages the syringe interface and a plug, said plug having a lower stopper portion that fits within the vial neck and an upper portion that attaches to an upper portion of the vial cap.

Embodiment 2. The vial assembly of embodiment 1, wherein the vial cap and the plug are coextruded.

Embodiment 3. The vial assembly of embodiment 1, the vial cap further including a rim, the upper portion of the plug including a top portion defining a restraint coupled to a reduced diameter region defining an annulus, wherein the rim of the vial cap extends into the annulus to hold the plug in place.

Embodiment 4. The vial assembly of embodiment 3, wherein the plug further includes a central body with a diameter wider than the lower stopper portion.

Embodiment 5. The vial assembly of embodiment 4, wherein the central body of the plug comprises a plurality of lateral compression ridges.

Embodiment 6. The vial assembly of any one of embodiments 3-5, wherein the restraint comprises a domed surface.

Embodiment 7. The vial assembly of any one of embodiments 3-5, wherein the restraint comprises a beveled rim.

Embodiment 8. The vial assembly of any one of embodiments 3-7, wherein the rim that extends into the annulus of the plug comprises an angled inner surface.

Embodiment 9. The vial assembly of any one of embodiments 3-8, wherein the rim that extends into the annulus of the plug is formed by an aperture on a top surface of the vial cap.

Embodiment 10. The vial assembly of any one of embodiments 3-8, wherein the rim that extends into the annulus of the plug protrudes into the central opening of the vial cap.

Embodiment 11. A vial assembly comprising:

a vial comprising a vial body and a vial neck, the vial neck having a syringe interface; and a vial cap comprising a first component and a second component, said first component having an internal threaded segment that engages the syringe interface and an outer surface comprising a plurality of longitudinally extending ribs separated by a plurality of longitudinally extending channels, said second component including a plurality of longitudinally extending prongs that engage with a surface in the channels on the outer surface of the first component, said second component further including a central opening formed by the plurality of longitudinally extending prongs, and a plug disposed in the central opening, said plug having a lower stopper portion that fits within the vial neck and an upper portion that attaches to an upper portion of the second component.

Embodiment 12. The vial assembly of embodiment 11, wherein the second component and the plug are coextruded.

Embodiment 13. The vial assembly of embodiment 11, wherein the second component further includes a rim, wherein the upper portion of the plug includes a top portion defining a restraint coupled to a reduced diameter region defining an annulus, and wherein the rim of the second component extends into the annulus to hold the plug in place.

Embodiment 14. The vial assembly of embodiment 13, wherein the plug further includes a central body with a diameter wider than the lower stopper portion.

Embodiment 15. The vial assembly of embodiment 14, wherein the central body of the plug comprises a plurality of lateral compression ridges.

Embodiment 16. The vial assembly of any one of embodiments 13-15, wherein the restraint comprises a domed surface.

Embodiment 17. The vial assembly of any one of embodiments 13-15, wherein the restraint comprises a beveled rim.

Embodiment 18. The vial assembly of any one of embodiments 13-17, wherein the rim that extends into the annulus of the plug comprises an angled inner surface.

Embodiment 19. The vial assembly of any one of embodiments 13-18, wherein the rim that extends into the annulus of the plug is formed by an aperture on a top surface of the vial cap.

Embodiment 20. The vial assembly of any one of embodiments 13-18, wherein the rim that extends into the annulus of the plug protrudes into the central opening of the vial cap.

Embodiment 21. The vial assembly of any one of embodiments 11-20, wherein at least one of the prongs in the plurality of longitudinally extending prongs comprises an anchor that engages a counter-anchor disposed in a channel in the plurality of longitudinally extending channels.

Embodiment 22. The vial assembly of any one of embodiments 1-21, wherein the vial neck is tapered.

Embodiment 23. The vial assembly of any one of embodiments 1-22, wherein the syringe interface is a second threaded segment on an outer surface of the vial neck.

Embodiment 24. The vial assembly of any one of embodiments 1-22, wherein the syringe interface is a female luer.

Embodiment 25. The vial assembly of any one of embodiments 1-24, wherein the stopper portion of the plug forms a seal with the inner surface of the vial neck.

Embodiment 26. The vial assembly of any one of embodiments 1-25, wherein the vial assembly comprises a tamper-evident band.

Embodiment 27. The vial assembly of embodiment 26, wherein the vial comprises an annular lip disposed on the outer surface of the vial neck;

the tamper-evident band is attached to the vial cap; and the annular lip disposed on the outer surface of the vial neck secures the tamper-evident band to the vial.

Embodiment 28. The vial assembly of any one of embodiments 1-27, wherein the vial body has an open base.

Embodiment 29. The vial assembly of any one of embodiments 1-27, wherein the vial body includes a base that is sealed with a thermoformed plastic or foil.

Embodiment 30. A vial assembly comprising:

a vial having a vial body and a vial neck;

an adapter having a top portion having a syringe interface, a bottom portion having a vial neck fitting attached to the vial neck, and a channel fluidly connecting the syringe interface to the vial neck;

a gasket disposed between the vial neck and the adapter; and a vial cap having a central opening including a threaded segment that engages the syringe interface and a plug, said plug having a lower stopper portion that fits within the vial neck and an upper portion that attaches to an upper portion of the vial cap.

Embodiment 31. The vial assembly of embodiment 30, wherein the vial cap and the plug are coextruded.

Embodiment 32. The vial assembly of embodiment 30, the vial cap further including a rim, the upper portion of the plug including a top portion defining a restraint coupled to a reduced diameter region defining an annulus, wherein the rim of the vial cap extends into the annulus to hold the plug in place.

Embodiment 33. The vial assembly of embodiment 32, wherein the plug further includes a central body with a diameter wider than the lower stopper portion.

Embodiment 34. The vial assembly of embodiment 33, wherein the central body of the plug comprises a plurality of lateral compression ridges.

Embodiment 35. The vial assembly of any one of embodiments 32-34, wherein the restraint comprises a domed surface.

Embodiment 36. The vial assembly of any one of embodiments 32-34, wherein the restraint comprises a beveled rim.

Embodiment 37. The vial assembly of any one of embodiments 32-36, wherein the rim that extends into the annulus of the plug comprises an angled inner surface.

Embodiment 38. The vial assembly of any one of embodiments 32-37, wherein the rim that extends into the annulus of the plug is formed by an aperture on a top surface of the vial cap.

Embodiment 39. The vial assembly of any one of embodiments 32-37, wherein the rim that extends into the annulus of the plug protrudes into the central opening of the vial cap.

Embodiment 40. The vial assembly of any one of embodiments 30-39, wherein the vial cap comprises a skirt that surrounds a portion of the vial neck fitting of the adapter.

Embodiment 41. The vial assembly of any one of embodiments 30-40, wherein the syringe interface is a tapered conduit.

Embodiment 42. The vial assembly of any one of embodiments 30-41 wherein the syringe interface is a second threaded segment on an outer surface of a conduit.

Embodiment 43. The vial assembly of any one of embodiments 30-42, wherein the syringe interface is a female luer.

Embodiment 44. The vial assembly of any one of embodiments 30-43, wherein the vial neck fitting comprises a plurality of prongs that comprise an anchor that engages an annular lip on the vial neck.

Embodiment 45. The vial assembly of any one of embodiments 30-44, wherein the vial cap comprises an outer surface comprising a plurality of longitudinally extending ribs.

Embodiment 46. The vial assembly of any one of embodiments 30-45, wherein the vial assembly comprises a tamper-evident band.

Embodiment 47. The vial assembly of embodiment 46, wherein the vial cap comprises a skirt that surrounds a portion of the vial neck fitting of the adapter;

the tamper-evident band is attached to the skirt; and the adapter secures the tamper-evident band to the vial.

Embodiment 48. A vial assembly comprising:

a vial having a vial body and a vial neck, the vial neck comprising an inner surface and an outer surface, the outer surface comprising an annular lip; and a vial cap having:

a stopper having a top portion and a bottom portion, the top portion comprising a longitudinal aperture, and the bottom portion that fits into the vial neck;

a conduit having a syringe interface at a first end and a barb at a second end, the second end fitting through the aperture in the stopper, and said barb engaging an underside of the top portion of the stopper; and an end cap having a central opening including a threaded segment that engages the syringe interface and a plug disposed in the central opening, said plug having a lower stopper portion that fits within the syringe interface of the conduit and an upper portion that attaches to an upper portion of the end cap.

Embodiment 49. The vial assembly of embodiment 48, wherein the end cap and the plug are coextruded.

Embodiment 50. The vial assembly of embodiment 48, wherein the end cap further includes a rim, wherein the upper portion of the plug includes a top portion defining a restraint coupled to a reduced diameter region defining an annulus, and wherein the rim of the end cap extends into the annulus to hold the plug in place.

Embodiment 51. The vial assembly of embodiment 50, wherein the plug further includes a central body with a diameter wider than the lower stopper portion.

Embodiment 52. The vial assembly of embodiment 51, wherein the central body of the plug comprises a plurality of lateral compression ridges.

Embodiment 53. The vial assembly of any one of embodiments 50-52, wherein the restraint comprises a domed surface.

Embodiment 54. The vial assembly of any one of embodiments 50-52, wherein the restraint comprises a beveled rim.

Embodiment 55. The vial assembly of any one of embodiments 50-54, wherein the rim that extends into the annulus of the plug comprises an angled inner surface.

Embodiment 56. The vial assembly of any one of embodiments 50-55, wherein the rim that extends into the annulus of the plug is formed by an aperture on a top surface of the vial cap.

Embodiment 57. The vial assembly of any one of embodiments 50-56, wherein the rim that extends into the annulus of the plug protrudes into the central opening of the vial cap.

Embodiment 58. The vial assembly of any one of embodiments 48-57, wherein the syringe interface is tapered.

Embodiment 59. The vial assembly of any one of embodiments 48-58, wherein the syringe interface is a second threaded segment on an outer surface of the syringe interface.

Embodiment 60. The vial assembly of any one of embodiments 48-58, wherein the syringe interface is a female luer.

Embodiment 61. The vial assembly of any one of embodiments 48-60, wherein:

the stopper comprises a raised annular ridge around the aperture at the top of the stopper; and the end cap comprises a skirt that fits around the raised annular ridge.

Embodiment 62. The vial assembly of any one of embodiments 48-61, wherein the stopper comprises an annular lip that sits on the annular lip disposed on an outer surface of the vial neck.

Embodiment 63. The vial assembly of embodiment 62, wherein the vial assembly further comprises a ring that secures the stopper to the vial neck.

Embodiment 64. The vial assembly of any one of embodiments 48-62, further comprising a tamper-evident band.

Embodiment 65. The vial assembly of embodiment 63, wherein the end cap comprises a tamper-evident band that covers a portion of the annular lip, and the ring secures the temper-evident band and the stopper to the vial neck.

Embodiment 66. The vial assembly of any one of embodiments 48-65, wherein the bottom portion of the stopper comprises at least one truncated segment.

Embodiment 67. A method of filing a vial assembly comprising:

dispensing a liquid comprising the substance into a vial assembly comprising:

a vial having a vial body and a vial neck, the vial neck having a syringe interface; and a vial cap having a central opening including a threaded segment that engages the syringe interface and a plug, said plug having a lower stopper portion that fits within the vial neck and an upper portion that attaches to an upper portion of the vial cap;

wherein the liquid is dispensed through an open base of the vial body; and sealing the base of the vial body after the liquid has been dispensed.

Embodiment 68. The method of embodiment 67, the vial cap further including a rim, the upper portion of the plug including a top portion defining a restraint coupled to a reduced diameter region defining an annulus, wherein the rim of the vial cap extends into the annulus to hold the plug in place.

Embodiment 69. The method of embodiment 68, wherein the plug further includes a central body with a diameter wider than the lower stopper portion.

Embodiment 70. The method of embodiment 68 or 69, further including the step of attaching the plug to the vial cap.

Embodiment 71. The method of embodiment 67, wherein the vial cap and the plug are coextruded.

Embodiment 72. The method of any one of embodiments 67-71, further including the step of attaching the vial cap to the vial neck.

Embodiment 73. The method of any one of embodiments 67-72, further including the step of lyophilizing the liquid prior to sealing the base of the vial body.

Embodiment 74. The method of any one of embodiments 67-73, further including the steps of:

detaching the vial cap from the vial neck, attaching a syringe to the vial neck, and drawing the liquid into the syringe.

Embodiment 75. The method of embodiment 67-74, further including the steps of:

detaching the vial cap from the vial neck, attaching a syringe to the vial neck, dispensing a second liquid into the vial after attaching the syringe to the vial neck, drawing the liquid into the syringe.

Embodiment 76. The method of any one of embodiments 67-75, wherein the base of the vial body is sealed with a thermoformed plastic or foil.

Embodiment 77. The method of any one of embodiments 67-76, wherein the vial neck is tapered.

Embodiment 78. The method of any one of embodiments 67-77, wherein the syringe interface is a second threaded segment on an outer surface of the vial neck.

Embodiment 79. The method of any one of embodiments 67-77, wherein the syringe interface is a female luer.

Embodiment 80. A method of filling a vial assembly comprising:

dispensing a liquid into a vial comprising a vial body and a vial neck, the vial neck having a syringe interface;

attaching a first component of a vial cap to the vial neck, said first component having an internal threaded segment that engages the syringe interface and an outer surface comprising a plurality of longitudinally extending ribs separated by a plurality of longitudinally extending channels; and sealing the vial by attaching a second component of the vial cap to the first component, said second component including a plurality of longitudinally extending prongs that engage with a surface in the channels on the outer surface of the first component, said second component further including a central opening formed by the plurality of longitudinally extending prongs, and a plug disposed in the central opening, said plug having a lower stopper portion that fits within the vial neck and an upper portion that attaches to an upper portion of the second component.

Embodiment 81. The method of embodiment 80, wherein the second component further includes a rim, wherein the upper portion of the plug includes a top portion defining a restraint coupled to a reduced diameter region defining an annulus, and wherein the rim of the vial cap extends into the annulus to hold the plug in place.

Embodiment 82. The method of embodiment 81, wherein the plug further includes a central body with a diameter wider than the lower stopper portion.

Embodiment 83. The method of any one of embodiments 80-83, further including the step of attaching the plug to the second component of the vial cap.

Embodiment 84. The method of embodiment 80, wherein the second component and the plug are coextruded.

Embodiment 85. The method of any one of embodiments 80-84, wherein sealing the vial includes engaging an anchor on at least one of the prongs in the plurality of longitudinally disposed prongs with a counter-anchor disposed in a channel in the plurality of longitudinally disposed channels.

Embodiment 86. The method of any one of embodiments 80-85, wherein the first component of the vial cap is attached to the vial neck prior to dispensing the liquid into the vial.

Embodiment 87. The method of any one of embodiments 80-85, wherein the liquid is dispensed into the vial prior to attaching the first component of the vial cap to the vial neck.

Embodiment 88. The method of any one of embodiments 80-87, further including the steps of:

detaching the vial cap from the vial neck, attaching a syringe to the vial neck, and drawing the liquid into the syringe.

Embodiment 89. The method of any one of embodiments 80-87, further including the step of lyophilizing the liquid prior to sealing the vial.

Embodiment 90. The method of embodiment 89, further comprising partially engaging the second component with the first component without forming a seal prior to lyophilizing the liquid.

Embodiment 91. The method of any one of embodiments 80-87, 89 and 90, further including the steps of:

detaching the vial cap from the vial neck, attaching a syringe to the vial neck, dispensing a second liquid into the vial after attaching the syringe to the vial neck, and drawing the liquid into the syringe.

Embodiment 92. The method of any one of embodiments 80-91, wherein the syringe interface is tapered.

Embodiment 93. The method of any one of embodiments 80-92, wherein the syringe interface is a second threaded segment on an outer surface of the vial neck.

Embodiment 94. The method of any one of embodiments 80-91, wherein the syringe interface is a female luer.

Embodiment 95. A method of filling a vial assembly comprising:

dispensing a liquid into a vial comprising a vial body and a vial neck;

attaching an adapter to the vial neck, said adapter comprising a top portion having a syringe interface, a bottom portion having a vial neck fitting, a gasket fitting within the vial neck fitting, and a longitudinally extending channel fluidly connecting the syringe interface to the vial neck; and sealing the vial by attaching a vial cap to the adapter, said vial cap having a central opening including a threaded segment that engages the syringe interface and a plug, said plug having a lower stopper portion that fits within the vial neck and an upper portion that attaches to an upper portion of the vial cap.

Embodiment 96. The method of embodiment 95, further comprising fitting the gasket along an inner edge of the vial neck fitting prior to attaching the adapter to the vial neck.

Embodiment 97. The method of embodiment 95 or 96, comprising attaching the vial cap to the adapter prior to attaching the adapter to the vial neck.

Embodiment 98. The method of any one of embodiments 95-97, the vial cap further including a rim, the upper portion of the plug including a top portion defining a restraint coupled to a reduced diameter region defining an annulus, wherein the rim of the vial cap extends into the annulus to hold the plug in place.

Embodiment 99. The method of embodiment 98, wherein the plug further includes a central body with a diameter wider than the lower stopper portion.

Embodiment 100. The method of embodiment 99, further including the step of attaching the plug to the vial cap.

Embodiment 101. The method of any one of embodiments 95-97, wherein the vial cap and the plug are coextruded.

Embodiment 102. The method of any one of embodiments 95-101, wherein the liquid is dispensed into the vial after attaching the adapter to the vial neck.

Embodiment 103. The method of any one of embodiments 95-102, further including the step of lyophilizing the liquid.

Embodiment 104. The method of embodiment 103, including the steps of:

placing the vial cap on the adapter in an unsealed configuration prior to lyophilizing the liquid; and sealing the vial by tightening the vial cap after lyophilizing the liquid.

Embodiment 105. The method of any one of embodiments 95-102, further including the steps of:

detaching the vial cap from the vial neck, attaching a syringe to the vial neck, and drawing the liquid into the syringe.

Embodiment 106. The method of any one of embodiments 95-104, further including the steps of:

detaching the vial cap from the vial neck, attaching a syringe to the vial neck, dispensing a second liquid into the vial after attaching the syringe to the vial neck, and drawing the liquid into the syringe.

Embodiment 107. The method of any one of embodiments 95-106, wherein the syringe interface is tapered.

Embodiment 108. The method of any one of embodiments 95-107, wherein the syringe interface is a second threaded segment on an outer surface of the vial neck.

Embodiment 109. The method of any one of embodiments 95-107, wherein the syringe interface is a female luer.

Embodiment 110. A method of filling a vial assembly comprising:

dispensing a liquid into a vial comprising a vial body and a vial neck the vial neck; and sealing the vial by attaching a vial cap to the vial neck, the vial cap having:

a stopper having a top portion and a bottom portion, the top portion comprising a longitudinal aperture, and the bottom portion that fits into the vial neck;

a conduit having a syringe interface at a first end and a barb at a second end, the second end fitting through the aperture in the stopper, and said barb engaging an underside of top portion of the stopper; and an end cap having a central opening including a threaded segment that engages the syringe interface and a plug disposed in the central opening, said plug having a lower stopper portion that fits within the syringe interface of the conduit and an upper portion that attaches to an upper portion of the end cap.

Embodiment 111. The method of embodiment 110, wherein the end cap and the plug are coextruded.

Embodiment 112. The method of embodiment 110, wherein the end cap further includes a rim, wherein the upper portion of the plug includes a top portion defining a restraint coupled to a reduced diameter region defining an annulus, and wherein the rim of the end cap extends into the annulus to hold the plug in place.

Embodiment 113. The method of embodiment 112, wherein the plug further includes a central body with a diameter wider than the lower stopper portion.

Embodiment 114. The method of any one of embodiments 110-113, further including the step of attaching the conduit to the end cap.

Embodiment 115. The method of any one of embodiments 110-114, further including the step of attaching the conduit to the stopper.

Embodiment 116. The method of any one of embodiments 110-113, wherein the vial cap is pre-assembled.

Embodiment 117. The method of any one of embodiments 110-116, wherein the stopper includes an annular lip that sits on an annular lip disposed on an outer surface of the vial neck.

Embodiment 118. The method of embodiment 117, further including the step of securing the stopper to the vial neck by attaching a ring around the annular lip of the stopper and the annular lip of the vial neck.

Embodiment 119. The method of any one of embodiments 110-117, further including the step of lyophilizing the liquid prior to sealing the vial.

Embodiment 120. The method of embodiment 119, including the step of partially inserting the bottom portion of the stopper into the vial neck prior to lyophilizing the liquid.

Embodiment 121. The method of embodiment 119 or 120, including the step of fully inserting the bottom portion of the stopper into the vial neck after lyophilizing the liquid.

Embodiment 122. The method of any one of embodiments 110-119, further including the steps of:

detaching the vial cap from the vial neck,
attaching a syringe to the vial neck, and
drawing the liquid into the syringe.

Embodiment 123. The method of any one of embodiments 110-121, further including the steps of:
detaching the vial cap from the vial neck,
attaching a syringe to the vial neck,
dispensing a second liquid into the vial after attaching the syringe to the vial neck, and
drawing the liquid into the syringe.

Embodiment 124. The method of any one of embodiments 110-123, wherein the syringe interface is a second threaded segment on an outer surface of the vial neck.

Embodiment 125. The method of any one of embodiments 110-123, wherein the syringe interface is a female luer.

Embodiment 126. A method of filling a syringe, comprising:
detaching a vial cap from a vial,
the vial having a vial body and a vial neck, the vial neck having a syringe interface; and
the vial cap having a central opening including a threaded segment that engages the syringe interface and a plug, said plug having a lower stopper portion that fits within the vial neck and an upper portion that attaches to an upper portion of the vial cap;
attaching a syringe to the vial neck; and
drawing a liquid contained within the vial into the syringe.

Embodiment 127. The method of embodiment 126, wherein the vial cap and the plug are coextruded.

Embodiment 128. The method of embodiment 126, wherein the vial cap further includes a rim, wherein the upper portion of the plug includes a top portion defining a restraint coupled to a reduced diameter region defining an annulus, and wherein the rim of the vial cap extends into the annulus to hold the plug in place.

Embodiment 129. The method of embodiment 128, wherein the plug further includes a central body with a diameter wider than the lower stopper portion.

Embodiment 130. A method of filling a syringe, comprising:
detaching a vial cap from a vial,
the vial having a vial body and a vial neck, the vial neck having a syringe interface; and
the vial cap comprising a first component and a second component, said first component having an internal threaded segment that engages the syringe interface and an outer surface comprising a plurality of longitudinally extending ribs separated by a plurality of longitudinally extending channels, said second component including a plurality of longitudinally extending prongs that engage with a surface in the channels on the outer surface of the first component, said second component further including a central opening formed by the plurality of longitudinally extending prongs and a plug disposed in the central opening, said plug having a lower stopper portion that fits within the vial neck and an upper portion that attaches to an upper portion of the second component;
attaching a syringe to the syringe interface of the vial neck; and
drawing a liquid contained within the vial into the syringe.

Embodiment 131. The method of embodiment 130, wherein the second component and the plug are coextruded.

Embodiment 132. The method of embodiment 130, wherein the second component further includes a rim, wherein the upper portion of the plug includes a top portion defining a restraint coupled to a reduced diameter region defining an annulus, and wherein the rim of the second component extends into the annulus to hold the plug in place.

Embodiment 133. The method of embodiment 132, wherein the plug further includes a central body with a diameter wider than the lower stopper portion.

Embodiment 134. The method of any one of embodiments 130-133, wherein at least one of the prongs in the plurality of longitudinally extending prongs comprises an anchor that engages a counter-anchor disposed in a channel in the plurality of longitudinally extending channels.

Embodiment 135. The method of any one of embodiments 126-134, wherein the vial neck is tapered.

Embodiment 136. The method of any one of embodiments 126-135, wherein the syringe interface is a second threaded segment on an outer surface of the vial neck.

Embodiment 137. The method of any one of embodiments 126-135, wherein the syringe interface is a female luer.

Embodiment 138. The method of any one of embodiments 126-137, wherein the step of detaching the vial cap includes unscrewing the vial cap.

Embodiment 139. The method of any one of embodiments 126-138, wherein the syringe comprises a male luer lock that interfaces with the syringe interface.

Embodiment 140. The method of any one of embodiments 126-139, further including the step of forming the liquid by adding a solution to the vial, and dissolving or suspending a lyophilized powder contained within the vial.

Embodiment 141. The method of any one of embodiments 126-140, wherein the step of detaching the vial cap includes severing a tamper-evident band from the vial cap.

Embodiment 142. A method of filling a syringe, comprising:
detaching a vial cap from a vial assembly comprising:
a vial comprising a vial body and a vial neck;
an adapter comprising a top portion having a syringe interface, a bottom portion having a vial neck fitting attached to the vial neck, and a channel fluidly connecting the syringe interface to the vial neck;
a gasket disposed between the vial neck and the adapter; and
the vial cap; said vial cap having a central opening including a threaded segment that engages the syringe interface and a plug, said plug having a lower stopper portion that fits within the vial neck and an upper portion that attaches to an upper portion of the vial cap;
attaching a syringe to the syringe interface; and
drawing a liquid contained within the vial into the syringe.

Embodiment 143. The method of embodiment 142, wherein the end cap and the plug are coextruded.

Embodiment 144. The method of embodiment 142, the vial cap further including a rim, the upper portion of the plug including a top portion defining a restraint coupled to a reduced diameter region defining an annulus, wherein the rim of the vial cap extends into the annulus to hold the plug in place.

Embodiment 145. The method of embodiment 144, wherein the plug further includes a central body with a diameter wider than the lower stopper portion.

Embodiment 146. The method of any one of embodiments 142-145, wherein the syringe interface is tapered.

Embodiment 147. The method of any one of embodiments 142-146, wherein the syringe interface is a second threaded segment on an outer surface of a conduit.

Embodiment 148. The method of any one of embodiments 142-146, wherein the syringe interface is a female luer.

Embodiment 149. The method of any one of embodiments 142-148, wherein the syringe comprises a male luer lock that interfaces with the syringe interface.

Embodiment 150. The method of any one of embodiments 142-149, further including the step of forming the liquid by adding a solution to the vial, and dissolving or suspending a lyophilized powder contained within the vial.

Embodiment 151. The method of any one of embodiments 142-150, wherein the step of detaching the vial cap includes unscrewing the vial cap.

Embodiment 152. The method of any one of embodiments 142-151, wherein the step of detaching the vial cap includes severing a tamper-evident band from the vial cap.

Embodiment 153. A method of filling a syringe, comprising:

detaching an end cap from a vial assembly comprising:

a vial having a vial body and a vial neck, the vial neck having an inner surface and an outer surface, the outer surface having an annular lip; and a vial cap having:

a stopper having a top portion and a bottom portion, the top portion comprising a longitudinal aperture, and the bottom portion that fits into the vial neck;

a conduit having a syringe interface at a first end and a barb at a second end, the second end fitting through the aperture in the stopper, and said barb engaging an underside of top portion of the stopper; and the end cap; said end cap having a central opening including a threaded segment that engages the syringe interface and a plug disposed in the central opening, said plug having a lower stopper portion that fits within the syringe interface of the conduit and an upper portion that attaches to an upper portion of the end cap;

attaching a syringe to the syringe interface; and drawing a liquid contained within the vial into the syringe.

Embodiment 154. The method of embodiment 153, wherein the end cap and the plug are coextruded.

Embodiment 155. The method of embodiment 153, wherein the end cap further includes a rim, wherein the upper portion of the plug includes a top portion defining a restraint coupled to a reduced diameter region defining an annulus, and wherein the rim of the end cap extends into the annulus to hold the plug in place.

Embodiment 156. The method of embodiment 155, wherein the plug further includes a central body with a diameter wider than the lower stopper portion.

Embodiment 157. The method of any one of embodiments 153-156, wherein the syringe interface is tapered.

Embodiment 158. The method of any one of embodiments 153-157, wherein the syringe interface is a second threaded segment on an outer surface of the conduit.

Embodiment 159. The method of any one of embodiments 153-157, wherein the syringe interface is a female luer.

Embodiment 160. The method of any one of embodiments 153-159, wherein the syringe comprises a male luer lock that interfaces with the syringe interface.

Embodiment 161. The method of any one of embodiments 153-160, further including the step of forming the liquid by adding a solution to the vial, and dissolving or suspending a lyophilized powder contained within the vial.

Embodiment 162. The method of any one of embodiments 153-161, wherein the step of detaching the vial cap includes unscrewing the end cap.

Embodiment 163. The method of any one of embodiments 153-162, wherein the step of detaching the vial cap includes severing a tamper-evident band from the vial cap.

The invention claimed is:

1. A vial assembly comprising:

a vial comprising a vial body and a vial neck, the vial neck having a syringe interface; and a vial cap comprising a first component and a second component, said first component having an internal threaded segment that engages the syringe interface and an outer surface comprising a plurality of longitudinally extending ribs separated by a plurality of longitudinally extending channels, said second component including a plurality of longitudinally extending prongs that engage with a surface in the channels on the outer surface of the first component, said second component further including a central opening formed by the plurality of longitudinally extending prongs, and a plug disposed in the central opening, said plug having a lower stopper portion that fits within the vial neck and an upper portion that attaches to an upper portion of the second component.

2. The vial assembly of claim 1, wherein the second component and the plug are coextruded.

3. The vial assembly of claim 1, wherein the second component further includes a rim, wherein the upper portion of the plug includes a top portion defining a restraint coupled to a reduced diameter region defining an annulus, and wherein the rim of the second component extends into the annulus to hold the plug in place.

4. The vial assembly of claim 3, wherein the restraint comprises a domed surface.

5. The vial assembly of claim 3, wherein the restraint comprises a beveled rim.

6. The vial assembly of claim 3, wherein the rim that extends into the annulus of the plug comprises an angled inner surface.

7. The vial assembly of claim 3, wherein the rim that extends into the annulus of the plug is formed by an aperture on a top surface of the vial cap.

8. The vial assembly of claim 3, wherein the plug further includes a central body with a diameter wider than the lower stopper portion.

9. The vial assembly of claim 8 wherein the central body of the plug comprises a plurality of lateral compression ridges.

10. The vial assembly of claim 3, wherein the rim that extends into the annulus of the plug protrudes into the central opening of the vial cap.

11. The vial assembly of claim 1, wherein at least one of the prongs in the plurality of longitudinally extending prongs comprises an anchor that engages a counter-anchor disposed in a channel in the plurality of longitudinally extending channels.

12. The vial assembly of claim 1, wherein the vial neck is tapered.

13. The vial assembly of claim 1, wherein the syringe interface is a second threaded segment on an outer surface of the vial neck.

14. The vial assembly of claim 1, wherein the stopper portion of the plug forms a seal with the inner surface of the vial neck.

15. The vial assembly of claim 1, wherein the vial body has an open base.

16. The vial assembly of claim 1, wherein the vial body includes a base that is sealed with a thermoformed plastic or foil.

17. The vial assembly of claim 1, wherein the syringe interface is a female luer.

18. A method of filling a vial assembly comprising:

dispensing a liquid into a vial comprising a vial body and a vial neck, the vial neck having a syringe interface;

attaching a first component of a vial cap to the vial neck, said first component having an internal threaded segment that engages the syringe interface and an outer surface comprising a plurality of longitudinally extending ribs separated by a plurality of longitudinally extending channels; and sealing the vial by attaching a second component of the vial cap to the first component, said second component including a plurality of longitudinally extending prongs that engage with a surface in the channels on the outer surface of the first component, said second component further including a central opening formed by the plurality of longitudinally extending prongs, and a plug disposed in the central opening, said plug having a lower stopper portion that fits within the vial neck and an upper portion that attaches to an upper portion of the second component.

19. The method of claim 18, further including the step of attaching the plug to the second component of the vial cap.

20. The method of claim 18, wherein sealing the vial includes engaging an anchor on at least one of the prongs in the plurality of longitudinally disposed prongs with a counter-anchor disposed in a channel in the plurality of longitudinally disposed channels.

21. The method of claim 18, wherein the first component of the vial cap is attached to the vial neck prior to dispensing the liquid into the vial.

22. The method of claim 18, wherein the liquid is dispensed into the vial prior to attaching the first component of the vial cap to the vial neck.

23. The method of claim 18, further including the steps of:

detaching the vial cap from the vial neck, attaching a syringe to the vial neck, and drawing the liquid into the syringe.

24. The method of claim 18, further including the step of lyophilizing the liquid prior to sealing the vial.

25. The method of claim 24, further comprising partially engaging the second component with the first component without forming a seal prior to lyophilizing the liquid.

26. The method of claim 18, further including the steps of:

detaching the vial cap from the vial neck, attaching a syringe to the vial neck, dispensing a second liquid into the vial after attaching the syringe to the vial neck, and drawing the liquid into the syringe.

27. A method of filling a syringe, comprising:

detaching a vial cap from a vial, the vial having a vial body and a vial neck, the vial neck having a syringe interface; and the vial cap comprising a first component and a second component, said first component having an internal threaded segment that engages the syringe interface and an outer surface comprising a plurality of longitudinally extending ribs separated by a plurality of longitudinally extending channels, said second component including a plurality of longitudinally extending prongs that engage with a surface in the channels on the outer surface of the first component, said second component further including a central opening formed by the plurality of longitudinally extending prongs and a plug disposed in the central opening, said plug having a lower stopper portion that fits within the vial neck and an upper portion that attaches to an upper portion of the second component;

attaching a syringe to the syringe interface of the vial neck; and drawing a liquid contained within the vial into the syringe.

28. The method of claim 27, wherein detaching the vial cap includes unscrewing the end cap.

29. The method of claim 27, further including forming the liquid by adding a solution to the vial, and dissolving or suspending a lyophilized powder contained within the vial.

* * * * *